(12) United States Patent
Ho et al.

(10) Patent No.: US 10,646,817 B2
(45) Date of Patent: *May 12, 2020

(54) POROUS MATERIALS FOR NATURAL GAS LIQUIDS SEPARATIONS

(71) Applicant: Apache Corporation, Houston, TX (US)

(72) Inventors: Jason G. S. Ho, Houston, TX (US); J Calvin Cooper, Houston, TX (US)

(73) Assignee: APACHE CORPORATION, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/460,580

(22) Filed: Jul. 2, 2019

(65) Prior Publication Data
US 2019/0351365 A1   Nov. 21, 2019

Related U.S. Application Data

(63) Continuation-in-part of application No. 16/184,751, filed on Nov. 8, 2018.

(60) Provisional application No. 62/583,796, filed on Nov. 9, 2017.

(51) Int. Cl.
*B01D 53/047* (2006.01)
*C10L 3/10* (2006.01)

(52) U.S. Cl.
CPC ........ *B01D 53/0476* (2013.01); *C10L 3/101* (2013.01); *B01D 2253/108* (2013.01); *B01D 2256/245* (2013.01); *B01D 2257/504* (2013.01); *B01D 2259/406* (2013.01); *B01D 2259/40028* (2013.01); *B01D 2259/40041* (2013.01); *C10L 2290/542* (2013.01)

(58) Field of Classification Search
CPC ........... B01D 2259/40028; B01D 2259/40041; B01D 2259/406; B01D 53/047; B01D 53/0476; B01D 2253/108; B01D 2253/102; B01D 2256/245; B01D 2257/504; B01D 2257/7022; C10L 3/101; C10L 2290/542
USPC .............................. 95/6, 139, 143, 900, 902
See application file for complete search history.

(56) References Cited

U.S. PATENT DOCUMENTS

| 4,816,039 A | 3/1989 | Krishnamurthy et al. |
| 4,816,043 A | 3/1989 | Harrison |
| 5,013,334 A | 5/1991 | Maurer |

(Continued)

FOREIGN PATENT DOCUMENTS

| EP | 2752232 A1 | 9/2014 |
| WO | WO2015130339 A1 | 9/2015 |

OTHER PUBLICATIONS

The International Search Report and Written Opinion for related PCT application PCT/US2018/060140 dated Jan. 16, 2019.

(Continued)

*Primary Examiner* — Frank M Lawrence, Jr.
(74) *Attorney, Agent, or Firm* — Bracewell LLP; Constance G. Rhebergen; Kevin R. Tamm

(57) ABSTRACT

A method for continuous pressure swing adsorption separation of a pressurized feed gas stream, including separating hydrocarbons heavier than methane from the pressurized feed gas stream by applying an adsorbent porous material to produce at least two product streams, a first product stream being substantially pure methane suitable for transport by natural gas pipeline, and a second product stream being substantially comprised of components with a greater molecular weight than methane.

10 Claims, 49 Drawing Sheets

(56) References Cited

U.S. PATENT DOCUMENTS

| | | |
|---|---|---|
| 5,171,333 A | 12/1992 | Maurer |
| 5,245,099 A | 9/1993 | Mitariten |
| 5,411,721 A | 5/1995 | Doshi et al. |
| 5,733,359 A | 3/1998 | Doong et al. |
| 6,444,012 B1 | 9/2002 | Dolan et al. |
| 7,959,720 B2 | 6/2011 | Deckman et al. |
| 8,192,709 B2 | 6/2012 | Reyes et al. |
| 8,778,050 B2 | 7/2014 | Dolan et al. |
| 9,095,809 B2 | 8/2015 | Deckman et al. |
| 9,579,598 B2 | 2/2017 | Ritter et al. |
| 9,630,138 B2 | 4/2017 | Tsai et al. |
| 9,771,522 B2 | 9/2017 | Matteucci et al. |
| 2005/0139072 A1 | 6/2005 | Landrum et al. |
| 2011/0315012 A1 | 12/2011 | Kuznicki et al. |
| 2012/0222552 A1 | 9/2012 | Ravikovitch et al. |
| 2013/0019750 A1 | 1/2013 | Baksh et al. |
| 2014/0018589 A1 | 1/2014 | Iyer et al. |
| 2014/0033919 A1 | 2/2014 | Deckman et al. |
| 2014/0148634 A1 | 5/2014 | Park et al. |
| 2016/0250581 A1 | 9/2016 | Ho et al. |
| 2016/0271554 A1 | 9/2016 | Ritter et al. |
| 2016/0340596 A1 | 11/2016 | Matteucchi et al. |
| 2016/0355743 A1 | 12/2016 | Matteucchi et al. |

OTHER PUBLICATIONS

Erden, Lulfi; "Methane Separation and Purification Via Pressure Swing Adsorption" University of South Carolina Scholar Commons Theses and Dissertations (2016); pp. 1-163.

Grande, Carlos A.; "Advances in Pressure Swing Adsorption for Gas Separation" ISRN Chemical Engineering vol. 2012, Article ID 982934, Oct. 2012; pp. 1-13.

Kim, et al. "Dynamic Optimization of a Dual Pressure Swing Adsorption Process for Natural Gas Purification and Carbon Capture," I&EC Research, 2016, 55, pp. 12444-12451.

Kim, et al., "Experimental Study on PSA Process for High Purity CH4 Recovery from Biogas," 2011, pp. 281-286, English Abstract.

| | | | | | | | | | | | | |
|---|---|---|---|---|---|---|---|---|---|---|---|---|
| Bed 1 | Feed | Feed | Eqd1 | Eqd2 | CnD | | LR | | Equ2 | Equ1 | LPP |
| Bed 2 | Eqd1 | Eqd2 | CnD | | LR | | Equ2 | Equ1 | LPP | Feed | Feed |
| Bed 3 | CnD | | LR | | Equ2 | Equ1 | LPP | Feed | Feed | Eqd1 | Eqd2 |
| Bed 4 | LR | | Equ2 | Equ1 | LPP | Feed | Feed | Eqd1 | Eqd2 | CnD | |
| Bed 5 | Equ2 | Equ1 | LPP | Feed | Feed | Eqd1 | Eqd2 | CnD | | LR | |
| Bed 6 | LPP | Feed | Feed | Eqd1 | Eqd2 | CnD | | LR | | Equ2 | Equ1 |
| Time | Unit Step | Unit Step | Unit Step | Unit Step | Unit Step | Unit Step | Unit Step | Unit Step | Unit Step | Unit Step | Unit Step |

FIG. 1A

| Bed 1 | Feed | | | Eqd1 | Eqd2 | Eqd3 | | CnD | | LR | | | Equ3 | Equ2 | Equ1 | LPP |
|---|---|---|---|---|---|---|---|---|---|---|---|---|---|---|---|---|
| Bed 2 | Eqd1 | Eqd2 | Eqd3 | | CnD | | LR | | | Equ3 | Equ2 | Equ1 | LPP | | Feed | |
| Bed 3 | Eqd3 | | CnD | | LR | | | Equ3 | Equ2 | Equ1 | LPP | | Feed | | Eqd1 | Eqd2 |
| Bed 4 | | CnD | | LR | | | Equ3 | Equ2 | Equ1 | LPP | | Feed | | Eqd1 | Eqd2 | Eqd3 |
| Bed 5 | LR | | | Equ3 | Equ2 | Equ1 | LPP | | Feed | | Eqd1 | Eqd2 | Eqd3 | | CnD | |
| Bed 6 | Equ3 | Equ2 | Equ1 | LPP | | Feed | | Eqd1 | Eqd2 | Eqd3 | | CnD | | LR | | |
| Bed 7 | Equ1 | LPP | | Feed | | Eqd1 | Eqd2 | Eqd3 | | CnD | | LR | | | Equ3 | Equ2 |
| Time | Unit Step | Unit Step | Unit Step | Unit Step | Unit Step | Unit Step | Unit Step | Unit Step | Unit Step | Unit Step | Unit Step | Unit Step | Unit Step | Unit Step | Unit Step | Unit Step |

FIG. 2A

| Bed 1 | Feed | | | HR | | Eqd1 | Eqd2 | CnD | LR | | Equ1 | Equ2 | LPP |
|---|---|---|---|---|---|---|---|---|---|---|---|---|---|
| Bed 2 | HR | | Eqd1 | Eqd2 | CnD | LR | | Equ1 | Equ2 | LPP | Feed | | |
| Bed 3 | Eqd1 | Eqd2 | CnD | LR | | Equ1 | Equ2 | LPP | Feed | | | HR | |
| Bed 4 | CnD | LR | | Equ1 | Equ2 | LPP | Feed | | | HR | | Eqd1 | Eqd2 |
| Bed 5 | LR | | Equ2 | LPP | Feed | | HR | | Eqd1 | Eqd2 | CnD | | LR |
| Bed 6 | Equ1 | LPP | Feed | | HR | | Eqd1 | Eqd2 | CnD | LR | | Equ1 | Equ2 |
| Time | Unit Step | Unit Step | Unit Step | Unit Step | Unit Step | Unit Step | Unit Step | Unit Step | Unit Step | Unit Step | Unit Step | Unit Step | Unit Step |

FIG. 3A

| Bed 1 | Feed | | HR | | Eqd1 | Eqd2 | CnD | | | | LR | | Equ2 | Equ1 | LPP |
|---|---|---|---|---|---|---|---|---|---|---|---|---|---|---|---|
| Bed 2 | HR | | Eqd1 | Eqd2 | CnD | | | | LR | | Equ2 | Equ1 | LPP | | Feed |
| Bed 3 | Eqd1 | Eqd2 | CnD | | | | LR | | Equ2 | Equ1 | LPP | | Feed | | HR |
| Bed 4 | CnD | | | | LR | | Equ2 | Equ1 | LPP | | Feed | | HR | | Eqd1 | Eqd2 |
| Bed 5 | | LR | | Equ2 | Equ1 | LPP | | Feed | | HR | | Eqd1 | Eqd2 | CnD | |
| Bed 6 | LR | | Equ2 | Equ1 | LPP | | Feed | | HR | | Eqd1 | Eqd2 | CnD | | | LR |
| Bed 7 | Equ1 | LPP | | Feed | | HR | | Eqd1 | Eqd2 | CnD | | | | LR | | Equ2 |
| Time | Unit Step | Unit Step | Unit Step | Unit Step | Unit Step | Unit Step | Unit Step | Unit Step | Unit Step | Unit Step | Unit Step | Unit Step | Unit Step | Unit Step | Unit Step |

FIG. 4A

| Bed 1 | Feed | Eqd1 | HR | Eqd2 | CnD | LR | Equ2 | Equ1 | LPP |
|---|---|---|---|---|---|---|---|---|---|
| Bed 2 | Eqd1 | HR | Eqd2 | CnD | LR | Equ2 | Equ1 | Feed | |
| Bed 3 | HR | Eqd2 | CnD | LR | Equ2 | Equ1 | Feed | Eqd1 | HR |
| Bed 4 | CnD | LR | Equ2 | Equ1 | Feed | Eqd1 | HR | | Eqd2 |
| Bed 5 | LR | Equ2 | Equ1 | Feed | Eqd1 | HR | Eqd2 | CnD | LR |
| Bed 6 | Equ1 | LPP | Feed | Eqd1 | HR | Eqd2 | CnD | LR | Equ2 |
| Time | Unit Step | Unit Step | Unit Step | Unit Step | Unit Step | Unit Step | Unit Step | Unit Step | Unit Step |

FIG. 5A

| Bed 1 | Feed | | Eqd1 | Eqd2 | HR | | Eqd3 | CnD | LR | | Equ3 | Equ2 | Equ1 | LPP |
|---|---|---|---|---|---|---|---|---|---|---|---|---|---|---|
| Bed 2 | Eqd1 | Eqd2 | HR | | Eqd3 | CnD | LR | | Equ3 | Equ2 | Equ1 | LPP | Feed | |
| Bed 3 | HR | | Eqd3 | CnD | LR | | Equ3 | Equ2 | Equ1 | LPP | Feed | | Eqd1 | Eqd2 |
| Bed 4 | Eqd3 | CnD | LR | | Equ3 | Equ1 | Feed | | Eqd1 | Eqd2 | HR | | | |
| Bed 5 | LR | | Equ3 | Equ2 | LPP | Feed | | Eqd1 | Eqd2 | HR | | Eqd3 | CnD | |
| Bed 6 | Equ3 | Equ2 | Equ1 | LPP | Feed | | Eqd1 | Eqd2 | HR | | Eqd3 | CnD | LR | |
| Bed 7 | Equ1 | LPP | Feed | | Eqd1 | Eqd2 | HR | | Eqd3 | CnD | LR | | Equ3 | Equ2 |
| Time | Unit Step | Unit Step | Unit Step | Unit Step | Unit Step | Unit Step | Unit Step | Unit Step | Unit Step | Unit Step | Unit Step | Unit Step | Unit Step | Unit Step |

FIG. 6A

|       | Feed | HR | Eqd1 | CnD | LR | Equ1 | LPP |
|-------|------|------|------|------|------|------|------|
| Bed 1 | Feed | HR | Eqd1 | CnD | LR | Equ1 | LPP |
| Bed 2 | HR | Eqd1 | CnD | LR | Equ1 | LPP | Feed |
| Bed 3 | Eqd1 | CnD | LR | Equ1 | LPP | Feed | HR |
| Bed 4 | LR | Equ1 | LPP | Feed | HR | Eqd1 | CnD |
| Bed 5 | Equ1 | LPP | Feed | HR | Eqd1 | CnD | LR |
| Time  | Unit Step | Unit Step | Unit Step | Unit Step | Unit Step | Unit Step | Unit Step |

FIG. 7A

| Bed 1 | Feed | | | | CnD | | LR | | | |
|---|---|---|---|---|---|---|---|---|---|---|
| Bed 2 | Eqd1 | Eqd2 | CnD | | | LR | | Equ2 | Equ1 | LPP |
| Bed 3 | CnD | | | LR | | Equ2 | Equ1 | LPP | Feed | |
| Bed 4 | — | LR | | Equ2 | Equ1 | LPP | Feed | | Eqd1 | Eqd2 |
| Bed 5 | LR | Equ2 | Equ1 | LPP | Feed | | | Eqd1 | Eqd2 | CnD |
| Bed 6 | Equ1 | LPP | Feed | | | Eqd1 | Eqd2 | CnD | — | LR |
| Time | Unit Step | Unit Step | Unit Step | Unit Step | Unit Step | Unit Step | Unit Step | Unit Step | Unit Step | Unit Step |

FIG. 8

| Bed 1 | Feed | | Eqd1 | Eqd2 | CnD | | LR | | Equ2 | Equ1 | LPP |
|---|---|---|---|---|---|---|---|---|---|---|---|
| Bed 2 | Eqd1 | Eqd2 | CnD | | LR | | Equ2 | Equ1 | LPP | Feed | |
| Bed 3 | CnD | | LR | | Equ2 | Equ1 | LPP | Feed | | Eqd1 | Eqd2 |
| Bed 4 | LR | | Equ2 | Equ1 | LPP | Feed | | Eqd1 | Eqd2 | CnD | |
| Bed 5 | | Equ2 | Equ1 | LPP | Feed | | Eqd1 | Eqd2 | CnD | | LR |
| Bed 6 | Equ1 | LPP | Feed | | Eqd1 | Eqd2 | CnD | | LR | | Equ2 |
| Time | Unit Step | Unit Step | Unit Step | Unit Step | Unit Step | Unit Step | Unit Step | Unit Step | Unit Step | Unit Step | Unit Step |

FIG. 9

| Bed 1 | Feed | | | | CnD | | | LR | | | Equ2 | | | LPP |
|---|---|---|---|---|---|---|---|---|---|---|---|---|---|---|
| Bed 2 | Eqd1 | Eqd2 | — | CnD | | | LR | | | Equ2 | Equ1 | Feed | | |
| Bed 3 | — | CnD | | | LR | | | Equ2 | Equ1 | Feed | | | Eqd1 | Eqd2 |
| Bed 4 | CnD | | | LR | | | Equ2 | Equ1 | Feed | | | Eqd1 | Eqd2 | — | CnD |
| Bed 5 | LR | Equ2 | Equ1 | Feed | | | Eqd1 | Eqd2 | — | CnD | | | LR |
| Bed 6 | Equ1 | Feed | | | Eqd1 | Eqd2 | — | CnD | | | LR | | | Equ2 |
| Time | Unit Step | Unit Step | Unit Step | Unit Step | Unit Step | Unit Step | Unit Step | Unit Step | Unit Step | Unit Step | Unit Step | Unit Step | Unit Step |

FIG. 10

POROUS MATERIALS FOR NATURAL GAS LIQUIDS SEPARATIONS

PRIORITY

The present application is a continuation-in-part application of and claims priority to and the benefit of U.S. application Ser. No. 16/184,751, filed Nov. 8, 2018, the entire disclosure of which is incorporated here by reference.

BACKGROUND

Field

Embodiments of the disclosure relate to separations for components of a natural gas stream. In particular, embodiments of the disclosure relate to producing substantially pure methane from natural gas using porous materials to capture heavier carbon components such as natural gas liquids (NGLs). The disclosure also relates to recovery of heavier hydrocarbons, such as ethane, propane and butane from a natural gas stream, and separations of hydrocarbon gas streams comprised mostly of hydrocarbons heavier than methane.

Description of the Related Art

Raw natural gas contains concentrations of natural gas liquids (NGLs) and other non-methane contaminants that need to be removed by gas processing in order to meet specifications required by a pipeline or end use. As well, NGL components such as ethane, propane, and butane can have higher sales values than pipeline gas, which is largely comprised of methane. Ethane is a valuable chemical feedstock, and propane and butane can be blended to form liquefied petroleum gas (LPG) which is a valuable residential fuel. Therefore, NGLs are oftentimes extracted and fractionated in gas processing plants in accordance with the specific requirements of the regional markets and customers. Generally, commercial NGL specifications require less than about 0.5% by liquid volume of methane and less than 500 ppm of $CO_2$ by volume in liquid.

As a commercial fuel source, natural gas distributors and consumers need to know the expected range of quality of the fuel being delivered, and ideally need to have some control over the variability of that fuel to assure compliance with regulations, to protect equipment, and most importantly, to ensure safety for all involved in natural gas processing, transport, and use. Therefore, specifications help limit the range of variability inherent in natural gas transported around the world. Generally, pipeline specifications indicate that there should be less than about 4.0 mol. % of other non-hydrocarbon gases (for example $N_2+CO_2$) in the natural gas, less than about 10 mol. % ethane in the natural gas, and the specific energy content of the natural gas should not exceed about 1,100 British thermal unit per standard cubic foot of natural gas (btu/scf).

Variables that affect choice of the most cost-effective process for maximizing NGL separation and recovery include: inlet conditions such as for example gas pressure, richness and contaminants; downstream conditions such as for example residue gas pressure, liquid products desired, and liquid fractionation infrastructure; and overall conditions such as for example utility costs and fuel value, location, existing location infrastructure and market stability. Because of this variability, there are a number of ways to recover NGLs from natural gas streams, and market demand and perceived return on investment drive the technology choice.

Mechanical refrigeration is a conventional option for NGL recovery, where natural gas is chilled until heavy components such as hexanes and heavier hydrocarbons ($C_{\geq 6}$ hydrocarbons) condense out of the feed gas. Some of the intermediate components, such as butane and pentane can also be recovered, but there is limited recovery of ethane and propane. In order to achieve better recovery of ethane and propane from feed gases, cryogenic or turboexpander processes are typically used. These 'cryo' processes use the expansion of the natural gas stream to reduce the temperature to about −120° F. to about −140° F., so that most of the natural gas becomes liquefied and can be separated using distillation columns. This technology offers improved NGL recovery potential, but at much higher capital and operating expenditures. Cryo processes also require longer lead times to build and fabricate the specialty equipment necessary for their operation, such as the turboexpanders and aluminum heat exchangers.

Expander-based cryogenic processes require high inlet pressures to produce desired distillation column top temperatures for achieving optimal ethane and propane recovery. In most instances, an inlet pressure of greater than about 800 psia is desired for expander processes, meaning that low pressure gases must require significant inlet compression for separation to be efficient. Economies of scale then dictate that large cryogenic trains are necessary to share the "per unit cost" of compression, both at the inlet and to bring sales gas back to suitable pipeline pressures. These large trains are less tolerant of turndown because with reduced flow, either the turboexpander will not be able to achieve the low temperatures needed to operate the distillation/demethanizer column or the flowrates in the demethanizer will be insufficient to maintain the proper flow patterns.

Carbon dioxide in a feed gas will normally be split between the heavier hydrocarbons and methane, potentially affecting the product specifications, both for heavy and light products. Carbon dioxide can also freeze in a cryogenic or refrigeration process. Any 'cold' process for recovery of heavier hydrocarbons when carbon dioxide is present in the inlet gas must either operate in a region that will avoid freezing or provide carbon dioxide removal from one or more streams. Separation with greater than about 2 mol. % carbon dioxide in the inlet gas is not possible with cryogenic processes because freezing will result at either the top of the demethanizer column or at the side of the reboiler. This means that a cryogenic ethane recovery facility will require treating of carbon dioxide at more than one location of the process.

As richness of an inlet gas increases, heat exchanger pinch points will begin to appear in a cryogenic process. An external refrigeration system will be required to complement the cryogenic process to avoid these pinch points and to provide the energy to compensate for the relatively large amounts of energy leaving the system as liquid NGL product. Specifically, this occurs when the process is targeted to enhance recovery of ethane from a raw natural gas stream. As ethane recovery percentage increases, energy intensity also increases significantly. A typical ethane recovery range can be between about 60-85% for a cryogenic process, and any greater percentage of ethane recovery becomes more difficult and energy intensive because of the significant recompression horsepower required to enhance ethane recovery processes. Ethane recovery using mechanical refrigeration is not practical for industrial application.

The presence of large amounts of light inert gases also impacts ethane recovery in a cryogenic plant because the light components interfere with the efficiency and the ability to condense the reflux stream within the cryogenic process.

Undesirably, in existing processes, unrecovered propane and butane in a sales gas stream, which are more valuable as liquid products, will be sold at a discount in the sales gas (methane). In addition, unrecovered propane and butane will result in an increase in heating value and dewpoint of the sales gas, potentially exceeding pipeline specifications and resulting in financial penalties.

SUMMARY

Embodiments of the disclosure solve problems associated with conventional 'cryo' facilities and recovery limitations of refrigeration facilities, by using physical adsorption to achieve separation of NGL products from methane with high efficiency. In some embodiments, substantially 100%, for example greater than about 90%, greater than about 95%, or greater than about 98%, of the propane, butane, pentane, and heavier $C_{\geq 6}$ hydrocarbons can be separated and recovered from methane. In some embodiments, up to about 98% or about 99% of an ethane product can be effectively separated from methane as well. This can all be achieved without, or in the absence of, the use of turboexpanders, other specialty equipment, high pressures, or low cryo temperatures. For example, in embodiments of the present disclosure substantially pure methane suitable for transport in a natural gas pipeline, optionally to consumers for consumer use, at about 90%, about 95%, about 98%, or about 99% by mol. % can be obtained from a single, continuous pressure swing adsorption process carried out at about ambient temperature and below about 500 psia pressure.

Unlike turboexpander/cryo designs, the ability to operate at reduced flowrates or capacity ("turndown") for prolonged periods of time without the loss of heavy hydrocarbon recovery efficiency is also possible. Efficiency during turndown is necessary to operate a process at flowrates that are less than what was originally designed or intended due to external conditions, such as for example changes to the feed supply upstream of the process, or maintenance of certain equipment in which the process is integrated with, or at later stages of a plant lifecycle.

Additionally, in pressure swing adsorption (PSA) systems and methods of the present disclosure, carbon dioxide freezing and its inherent complications to operations and processing is not an issue when using adsorption to achieve separation. In example embodiments of the present disclosure, during a single, continuous process to obtain substantially pure methane gas, adsorbents and adsorbent beds need not be moved, transferred, externally stripped outside of a continuous pressure swing process, or regenerated outside of a continuous pressure swing process. Desorption as part of the continuous PSA process regenerates the adsorbents of the present disclosure. Adsorbent in an adsorbent bed can be stationary, and any adsorbed materials removed via cyclical pressure swing. For example, adsorbents and adsorbent beds of the present disclosure are used in cyclical pressure swing processes, optionally at about ambient temperature and less than about 500 psia pressure, to separate methane from heavier components without or in the absence of heating or temperature swing, for example without application of microwaves to an adsorbent or adsorbent bed.

In contrast to a cryogenic process, achieving greater than 85% ethane recovery from a raw natural gas stream using a PSA process is disclosed here with no additional specialty equipment. Embodiments of high recovery PSA processes do not increase process complexity, nor do the embodiments here consume increasingly significant amounts of horsepower to achieve enhanced separations and recoveries. Embodiments of systems and methods disclosed here require no second or subsequent separation for methane, which is obtained in a substantially pure condition meeting product specifications for market in one single pass through one train of PSA beds. Additional separation steps subsequent to one PSA train can be applied for further separation of target components heavier than methane, for example ethane and propane.

When ethane recovery economics are based on varying value margin between ethane's fuel value and its value as chemical feedstock, the ability to reject (with methane) or recover ethane separately from methane can become important to the profitability of a gas processing facility. The design and operation of various embodiments of the disclosure here allow systems and processes to have the flexibility to recover ethane in or reject ethane from the heavy product with minimal impact to recovery of the other heavier hydrocarbons (heavier than ethane) present in the natural gas stream based on market demand. Difficulty exists in natural gas separations because of multiple components heavier than methane existing in one stream, for example versus other gases such as biogas. Biogas in many instances has very few heavy hydrocarbons for removal, so separating the components of biogas, for example primarily methane and $CO_2$, does not suffer the same challenges as natural gas separations via pressure swing adsorption and vacuum swing adsorption.

This flexibility of operation to meet market demand without over designing or over commitment to capital equipment is valuable to owners and operators of NGL facilities. Efficiency is gained by using a flexible PSA processing solution that enables a natural gas separations facility to operate in high ethane recovery, or full ethane rejection mode without sacrificing the recovery of propane and butane as NGLs separate from the sales gas (methane). In some embodiments of the present invention, temperature swings, heating, and/or cooling are not used during a continuous PSA/vacuum swing adsorption cycle, and the process is carried out at about ambient temperature and at pressures generally less than about 500 psia.

In some embodiments of the present disclosure, systems and methods of operating PSA can be applied for dewpoint control, which is to prevent liquids from developing in a pipeline as gas, for example natural gas, is being transported. Dewpoint control can be applied to remove small amounts of liquids (less than about 3 mol. %) in the natural gas. In other embodiments of systems and methods of operating PSA of the present disclosure, substantially all hydrocarbons with a greater molecular weight than methane are recovered as NGL, and will not be limited to less than about 3 mol. % of a natural gas stream. In examples provided here, NGLs, in addition to or alternative to other gases with molecular weights greater than methane, for example inert gases such as $CO_2$ and $N_2$, are present at up to about 20 mol. % or about 30 mol. % in an inlet natural gas stream suitable for processing. Dewpoint control may be a possible application for use, but maximal recovery of hydrocarbons and the ability to then separate ethane from the rest of the NGLs in a potential PSA separation after already removing/recovering the methane is disclosed here.

Some embodiments of the present invention advantageously use activated carbon or adsorbents comprising activated carbon rather than, or without, zeolite imidazole frameworks (ZIFs) and metal organic frameworks (MOFs). Instead, embodiments of systems and methods here apply carbon with a high surface area and a predominantly heterogeneous microporous structure. A broad range of pore sizes in the heterogeneous microporous structure can be used suitably as an adsorbent in adsorbent beds applied here, rather than a uniformly angstrom-based pore size found in ZIFS and MOFs. Suitably high adsorption of and selectivity for hydrocarbons with molecular weights greater than methane can be achieved when heterogeneous porous carbon structures exhibit pore sizes in a range of greater than about 1 nm (about 10 angstroms) and less than about 50 nm (500 angstroms).

Suitable and advantageous adsorbents include high surface area mesoporous and microporous carbons optionally with heteroatoms, such as for example sulfur, nitrogen, and/or oxygen, in the pores and/or incorporated into the porous material's chemical structure to enhance selectivity for NGL adsorption versus methane. In some embodiments, hydrated pores in porous carbons exhibit enhanced selectivity to NGLs to separate NGLs from natural gas streams. Other mesoporous and microporous materials, optionally including heteroatoms, are also suitable adsorbents for use in NGL separation processes.

Porous materials, which may be carbon-based for example, can be modified by doping precursor materials with heteroatoms such as sulfur, nitrogen, and/or oxygen, and upon activating the porous material, for example by physical and/or chemical activation, optionally including increased temperature, the elements are incorporated into the porous material, physically, chemically, or both.

Porous adsorbents of the present disclosure are operable at atmospheric pressure, pressures less than atmospheric, and pressure greater than atmospheric pressure. A wide range of pore volumes in porous adsorbents, such as porous carbon-based adsorbents, is available. Micropores for example between about 0.5 nm and about 10 nm, and between about 1 nm and about 2 nm, offer surprisingly and unexpectedly efficient hydrocarbon separations, for example methane separation from heavier NGLs, along with $CO_2$ separation. Small pore sizes in the Angstrom scale (<1 nm) are not required. Enhanced selectivity of exemplified adsorbents to NGLs versus methane has been shown to occur in the presence of oxygen heteroatoms, and similar enhanced selectivity has been exemplified for higher molecular weight hydrocarbons versus ethane with nitrogen heteroatoms present in porous carbon adsorbents.

Additionally, activated carbon-based adsorbents are significantly less expensive than ZIFs and metal organic frameworks. However, in other embodiments of systems and methods of the present disclosure to obtain a substantially pure target hydrocarbon stream from a mixed hydrocarbon stream, other adsorbents and adsorbent support materials can be used with or alternative to carbon-based adsorbents, for example any one of or any combination of ZIFs, MOFs, molecular sieves, and other zeolites. Importantly, PSA systems and methods of the present disclosure allow for a substantially pure target hydrocarbon stream to be obtained from one pass of a mixed hydrocarbon gas through a PSA train system with adsorbent beds without recycle or additional PSA separation of the obtained substantially pure target hydrocarbon stream.

Embodiments of the present invention are well suited for any hydrocarbon gas separation application, for example with flow rates between about 1 million standard cubic feet per day (MMscfd) to about 250 MMscfd. At lower flow rates, example systems and methods disclosed here can be used to separate raw natural gases closer to a source, for example production wells, typically referred to as upstream operations. Due to the high recovery of NGLs with embodiments of the present invention over conventional technologies for dewpoint control, higher value hydrocarbons will provide greater revenue to the operator sooner and also minimize the need for flaring at the natural gas source, because the separated methane is better suited to meet pipeline transport specifications. In other embodiments, flow rates greater than about 40 MMscfd can allow for application in gas processing midstream operations, where gas is gathered to a centralized processing facility, typically a further distance from a source of production. Systems and methods of the present disclosure may be stationary or mobile, depending on required locations for separation and required flow rates.

Therefore, disclosed herein is a method for continuous pressure swing adsorption separation of a pressurized feed gas stream, the method comprising the step of separating hydrocarbons heavier than methane from the pressurized feed gas stream to produce at least two product streams, a first product stream being substantially pure methane suitable for transport by natural gas pipeline, and a second product stream being substantially comprised of components with a greater molecular weight than methane. In some embodiments, the step of separating includes a feed step carried out at a pressure between about 50 psia and about 500 psia to produce the stream being substantially pure methane. In other embodiments, the step of separating hydrocarbons can include recovering ethane in the first product stream being substantially pure methane or can include recovering ethane in the second product stream being substantially comprised of components with a greater molecular weight than methane. Still other embodiments include the step of recovering ethane in the second product stream being substantially comprised of components with a greater molecular weight than methane, and further include the step of separating the ethane from propane and butane via pressure swing adsorption.

In some embodiments, the method uses at least two fluidly coupled trains of PSA units, and further comprises the step of separating components of the second product stream being substantially comprised of components with a greater molecular weight than methane, including propane and butane. In some other embodiments, each of the pressure swing adsorption trains of PSA units includes more than one individual adsorption bed. Still in other embodiments, the step of separating hydrocarbons comprises lengthening an amount of time of a product purge step in a PSA cycle to better separate two or more components which have similar desorption fronts within an adsorption bed.

In certain embodiments, the step of separating includes adjusting separation parameters such that $CO_2$ in the pressurized feed gas stream can be separated to be in either the first product stream being substantially pure methane, or the second product stream being substantially comprised of components with a greater molecular weight than methane. In some embodiments, the step of separating can be carried out in a turndown mode, where the turndown mode is reduced by at least 50% relative to designed separation capacity, and still produce the first product stream being substantially pure methane, and the second product stream being substantially comprised of components with a greater molecular weight than methane.

In certain embodiments, the lowest pressure during separating may be between about 1 psia and about 1.5 psia. In some embodiments, the method further comprises a bed-to-tank-to-bed equalization step, the bed-to-tank-to-bed equalization step reducing an amount of adsorbent beds required in the method, where a tank is a pressurizable vessel that does not contain any adsorbent and serves as an intermediate transit vessel for the gas moving from one bed to another bed. Still in other embodiments, the step of separating includes steps selected from the group consisting of: a feed step; an equalization down step; cocurrent depressurization occurring before, in between or after the equalization down step; countercurrent depressurization; light reflux; an equalization up step; and light product pressurization.

In certain embodiments, the first product stream being substantially pure methane is obtained in pass-through of the pressurized feed gas stream passing through a PSA train with adsorbent beds without recycle or additional PSA separation of the first product stream being substantially pure methane. In some embodiments, the step of separating is carried out at about ambient temperature without units for heating or cooling or vacuum. Still in other embodiments, the substantially pure methane suitable for transport by natural gas pipeline is suitable for transport to and use by consumers.

In certain embodiments of the method, the step of separating includes adjusting separation parameters such that $CO_2$ in the pressurized feed gas stream is separated into the first product stream, such that the second product stream comprises less than about 500 ppm of $CO_2$ by volume in liquid, less than about 0.5 mol. % methane, and such that the second product stream comprises substantially hydrocarbon components with a greater molecular weight than methane. Still yet in some other embodiments, the step of separating includes the steps of: a feed step; a plurality of equalization down steps; a plurality of equalization up steps; cocurrent depressurization occurring before, in between, or after the equalization steps; countercurrent depressurization; light reflux; heavy reflux; and light product pressurization.

Additionally disclosed here is a pressure swing adsorption system, the system comprising a plurality of adsorbent beds, the adsorbent beds comprising adsorbents comprising carbon, wherein the pressure swing adsorption system is operable to continuously and simultaneously separate components of a raw natural gas stream into a substantially pure methane stream and a product stream being substantially comprised of components with a greater molecular weight than methane. In some embodiments, the system further comprises a second plurality of adsorbent beds, the adsorbent beds comprising adsorbents comprising carbon, and the second plurality of adsorbent beds operable to separate the components of the product stream being substantially comprised of components with a greater molecular weight than methane. Still in other embodiments, the substantially pure methane stream is obtained by passing the raw natural gas stream passing through the pressure swing adsorption system without recycle or additional PSA separation of the substantially pure methane stream. In some embodiments of both methods and systems, the substantially pure methane stream is at least about 98 mol. % pure methane. In certain embodiments, the system operates at about ambient temperature without units for heating or cooling or vacuum.

Still in other embodiments, the system further comprises a tank operable for a bed-to-tank-to-bed equalization step, where a tank is a pressurizable vessel that does not contain any adsorbent and serves as an intermediate transit vessel for the gas moving from one bed to another bed. In certain other embodiments of methods and systems, the substantially pure methane stream has a British thermal unit (btu) per standard cubic foot (scf) value less than about 1,100 btu/scf. Still in other embodiments of methods and systems, the substantially pure methane stream is at least about 90 mol. % pure methane. In certain embodiments of systems and methods, the substantially pure methane stream is at least about 95 mol. % pure methane. In certain embodiments of systems and methods, the substantially pure methane stream is at least about 98 mol. % pure methane.

Also disclosed here is a method for continuous pressure swing adsorption separation of a pressurized feed gas stream, the method comprising the step of separating hydrocarbons heavier than a target hydrocarbon from the pressurized feed gas stream to produce at least two product streams, a first product stream being substantially pure target hydrocarbon, and a second product stream being substantially comprised of components with a greater molecular weight than the target hydrocarbon. In some embodiments, inlet pressure for the pressurized feed gas stream can range from about 30 psia to about 250 psia. In some embodiments, inlet temperature is between about 278 K to about 348 K. In other embodiments, inlet temperature is between about 278 K to about 323 K. In yet other embodiments, the lowest pressure applied during the method is between about 1.0 psia and about 7.0 psia. Still in other embodiments, the second product stream comprises at least about 90 mol. % hydrocarbons heavier than ethane, substantially no $CO_2$, and no more than about 0.5 mol. % of methane and about 0.5 mol. % of ethane. In other embodiments, the step of separating includes the following PSA steps: a feed step; a heavy reflux step; at least one equalization down step; a countercurrent depressurization step; a light reflux step; at least one equalization up step; and a light product pressurization step.

In addition, disclosed here is a pressure swing adsorption system, the system comprising a plurality of adsorbent beds, wherein the pressure swing adsorption system is operable to continuously and simultaneously separate components of a pressurized feed gas stream into a substantially pure target hydrocarbon stream and a product stream being substantially comprised of components with a greater molecular weight than the target hydrocarbon stream. In some embodiments, the adsorbent beds comprise at least one material selected from the group consisting of: carbon-based adsorbents; silica gels; activated aluminas; zeolite imidazole frameworks (ZIFs); metal organic frameworks (MOFs); molecular sieves; other zeolites; and combinations thereof. Still in other embodiments, system inlet pressure is between about 30 psia to about 250 psia. In other embodiments, the lowest pressure in the system while operating is between about 1.0 psia and about 7.0 psia. In other embodiments, inlet temperature is between about 278 K to about 348 K. In some embodiments, inlet temperature is between about 278 K to about 323 K.

In some embodiments, the system includes one or more equalization tanks and operates with at least one step selected from the group consisting of: a feed step; a heavy reflux step; one or more equalization steps; a countercurrent depressurization step; a light reflux step; and a light product pressurization step. In other embodiments, the system includes 6 adsorption beds operating with 9 cycle steps and includes: a feed step; a heavy reflux step; two equalization down steps; a countercurrent depressurization step; a light reflux step; two equalization up steps; and a light product pressurization step.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

FIG. 1A shows a schematic of an example PSA cycle step schedule using 6 beds to achieve production of a substantially pure methane product, for example suitable for transport in a pipeline and consumer use, or to achieve production of a substantially pure target molecular weight hydrocarbon separated from other higher molecular weight hydrocarbons.

FIG. 2A shows a schematic of an example PSA cycle step schedule using 7 beds to achieve production of a substantially pure methane product, for example suitable for transport in a pipeline and consumer use, or to achieve production of a substantially pure target molecular weight hydrocarbon separated from other higher molecular weight hydrocarbons.

FIG. 3A shows a schematic of an example PSA cycle step schedule using 6 beds to achieve production of a substantially pure methane product, for example suitable for transport in a pipeline and consumer use, or to achieve production of a substantially pure target molecular weight hydrocarbon separated from other higher molecular weight hydrocarbons.

FIG. 4A shows a schematic of an example PSA cycle step schedule using 7 beds to achieve production of a substantially pure methane product, for example suitable for transport in a pipeline and consumer use, or to achieve production of a substantially pure target molecular weight hydrocarbon separated from other higher molecular weight hydrocarbons.

FIG. 5A shows a schematic of an example PSA cycle step schedule using 6 beds to achieve production of a substantially pure methane product, for example suitable for transport in a pipeline and consumer use, or to achieve production of a substantially pure target molecular weight hydrocarbon separated from other higher molecular weight hydrocarbons.

FIG. 6A shows a schematic of an example PSA cycle step schedule using 7 beds to achieve production of a substantially pure methane product, for example suitable for transport in a pipeline and consumer use, or to achieve production of a substantially pure target molecular weight hydrocarbon separated from other higher molecular weight hydrocarbons.

FIG. 7A shows a schematic of an example PSA cycle step schedule using 5 beds to achieve production of a substantially pure methane product, for example suitable for transport in a pipeline and consumer use, or to achieve production of a substantially pure target molecular weight hydrocarbon separated from other higher molecular weight hydrocarbons.

FIG. 8 shows a schematic of an example PSA cycle step schedule using 6 beds to achieve production of a substantially pure methane product, for example suitable for transport in a pipeline and consumer use, or to achieve production of a substantially pure target molecular weight hydrocarbon separated from other higher molecular weight hydrocarbons.

FIG. 9 shows a schematic of an example PSA cycle step schedule using 6 beds to achieve production of a substantially pure methane product, for example suitable for transport in a pipeline and consumer use, or to achieve production of a substantially pure target molecular weight hydrocarbon separated from other higher molecular weight hydrocarbons.

FIG. 10 shows a schematic of an example PSA cycle step schedule using 6 beds to achieve production of a substantially pure methane product, for example suitable for transport in a pipeline and consumer use, or to achieve production of a substantially pure target molecular weight hydrocarbon separated from other higher molecular weight hydrocarbons.

DETAILED DESCRIPTION

Figure 1B:
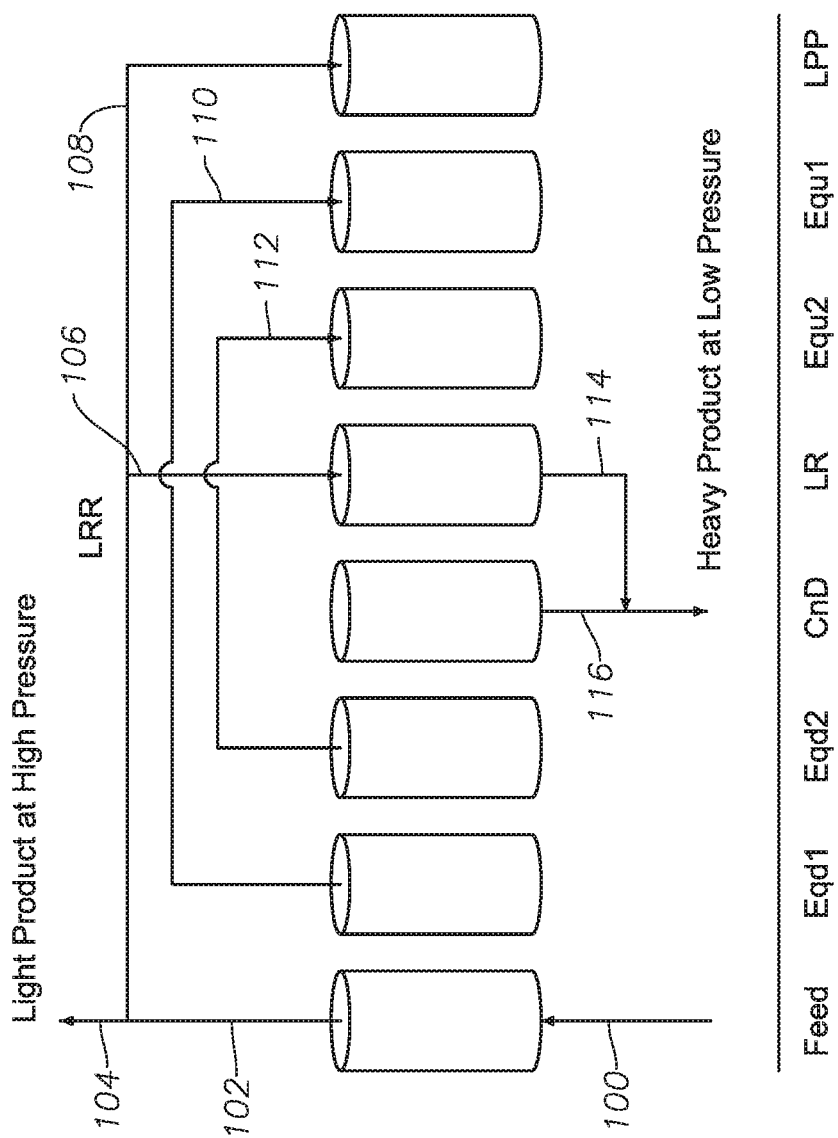
FIG. 1B shows a graphic representation of the steps occurring in separate beds during a PSA cycle for certain unit steps shown in FIG. 1A.

So that the manner in which the features and advantages of the embodiments of systems and methods of natural gas liquids recovery from pressure swing adsorption and vacuum swing adsorption as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Referring first to FIG. 1A, a schematic is provided of an example PSA cycle step schedule using 6 beds to achieve production of a substantially pure methane product, for example suitable for transport in a pipeline and consumer use, or to achieve production of a substantially pure target molecular weight hydrocarbon separated from other higher molecular weight hydrocarbons. In FIG. 1A proceeding from left to right, the individually labeled blocks, such as "Feed" for example, represent cycle steps, where the time for a cycle step (some amount of unit step(s) as shown in the Figures) can range from about 5 seconds or about 15 seconds to many minutes in duration. As well, the duration of each cycle step can also vary depending on the separation to be carried out. In the present disclosure, the quantity of unit steps can vary and the time period for each unit step and cycle step can vary. Depending on the unit steps and cycle steps, idle steps may or may not be part of a PSA method or system.

Referring to Beds 1-6, which include at least one adsorbent material that is selective for hydrocarbons, for example an adsorption bed comprising a heterogeneous high surface area carbon-containing adsorbent, a first step labelled "Feed" is carried out at a constant, high pressure, optionally the highest-available pressure of the PSA cycle. A light product stream containing lighter species, such as for example methane and/or ethane, is produced also at a high pressure, optionally about the highest-available pressure of a PSA cycle. Heavier hydrocarbon components and other components with a molecular weight greater than methane are adsorbed to the adsorbent at high pressure. For example, the Feed step in the present disclosure can be carried out at between about 689 kPa (50 psia) and about 3,447 kPa (500 psia). The temperature of a gas composition at the Feed step in embodiments of the present disclosure can be between about 278 K to about 318 K, about 278 K to about 348 K, or between about 278 K to about 323 K.

In certain embodiments, the adsorbent is selected from a group including, but not limited to, zeolites, activated carbon, silica gel, and alumina. In some embodiments, activated, porous carbon particles derived from low-cost carbon sources are used as an adsorbent. Highly-microporous carbon particles advantageously have a much higher surface area than typical activated carbon. In another embodiment, the adsorbent can be carbon-based molecular sieves. In other embodiments, the adsorbent can include, or not include, metal-oxide based molecular sieves or metal organic frameworks. In certain embodiments, the adsorbent can include nanoparticles. The adsorbent material can be presented in a variety of physical forms, including but not limited to powders, beads, pellets, granules, rods, and coatings on sheets or encapsulated between metal fibers. The adsorbent material should have a large working capacity observed for hydrocarbons, such as methane and ethane, especially in a system operating between about 100 kPa to about 3500 kPa (about 14.7 psia to about 500 psia). Separate beds may use the same adsorbent materials or different adsorbent materials. Separate trains of PSA beds may use the same adsorbent materials in one or more layers within each bed or different adsorbent materials in one or more layers within each bed.

In some embodiments, suitable pressures for disclosed systems and methods applying the microporous or mesoporous adsorbent materials include pressures at about 1 bar or greater. Porous materials, including porous carbon-containing materials with optional heteroatoms, can include those materials with a surface area of at least 1,200 m$^2$/g, and a total pore volume of at least 0.8 cm$^3$/g. In some embodiments, a majority of pores of the porous material have diameters of less than about 2 nm as measured from N2 sorption isotherms using the BET (Brunauer-Emmett-Teller) method. Porous materials, including porous carbon-containing materials with optional heteroatoms, can include those materials with a surface area of between at least about 1,200 m$^2$/g and about 3,500 m$^2$/g, or between at least about 1,200 m$^2$/g and about 3,000 m$^2$/g, and a total pore volume of between at least about 0.8 cm$^3$/g and about 1.4 cm$^3$/g, or between at least about 0.8 cm$^3$/g and about 1.2 cm$^3$/g.

In some embodiments, a majority of the pores of the porous material have diameters between about 0.5 nm to about 10 nm, or between about 1 nm to about 5 nm, or between about 1 nm to about 2 nm. In certain embodiments, the porous material has an oxygen content of more than about 4 wt. %, or between about 5 wt. % and about 25 wt. %, or between about 10 wt. % and about 20 wt. %, or between about 10 wt. % and about 15 wt. % as measured by X-ray photoelectron spectroscopy (XPS). Suitable porous materials can have an oxygen content between about 4% and 20% as measured by XPS.

In some embodiments, more than 50% of the pores of the porous material have diameters of less than about 2 nm. Porous adsorbent materials of the present disclosure can separate gases including natural gas in addition to or alternative to other mixtures of gases, for example carbon dioxide byproduct streams of combustion processes. In some embodiments, the porous material has a nitrogen content of at least 1% as measured by XPS, which enhances the selectivity of the porous material in capturing gases heavier than ethane, in addition to or alternative to an oxygen content of at least 1% as measured by XPS or a sulfur content of at least 1% as measured by XPS.

In some embodiments, the porous material has a nitrogen content between about 1% and about 12% as measured by XPS, which enhances the selectivity of the porous material in capturing gases heavier than ethane. In some embodiments, the porous material comprises a porous carbon material with a carbon content of between about 75% and about 95%, or between about 75% and about 90%, as measured by XPS.

Enhanced selectivity of CO$_2$ capture from methane using porous material, such as porous carbon material, occurs above about 1 bar. Nano-pores (pores<1 nm pore diameters) do not provide necessary enhancement in selectivity at increased pressures for adsorption in some embodiments.

Still referring to Bed 1 in FIG. 1A, after the Feed step, next two consecutive light end equalization down steps, denoted by "Eqd1" and "Eqd2," are carried out from the light end of the bed to reduce the pressure of the bed and enrich the bed with heavier species as they desorb from the adsorbent material. Next, a countercurrent depressurization step, denoted by "Cnd," is carried out, in which gas is withdrawn from the feed end of the bed to constitute a heavy product while the pressure of the bed reaches the lowest pressure, or close to the lowest pressure, of the PSA cycle. The lowest pressure in the PSA process cycle in embodiments of the disclosure here can be about 1 psia or about 1.5 psia. Vacuum may or may not be applied to increase heavy product recovery. Afterwards, a light reflux step, denoted by "LR," is carried out at a constant low pressure, optionally, not necessarily, the lowest-available pressure of the PSA cycle, during which a small fraction of the light product stream containing the lighter species is fed into the light end of a bed to produce additional heavy product enriched in the heavier species.

Next, two consecutive light end equalization up steps, denoted by "Equ2," "Equ1," are carried out through the light end that individually take all the gas coming from light end equalizations down steps, (Eqd1, Eqd2), taking first the gas coming from the last down equalization step Eqd2 (for example at Bed 4) and taking last the gas coming from the first down equalization step Eqd1 (for example at Bed 3), resulting in each case with a partial re-pressurization of Bed 1. Afterward, a light product pressurization step, denoted by "LPP," is carried out, wherein a small fraction of the light product stream containing the lighter species is fed into the light end of the bed to finalize the re-pressurization of the bed to the highest pressure prior to starting the Feed step corresponding to the next cycle.

FIG. 1B shows a graphic representation of the steps in a PSA cycle for certain unit steps in FIG. 1A. In a bed undergoing a Feed step at high pressure, feed stream 100 enters a bed, thereby producing a light end stream 102 at the light end of the bed that is enriched with the lighter species and at essentially the pressure of the feed stream. A light product stream 104 is withdrawn and a portion of light end stream 102 is withdrawn for light reflux stream 106, and a portion of light end stream 102 is withdrawn for light product pressurization stream 108. During a first equalization down in a bed (Eqd1) a first equalization up occurs in another bed (Equ1) shown by stream 110, and during a second equalization down in a bed (Eqd2) a second equalization up occurs in another bed (Equ2) shown by stream 112.

During light reflux, light reflux stream 106 drives heavy product at low pressure via stream 114, and this is combined with heavy product from countercurrent depressurization in stream 116. A heavy product stream at the heavy (feed) end of a bed that is enriched with the heavier species leaves a bed at pressures ranging between the feed pressure and the lowest pressure of the cycle, which may be less than atmospheric pressure with the aid of a vacuum pump.

The process may utilize any arbitrary number of equalization down steps with the same number of corresponding equalization up steps. In some embodiments, equalization tanks without adsorbent material are used to reduce the required number of adsorbent beds, and the number of equalization tanks mediating an equalization step is either equal to the number of down equalization steps or equal to that number minus one. An increase in the number of adsorbent beds used and/or equalization tanks used can lead to an increase in the number of equalization steps used.

Referring now to FIG. 2A, a schematic is provided of an example PSA cycle step schedule using 7 beds to achieve production of a substantially pure methane product, for example suitable for pipeline transport and consumer use, or to achieve production of a substantially pure target molecular weight hydrocarbon separated from other higher molecular weight hydrocarbons. FIG. 2A is similar to the configuration shown in FIG. 1A, with similarly labelled cycle steps meaning the same as that described for FIG. 1A, except that a 7$^{th}$ bed is shown, and an additional equalization up step "Equ3" and an additional equalization down step "Eqd3" are shown as part of the process. In other configurations, more or fewer than 6 or 7 beds can be used with or without any number of equalization tanks, where the equalization tanks do not contain adsorbent material, but help reduce the number of required adsorbent beds for a given separation. In addition to countercurrent depressurization, cocurrent depressurization steps also can be utilized.

Figure 2B:
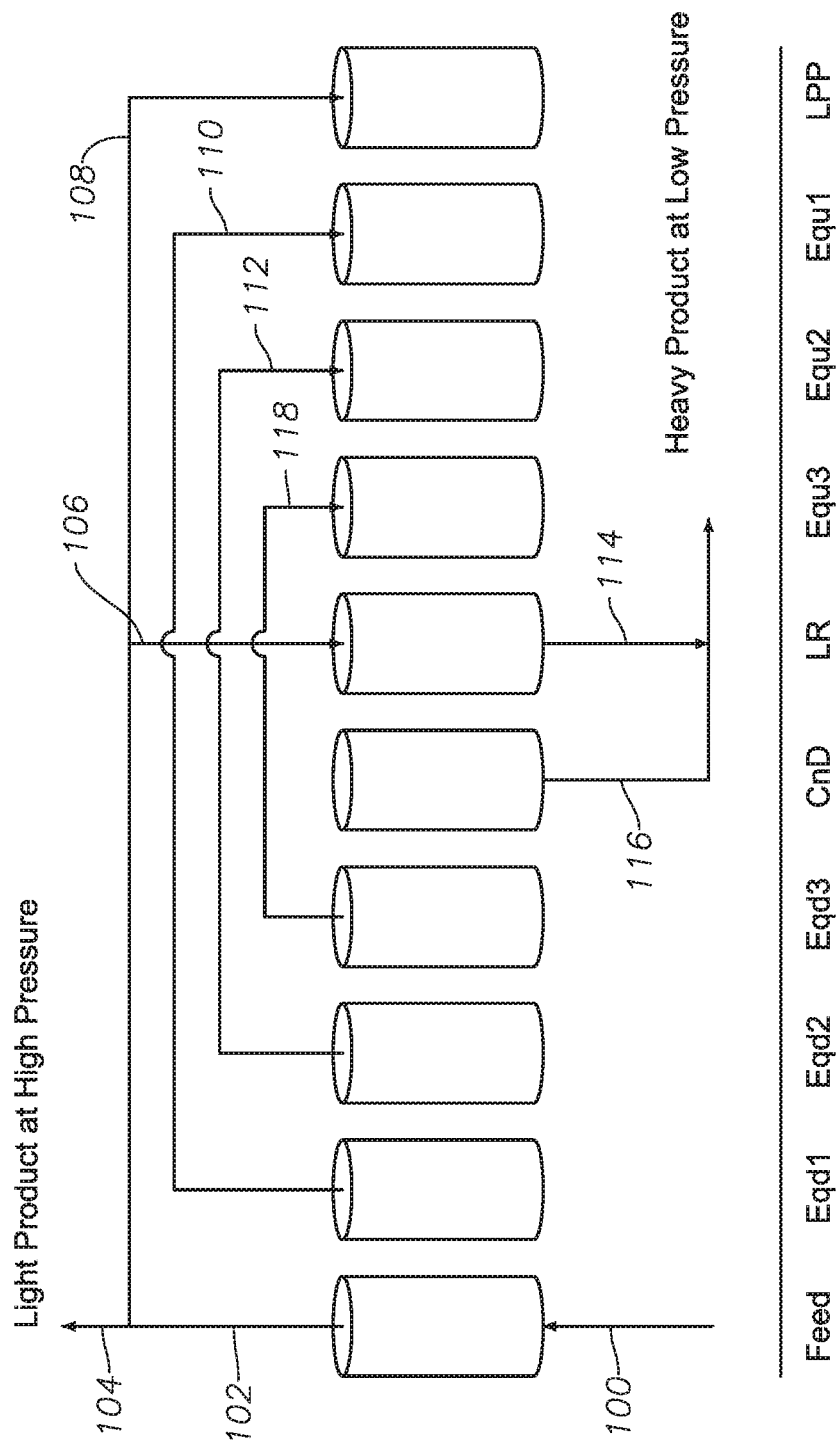
FIG. 2B shows a graphic representation of the steps occurring in separate beds during a PSA cycle for certain unit steps shown in FIG. 2A.

FIG. 2B shows a graphic representation of the steps in a PSA cycle for certain unit steps in FIG. 2A. FIG. 2B is similar to the configuration shown in FIG. 1B, with similarly labelled units being the same as that described for FIG. 1A, except that with a 7$^{th}$ bed as shown in FIG. 2A an additional equalization up step "Equ3" and an additional equalization down step "Eqd3" are shown as part of the process, with stream 118 in FIG. 2B.

Referring now to FIG. 3A, a schematic is provided of an example PSA cycle step schedule using 6 beds to achieve production of a substantially pure methane product, for example suitable for transport in a pipeline and consumer use, or to achieve production of a substantially pure target molecular weight hydrocarbon separated from other higher molecular weight hydrocarbons. FIG. 3A is similar to the configuration shown in FIGS. 1A and 2A, with similarly labelled cycle steps meaning the same as that described for FIGS. 1A and 2A, except that an additional heavy reflux step "HR" is shown as part of the process. In other configurations, more or fewer than 6 or 7 beds can be used with or without any number of equalization tanks, where the equalization tanks do not contain adsorbent material, but help reduce the number of required adsorbent beds for a given separation. In addition to countercurrent depressurization, cocurrent depressurization steps also can be utilized.

Figure 3B:
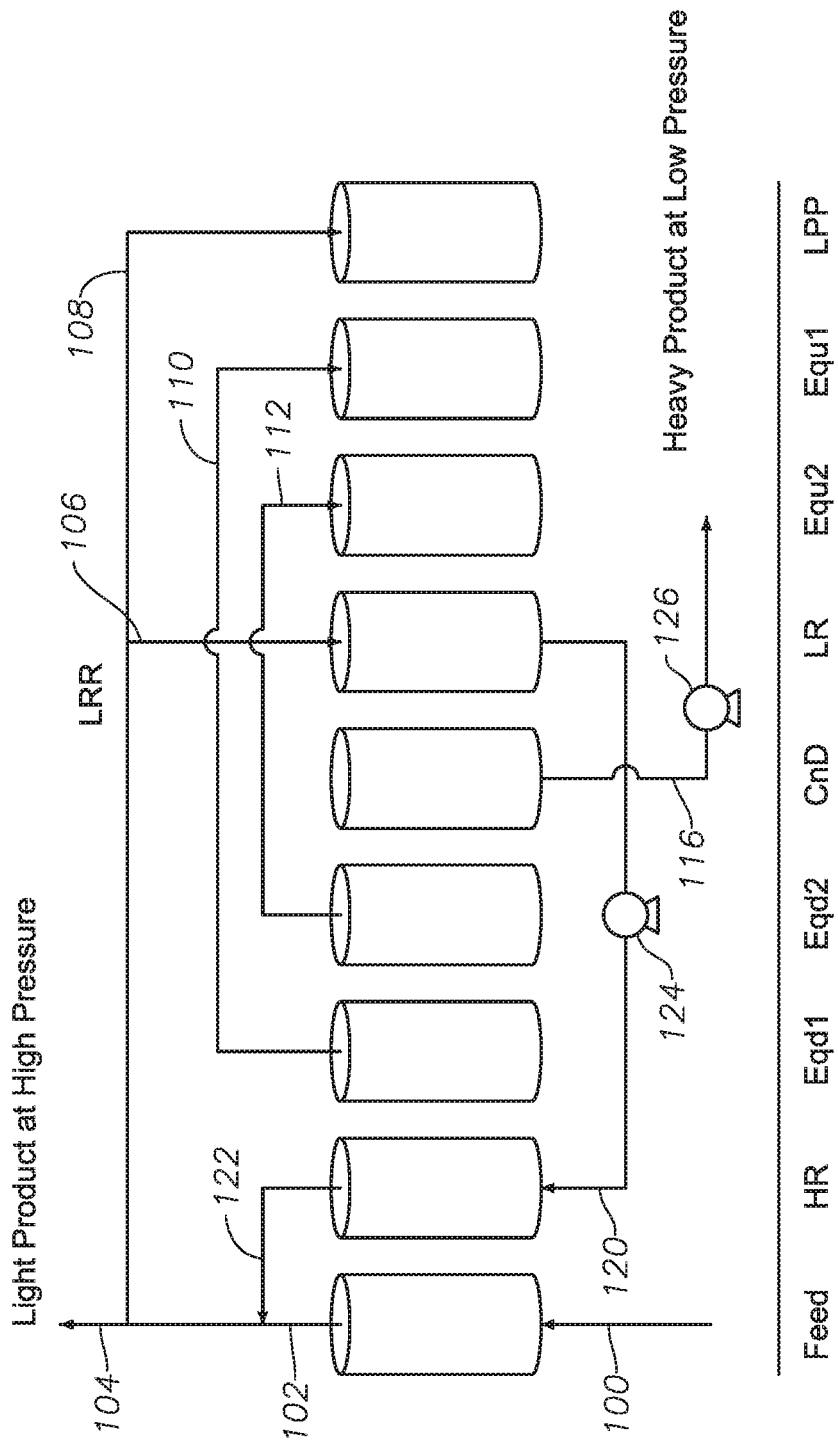
FIG. 3B shows a graphic representation of the steps occurring in separate beds during a PSA cycle for certain unit steps shown in FIG. 3A.

FIG. 3B shows a graphic representation of the steps in a PSA cycle for certain unit steps in FIG. 3A. FIG. 3B is similar to the configurations shown in FIGS. 1B and 2B, with similarly labelled units being the same as that described for FIG. 1A, except that with a heavy reflux step as shown in FIG. 3A, an additional heavy reflux step "HR" is shown as part of the process, with stream 120 in FIG. 3B showing a portion of gas from the light reflux step in one bed proceeding for use in the HR step in another bed. After heavy reflux, product stream 122 returns light product to light end stream 102. In general, reflux steps such as light reflux and heavy reflux are used in pressure swing adsorption processes to help produce products at greater recovery rates and at greater purity. In FIG. 3B a compressor pump 124 is shown to indicate that stream 120 is pressurized to ultimately produce product stream 122 which comprises light product at high pressure. Also shown is optional vacuum pump 126 which can apply a vacuum to stream 116 and a bed in which countercurrent depressurization is taking place to produce heavy product at low pressure.

One of ordinary skill in the art will understand other compressor and vacuum pumps can be applied as necessary between beds to create desired pressure swings within a pressure swing system during operation. In certain embodiments of systems and methods of the present disclosure, vacuum pumps and applied vacuum is optional.

Referring now to FIG. 4A, a schematic is provided of an example PSA cycle step schedule using 7 beds to achieve production of a substantially pure methane product, for example suitable for pipeline transport and consumer use, or to achieve production of a substantially pure target molecular weight hydrocarbon separated from other higher molecular weight hydrocarbons. FIG. 4A is similar to the configuration shown in previous figures, for example FIG. 3A, with similarly labelled cycle steps meaning the same as that described for previous figures, except that an additional idle step "I" is shown as part of the process. In other configurations, more or fewer than 6 or 7 beds can be used with or without any number of equalization tanks, where the equalization tanks do not contain adsorbent material, but help reduce the number of required adsorbent beds for a given separation. In addition to countercurrent depressurization, cocurrent depressurization steps also can be utilized.

Figure 4B:
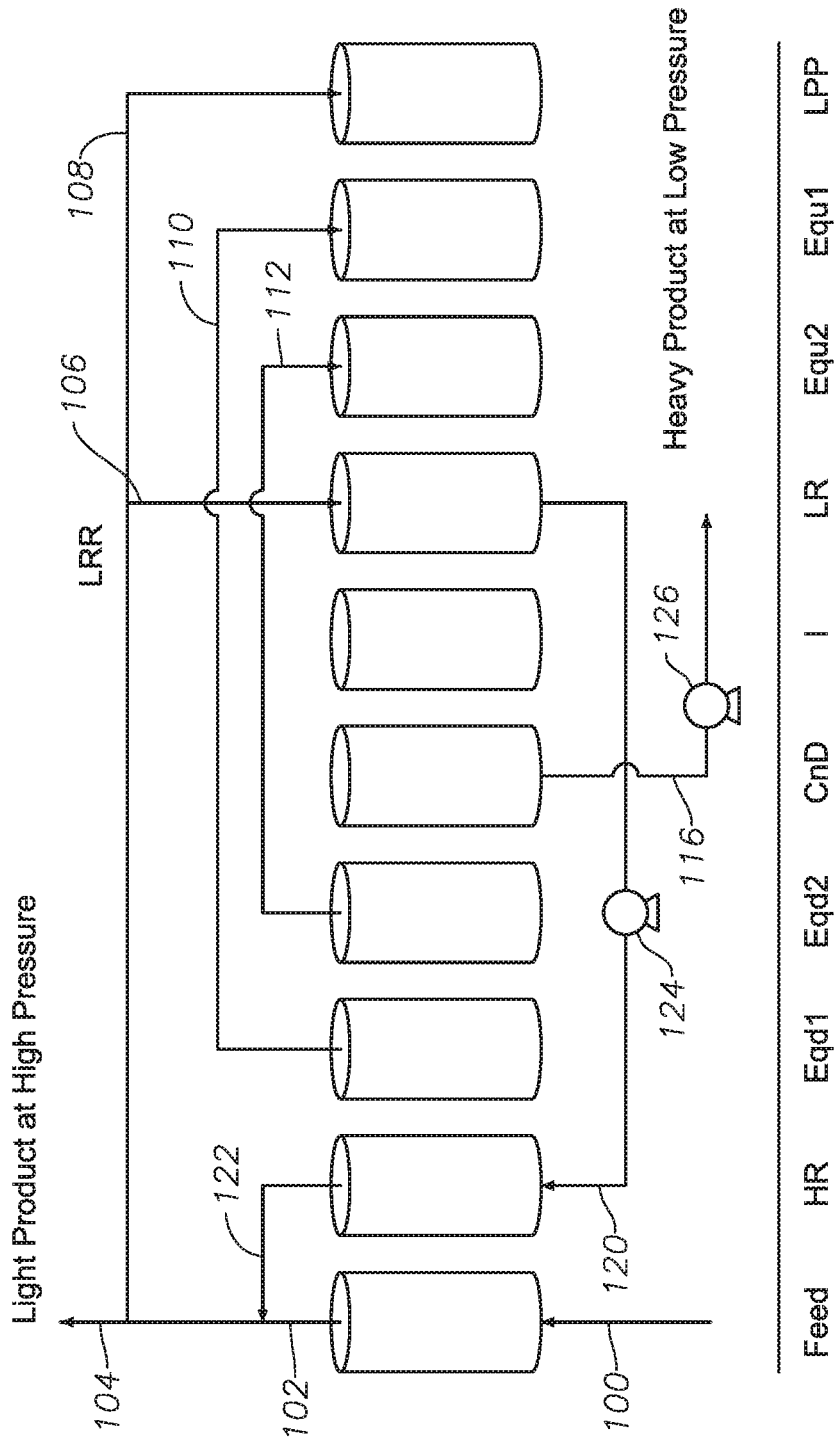
FIG. 4B shows a graphic representation of the steps occurring in separate beds during a PSA cycle for certain unit steps shown in FIG. 4A.

FIG. 4B shows a graphic representation of the steps in a PSA cycle for certain unit steps in FIG. 4A. FIG. 4B is similar to the configuration shown in FIGS. 1B, 2B, and 3B, with similarly labelled units being the same as that described for previous figures. As noted, FIG. 4B represents an idle step "I" also shown in FIG. 4A. In some embodiments, an optional idle step is used to allow other beds in a PSA system to match up for sequencing purposes. An idle step is a period of time in a PSA cycle where a bed is not producing gas, regenerating, or adsorbing gas.

Referring now to FIG. 5A, a schematic is provided of an example PSA cycle step schedule using 6 beds to achieve production of a substantially pure methane product, for example suitable for pipeline transport and consumer use, or to achieve production of a substantially pure target molecular weight hydrocarbon separated from other higher molecular weight hydrocarbons. FIG. 5A is similar to the configurations shown in previous figures, with similarly labelled cycle steps meaning the same as that described for previous figures. In other configurations, more or fewer than 6 or 7 beds can be used with or without any number of equalization tanks, where the equalization tanks do not contain adsorbent material, but help reduce the number of required adsorbent beds for a given separation. In addition to countercurrent depressurization, cocurrent depressurization steps also can be utilized.

Figure 5B:
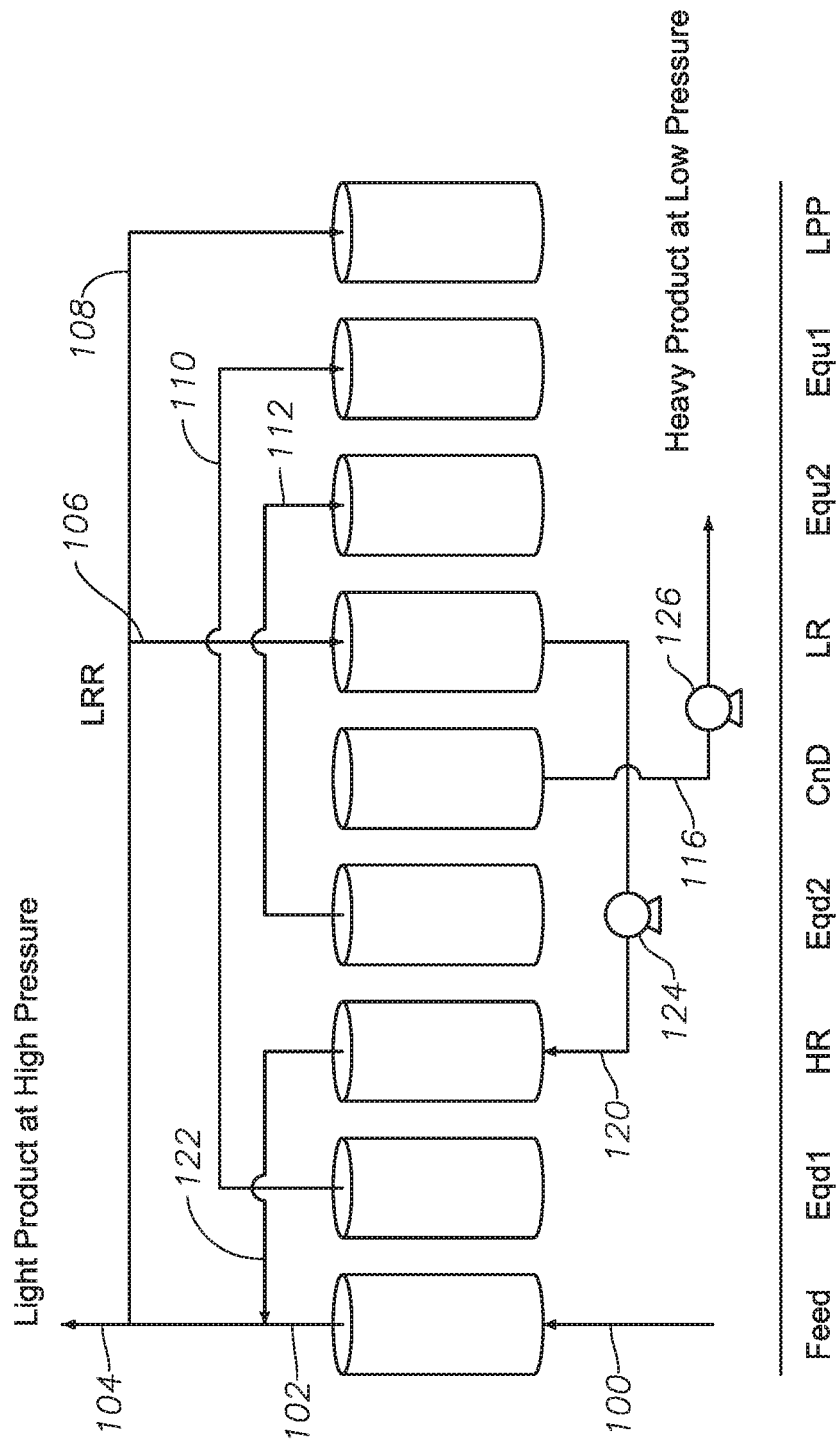
FIG. 5B shows a graphic representation of the steps occurring in separate beds during a PSA cycle for certain unit steps shown in FIG. 5A.

FIG. 5B shows a graphic representation of the steps in a PSA cycle for certain unit steps in FIG. 5A. FIG. 5B is similar to the configuration of previously labeled figures, with similarly labelled units being the same as that described for previous figures.

Referring now to FIG. 6A, a schematic is provided of an example PSA cycle step schedule using 7 beds to achieve production of a substantially pure methane product, for example suitable for pipeline transport or consumer use, or to achieve production of a substantially pure target molecular weight hydrocarbon separated from other higher molecular weight hydrocarbons. FIG. 6A is similar to the configuration shown in previous figures, with similarly labelled cycle steps meaning the same as that described for previous figures. In other configurations, more or fewer than 6 or 7 beds can be used with or without any number of equalization tanks, where the equalization tanks do not contain adsorbent material, but help reduce the number of required adsorbent beds for a given separation. In addition to countercurrent depressurization, cocurrent depressurization steps also can be utilized.

Figure 6B:
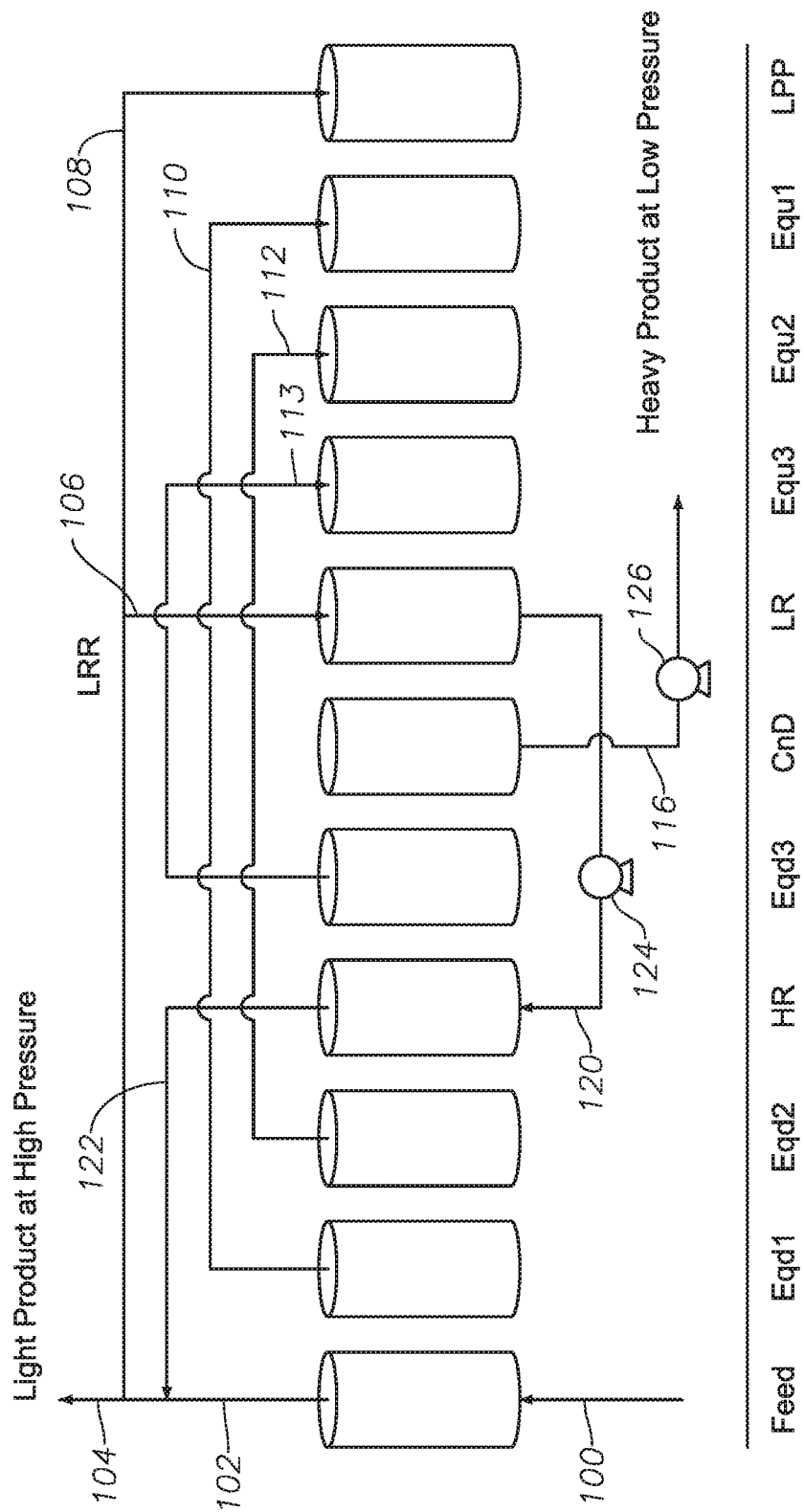
FIG. 6B shows a graphic representation of the steps occurring in separate beds during a PSA cycle for certain unit steps shown in FIG. 6A.

FIG. 6B shows a graphic representation of the steps in a PSA cycle for certain unit steps in FIG. 6A. FIG. 6B is similar to the configuration of previously labeled figures, with similarly labelled units being the same as that described for previous figures. FIG. 6B includes stream 113 which shows a transfer of gas from one bed to another during Eqd3 and Equ3.

Referring now to FIG. 7A, a schematic is provided of an example PSA cycle step schedule using 5 beds to achieve production of a substantially pure methane product, for example suitable for transport in a pipeline or consumer use, or to achieve production of a substantially pure target molecular weight hydrocarbon separated from other higher molecular weight hydrocarbons. FIG. 7A is similar to the configuration shown in previous figures, with similarly labelled cycle steps meaning the same as that described for previous figures. In other configurations, more or fewer than 5 beds can be used with or without any number of equalization tanks, where the equalization tanks do not contain adsorbent material, but help reduce the number of required adsorbent beds for a given separation. In addition to countercurrent depressurization, cocurrent depressurization steps also can be utilized.

Figure 7B:
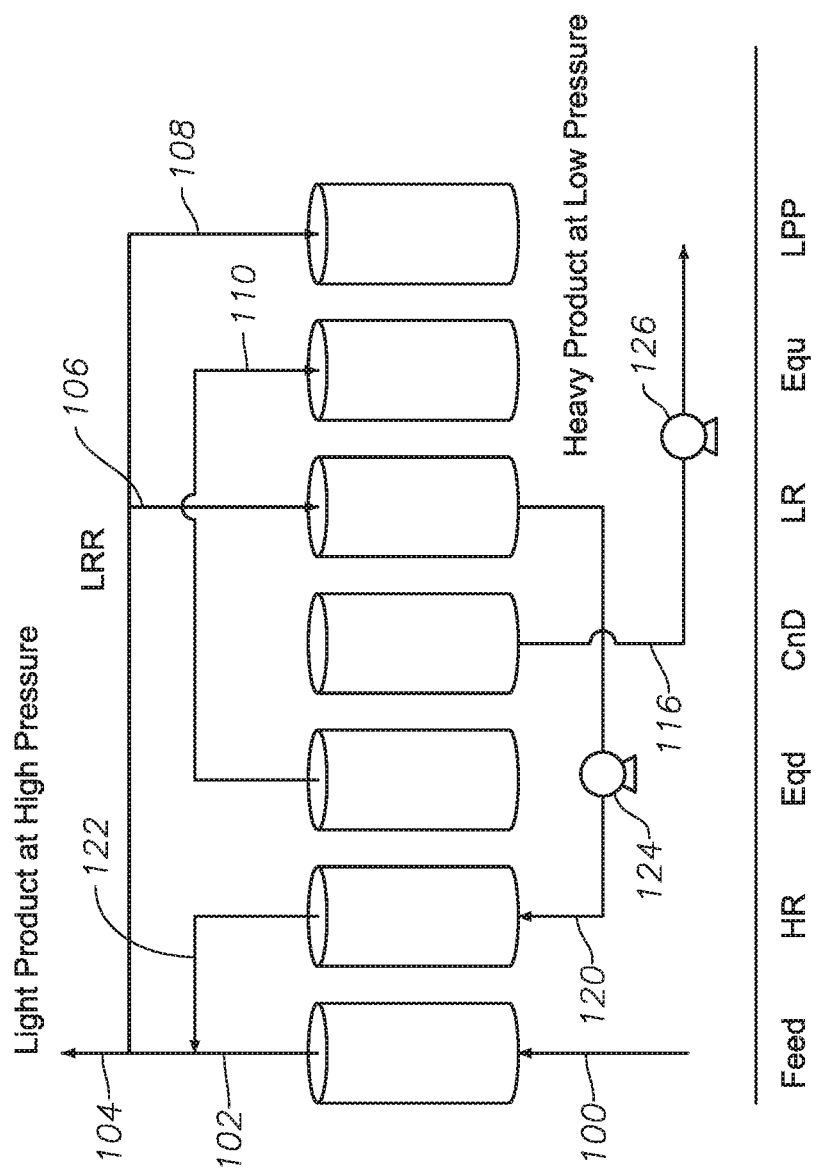
FIG. 7B shows a graphic representation of the steps occurring in separate beds during a PSA cycle for certain unit steps shown in FIG. 7A.

FIG. 7B shows a graphic representation of the steps in a PSA cycle for certain unit steps in FIG. 7A. FIG. 7B is similar to the configuration of previously labeled figures, with similarly labelled units being the same as that described for previous figures.

FIGS. 8-10 show schematics of example PSA cycle step schedules using 6 beds to achieve production of a substantially pure methane product, for example suitable for transport in a pipeline and consumer use, or to achieve production of a substantially pure target molecular weight hydrocarbon separated from other higher molecular weight hydrocarbons. In FIG. 8, a countercurrent depressurization step is followed by an idle step, and the idle step precedes a light reflux step. In FIG. 9, an idle step falls in between LR and Equ2. In FIG. 10, an idle step precedes a CnD step and follows Eqd2. FIGS. 8-10 show the flexibility in design for PSA schedules in embodiments of the present disclosure. While the time of unit steps corresponding to individual cycle steps may be increased or decreased to impact cycle times, idle steps may in some embodiments be necessary to keep gas flows internally consistent between adsorbent beds or tanks.

For example, comparing FIG. 8 to FIG. 1A, the countercurrent depressurization step of FIG. 8 has been decreased to 2 unit steps of time, rather than 3 as shown in FIG. 1A. This may be desired if less heavy product needs to be withdrawn at low pressure during countercurrent depressurization during a separation. Unit steps can be the same amount of time or different amounts of time within a PSA system and between PSA systems, optionally resulting in idle steps, to achieve a desired separation between hydrocarbon components of varying molecular weight.

EXAMPLES

In the examples that follow, one objective is to have a continuous feed PSA cycle, regardless of how that is achieved by dividing up the number of unit steps within a unit block, where the number of unit blocks is equal to the number of beds. In the first example, with the aid of FIGS. 1A and 1B, there are 6 unit blocks because it is a 6-bed PSA cycle. In the first example, there are 2 unit steps in the fraction of the unit block corresponding to one of the 6 beds. This means there are 12 total unit steps in the first example, 2 for each bed. In some PSA systems, every other unit step should be about the same duration within the cycle, for example odd numbered unit steps being substantially the same length of time and even numbered unit steps being substantially the same length of time. Such a schedule can help keep the flow of gases within a multi-bed system internally consistent and balanced. To be a continuous feed PSA cycle, the feed step of each bed should occupy two unit steps, as shown in the first example in FIG. 1A.

One of ordinary skill in the art would understand that the unit blocks could very well include 18 unit steps, i.e., 3 unit steps for each bed, and that the feed step of each bed would then occupy 3 unit steps. The durations of the other cycle steps could occupy just 1 unit step or several unit steps, as shown by the example in FIG. 1A, where, e.g., the feed step occupies 2 unit steps, an EqD step occupies 1 unit step and the CnD step occupies 3 unit steps. The durations of all the other cycle steps relative to the feed step could vary depending on the number of unit steps in a unit block, with the duration of the unit step time having no limitations or restrictions and with the number of unit steps in a unit block having no limitations or restrictions, unless they are imposed by the PSA process design. With these objectives in mind, non-limiting examples are provided below.

Example 1 provides an example 6-bed, 8-cycle step (12 unit step) adsorption bed separation of the components of a raw natural gas stream with an initial feed pressure of 100 psia and 298 K. In other situations, more or fewer adsorption beds could be used, at different temperatures and pressures, and with optional equalization tanks. Example 1 follows the layout shown in FIGS. 1A and 1B. The feed gas composition is shown in Table 1. In Example 1, the unit step time of 60 seconds was used (with 2 unit steps per unit block as described previously), while the cycle step durations in this schedule ranged between 60 seconds and 180 seconds.

TABLE 1

Feed gas composition for Example 1.
Feed Gas Composition

| Component | Component | Mol. fraction |
|---|---|---|
| C1 | Methane | 80.0% |
| C2 | Ethane | 11.0% |
| C3 | Propane | 3.8% |
| C4 | Butane | 1.7% |
| C5+ | Pentane and Heavier | 0.8% |
| $CO_2$ | Carbon Dioxide | 1.8% |
| $N_2$ | Nitrogen | 0.9% |

The example multi-bed PSA process produces a substantially pure methane product stream (sales gas) and also achieves high ethane, propane, and butane recovery in the heavy product stream, as shown in Table 2.

TABLE 2

Light and heavy product streams for Example 1.

| | Heavy Product | | Light Product | |
|---|---|---|---|---|
| Component | Recovery % | Mol. fraction | Recovery % | Mol. fraction |
| C1 | 4.4% | 15.8% | 95.6% | 98.4% |
| C2 | 98.3% | 48.6% | 1.5% | 0.2% |
| C3 | 99.7% | 17.1% | 0.0% | 0.0% |
| C4 | 100.0% | 7.8% | 0.0% | 0.0% |
| C5+ | 100.0% | 3.5% | 0.0% | 0.0% |
| $CO_2$ | 87.4% | 7.1% | 13.3% | 0.3% |
| $N_2$ | 1.9% | 0.1% | 97.0% | 1.1% |

There is flexibility in the PSA process to enable $CO_2$ to be separated in the light product stream alternative to the heavy product stream. For example, Table 3 shows that the $CO_2$ has been mostly separated into the light product, while still achieving high ethane, propane, and butane recovery in the heavy product stream.

TABLE 3

Light and heavy product streams for alternative embodiment of Example 1.

| | Heavy Product | | Light Product | |
|---|---|---|---|---|
| Component | Recovery % | Mol. fraction | Recovery % | Mol. fraction |
| C1 | 2.2% | 9.4% | 97.8% | 96.1% |
| C2 | 93.5% | 55.6% | 6.0% | 0.8% |

TABLE 3-continued

Light and heavy product streams for alternative embodiment of Example 1.

| | Heavy Product | | Light Product | |
|---|---|---|---|---|
| Component | Recovery % | Mol. fraction | Recovery % | Mol. fraction |
| C3 | 98.9% | 20.3% | 0.0% | 0.0% |
| C4 | 100.0% | 9.4% | 0.0% | 0.0% |
| C5+ | 100.0% | 4.2% | 0.0% | 0.0% |
| $CO_2$ | 10.9% | 1.1% | 89.7% | 2.0% |
| $N_2$ | 2.0% | 0.1% | 97.9% | 1.1% |

Example 2 provides an example 7-bed, 10-cycle step (14 unit step) adsorption bed separation of the components of a raw natural gas stream with an initial feed pressure of 500 psia and 298 K. In other situations, more or fewer adsorption beds could be used, at different temperatures and pressures, and with optional equalization tanks. Example 2 follows the layout shown in FIGS. 2A and 2B. The feed gas composition is shown in Table 4. In this example, the unit step time of 60 seconds was used, while the cycle step durations in this schedule ranged between 60 seconds and 180 seconds.

TABLE 4

Feed gas composition for Example 2.
Feed Gas Composition

| Component | Component | Mol. fraction |
|---|---|---|
| C1 | Methane | 80.0% |
| C2 | Ethane | 11.0% |
| C3 | Propane | 3.8% |
| C4 | Butane | 1.7% |
| C5+ | Pentane and Heavier | 0.8% |
| $CO_2$ | Carbon Dioxide | 1.8% |
| $N_2$ | Nitrogen | 0.9% |

The example multi-bed PSA process produces a substantially pure methane product stream (sales gas) and also achieves high ethane, propane, and butane recovery in the heavy product stream, as shown in Table 5.

TABLE 5

Light and heavy product streams for Example 2.

| | Heavy Product | | Light Product | |
|---|---|---|---|---|
| Component | Recovery % | Mol. fraction | Recovery % | Mol. fraction |
| C1 | 2.2% | 8.6% | 97.0% | 98.3% |
| C2 | 98.5% | 52.9% | 1.5% | 0.2% |
| C3 | 99.3% | 18.4% | 0.7% | 0.0% |
| C4 | 100.0% | 8.5% | 0.0% | 0.0% |
| C5+ | 100.0% | 3.8% | 0.0% | 0.0% |
| $CO_2$ | 88.5% | 7.8% | 13.3% | 0.3% |
| $N_2$ | 1.9% | 0.1% | 98.0% | 1.1% |

There is flexibility in the PSA process to enable $CO_2$ to be separated in the light product stream alternative to the heavy product stream, as shown in Table 6.

TABLE 6

Light and heavy product streams for alternative embodiment of Example 2.

| | Heavy Product | | Light Product | |
|---|---|---|---|---|
| Component | Recovery % | Mol. fraction | Recovery % | Mol. fraction |
| C1 | 2.0% | 8.8% | 97.8% | 95.9% |
| C2 | 94.3% | 56.8% | 6.0% | 0.8% |
| C3 | 95.0% | 19.8% | 5.0% | 0.2% |
| C4 | 100.0% | 9.5% | 0.0% | 0.0% |
| C5+ | 100.0% | 4.2% | 0.0% | 0.0% |
| $CO_2$ | 7.5% | 0.7% | 91.7% | 2.0% |
| $N_2$ | 2.0% | 0.1% | 97.9% | 1.1% |

Example 3 provides an example 7-bed, 10-cycle step (14 unit step) adsorption bed separation of the components of a raw natural gas stream with an initial feed pressure of 500 psia and temperatures of 278 K, 298 K, and 318 K. In other situations, more or fewer adsorption beds could be used, at different temperatures and pressures, and with optional equalization tanks. Example 3 follows the layout shown in FIGS. 2A and 2B. The feed gas composition is shown in Table 7.

TABLE 7

Feed gas composition for Example 3.
Feed Gas Composition

| Component | Component | Mol. fraction |
|---|---|---|
| C1 | Methane | 80.0% |
| C2 | Ethane | 11.0% |
| C3 | Propane | 3.8% |
| C4 | Butane | 1.7% |
| C5+ | Pentane and Heavier | 0.8% |
| $CO_2$ | Carbon Dioxide | 1.8% |
| $N_2$ | Nitrogen | 0.9% |

A multi-bed PSA process can achieve high ethane, propane, and butane recovery under a wide range of feed gas temperatures (from about 278 K to about 318 K), as shown in Table 8.

TABLE 8

Heavy product streams for alternative embodiments of Example 3.

| | 278 K Heavy Product | | 298 K Heavy Product | | 318 K Heavy Product | |
|---|---|---|---|---|---|---|
| Component | Recovery % | Mol. fraction | Recovery % | Mol. fraction | Recovery % | Mol. fraction |
| C1 | 2.0% | 7.9% | 2.2% | 8.6% | 2.3% | 9.2% |
| C2 | 99.3% | 54.6% | 98.5% | 52.9% | 98.8% | 53.1% |
| C3 | 96.5% | 18.3% | 99.3% | 18.4% | 99.8% | 18.5% |
| C4 | 99.8% | 8.7% | 100.0% | 8.5% | 100.0% | 8.5% |
| C5+ | 100.0% | 3.8% | 100.0% | 3.8% | 100.0% | 3.8% |
| $CO_2$ | 73.6% | 6.6% | 88.5% | 7.8% | 77.6% | 6.8% |
| $N_2$ | 1.0% | 0.0% | 1.9% | 0.1% | 1.6% | 0.1% |

In further separations of the "heavy" product carried out after the separation of methane from raw natural gas, "C2" (ethane) can be separated from C3, C4, C5+, $CO_2$, and $N_2$. Using multiple PSA units or trains fluidly coupled together, each having one or more adsorbent beds, each component of raw natural gas can be separated.

Example 4 provides an example 6-bed, 9-cycle step (12 unit step) adsorption bed separation of the components of a raw natural gas stream with an initial feed pressure of no more than 100 psia and no less than 60 psia, but preferably between about 70 psia and about 80 psia with the feed temperatures between about 278 K to 363 K. The lowest pressure in the process is between about 2.8 psia and about 7 psia. Example 4 follows the layout shown in FIGS. 3A and 3B. The general gas composition range in which this example is applicable is shown in Table 9.

TABLE 9

Feed gas composition range for Example 4.
Feed Gas Composition

| Component | Component | Lower Limit of Mol. % Range | Upper Limit of Mol. % Range |
|---|---|---|---|
| C1 | Methane | 70.0% | 88.0% |
| C2 | Ethane | 5.0% | 14.0% |
| C3 | Propane | 3.0% | 7.0% |
| C4 | Butane | 0.4% | 3.0% |
| C5+ | Pentane and Heavier | 0.3% | 3.0% |
| $CO_2$ | Carbon Dioxide | 0.0% | 3.0% |
| $N_2$ | Nitrogen | 0.0% | 2.0% |

Example 4 provides a multi-bed PSA process where at least about 95% of the C3+ is recovered in the heavy product, and all nitrogen is rejected into the light product with the heavy product gas having no more than 0.5 mol. % of methane. The light product, containing mostly methane, will meet specifications generally accepted to allow for pipeline transportation and/or consumer use.

Subsequently, if further separation of ethane from other non-methane hydrocarbons in the heavy product is desired, then an additional PSA unit comprising the same 6-bed, 9 cycle step process can be coupled to the first PSA unit to enact this additional separation. In other words, the 6 bed PSA system shown in FIGS. 3A and 3B can be repeated in series for subsequent separation of hydrocarbon species heavier than methane. The inlet pressure for the subsequent separation can range from about 30 psia to about 250 psia with the inlet temperature between about 278 K to about 323 K, and the lowest pressure in the system being between about 2.8 and about 7.0 psia. At least 90 mol. % of the C3+ is recovered with the product gas having substantially no $CO_2$, no more than about 0.5 mol. % of methane, and having most of the ethane removed. Table 10 provides a range of gas compositions in which the separation of ethane from other non-methane hydrocarbons is applicable.

TABLE 10

Inlet range of "heavy" gas composition for ethane separation.
Heavy Feed Gas Composition Following Initial Methane Separation

| Component | Component | Lower Limit of Mol. % Range | Upper Limit of Mol. % Range |
|---|---|---|---|
| C1 | Methane | 0.0% | 3.0% |
| C2 | Ethane | 40.0% | 70.0% |
| C3+ | Propane | 15.0% | 60.0% |
| $CO_2$ | Carbon Dioxide | 0.0% | 10.0% |

Table 11 shows the recovery percentage of C3+ after ethane separation.

TABLE 11

C3+ product range after ethane separation.
C3+ Product Composition

| Component | Component | Lower Limit of Mol. % Range | Upper Limit of Mol. % Range |
|---|---|---|---|
| C1 | Methane | 0.0% | 2.0% |
| C2 | Ethane | 0.0% | 0.3% |
| C3+ | Propane and heavier | 90.0% | 99.0% |
| $CO_2$ | Carbon Dioxide | 0.0% | 0.0% |

In Example 4, where 2 series-linked 6-bed separations take place, in both adsorption bed separations, the first for methane separation and the second for ethane separation, the following PSA steps occur: a feed step; a heavy reflux (HR) step; two equalization down steps (Eqd1, Eqd2); a countercurrent depressurization step (CnD); a light reflux step (LR); two equalization up steps (Equ2, Equ1); and a light product pressurization step (LPP). The LRR, shown in FIG. 3B, is the light reflux ratio that represents the fraction of the gas leaving the feed step to be used as feed in the LR step.

Example 5 provides an example of a 7-bed, 10-cycle step (14 unit step) adsorption bed separation and follows the layout shown in FIGS. 4A and 4B. One purpose of this cycle is similar to that of Example 4 (FIGS. 3A and 3B), except that the countercurrent depressurization step is made longer to ensure better regeneration. Similar to Example 4, the purified methane product will meet specifications generally accepted to allow for pipeline transportation. The sequence involves the following PSA steps: a feed step; a heavy reflux step (HR); two equalization down steps (Eqd1, Eqd2); a countercurrent depressurization step (CnD); an idle step (I); a light reflux step (LR); two equalization up steps (Equ2, Equ1); and a light product pressurization step (LPP). The LRR is the light reflux ratio that represents the fraction of the gas leaving the feed step to be used as feed in the LR step.

Example 6 provides an example of a second 6-bed, 9-step PSA cycle and follows the layout shown in FIGS. 5A and 5B. One purpose of this cycle is the same as that of Example 4, for the removal of both methane and $N_2$ and partial removal of both $CO_2$ and ethane from a raw natural gas stream. The range of acceptable gas compositions for separation is the same as Example 4 (Table 9). One difference in inlet conditions, however, between Examples 4 and 6 is that the feed pressure is between about 80 psia and about 200 psia here for Example 6 versus for Example 4 with an initial feed pressure of no more than 100 psia and no less than 60 psia, but preferably between about 70 psia and about 80 psia.

The separation outcome of Example 6 is similar to Examples 4 and 5, and purified methane product that meets pipeline specifications is produced. The sequence involves the following PSA steps: a feed step, a first equalization down step (Eqd1), a heavy reflux step (HR), a second equalization down step (Eqd2), a countercurrent depressurization step (CnD), a light reflux step (LR), two equalization up steps (Equ2, Equ1), and a light product pressurization step (LPP). The LRR is the light reflux ratio that represents the fraction of the gas leaving the feed step to be used as feed in the LR step. The LRR and the light product pressurization stream in a given PSA system or method can vary from about substantially 0% to about substantially 100%, for example about 5%, 10%, 20%, 30%, 40%, 50%, 60%, 70%, 80%, 90%, or 95% of a light product stream produced at high pressure, depending on the desired separation requirements and inlet conditions of a natural gas stream. In certain embodiments exemplified here, the LRR is between about 4% and about 20% of a light product stream produced at high pressure and LPP is about between 4% and about 20% of the of a light product stream produced at high pressure.

Example 7 is an example of a 7-bed, 11-step PSA cycle similar in purpose to Example 6, but is applicable when feed pressure is equal to or greater than 150 psia. Example 7 is represented via FIGS. 6A and 6B. The sequence involves the following PSA steps: feed step; two equalization down steps (Eqd1, Eqd2); a heavy reflux step (HR); a third equalization down step (Eqd3); a countercurrent depressurization step (CnD); a light reflux step (LR); three equalization up steps (Equ3, Equ2, Equ1); and a light product pressurization step (LPP). The LRR is the light reflux ratio that represents the fraction of the gas leaving the feed step to be used as feed in the LR step.

As discussed in Example 4, if the "heavy" products produced in Examples 5, 6 and 7 require subsequent separation of ethane from the other non-methane hydrocarbons purified, then the cycle and sequence presented in Example 4 can be used for further separation purposes. A 6-bed 9-step cycle, from Example 4, will effectively separate ethane from all other hydrocarbons present, so a substantially pure ethane product is produced and a second NGL product meeting commercial specifications that is substantially free from ethane is also produced. The need for this additional separation step may be due to commercial or market considerations or they can be due to vapor pressure considerations. For example, ethane has a much higher vapor pressure than propane and other heavy hydrocarbons, so storage vessels and transportation pipelines for NGLs need to be maintained at much higher pressures if ethane is present in an NGL product. Therefore, there is a distinct advantage in being able to separate hydrocarbons by example systems and methods of the present disclosure, for example to isolate methane and to isolate ethane.

Example 8 is a 5-bed, 7-step PSA cycle represented by FIGS. 7A and 7B. One purpose of this cycle is the same as that of the 6-bed, 9-step PSA cycle shown in Example 4 and generally for the removal of ethane from a stream containing predominantly hydrocarbons greater than methane and is applicable when the feed pressure for the separation is no more than about 30 psia. The sequence involves the following PSA steps: a feed step, a heavy reflux step (HR), an equalization down step (Eqd1), a counter depressurization step (CnD), a light reflux step (LR), an equalization up step (Equ1), and a light product pressurization step (LPP). The LRR is the light reflux ratio that represents the fraction of the gas leaving the feed step to be used as feed in the LR step.

Table 12 shows data for elemental composition for certain porous materials tested, with certain experimental results being displayed in FIGS. 11-42. Data from Tables 12-16 are represented in FIGS. 11-42.

The porous materials may be prepared in various manners. For instance, in some embodiments, the porous materials are prepared by activating an organic polymer precursor or biological material—these biological materials include, without limitation, sawdust, coconut husk, and combinations thereof—in the presence of one or more hydroxide, such as potassium hydroxide. In some embodiments, the temperature of activation is between about 500° C. and 800° C. In some embodiments, the temperature of the activation is between about 700° C. and 800° C. In some embodiments, the precursor materials used to make these porous materials can contain various chemical components, such as oxygen or nitrogen, so that the final porous materials used for adsorption will have elemental/chemical content physically and/or chemically incorporated within.

The following volumetric uptake measurements (sorption and desorption) of all gases by porous materials were performed in an automated Sievert instrument. Samples were initially pre-treated at 130° C. for 1.5 hours under vacuum, and free volume inside a sample cell was determined under helium. Gas uptake experiments were carried out with high-purity, research grade gases at 24° C. Additional experimental results and characterizations of porous materials were obtained using XPS, Fourier-transform infrared spectroscopy (FTIR), Raman spectroscopy, and a BET surface area analyzer. All measured values for gas uptake have been confirmed via volumetric experiments, gravimetric experiments, multiple samples, and multiple cycles of experiments.

TABLE 12

Elemental composition of example porous materials tested for uptake/adsorption of $CO_2$, methane, ethane, and propane.

| Sample Material | Elemental Composition wt. % | | | |
|---|---|---|---|---|
| | Carbon | Oxygen | Sulfur | Nitrogen |
| OPC 500 | 76.66 | 23.34 | 0 | 0 |
| OPC 600 | 83.36 | 13.64 | 0 | 0 |
| OPC 700 | 89.37 | 10.63 | 0 | 0 |
| OPC 750 | 91.01 | 8.99 | 0 | 0 |
| OPC 800 | 91.27 | 8.73 | 0 | 0 |
| BPL | 91.3 | 8.7 | 0 | 0 |
| Activated Charcoal Powder (ACP) | 94.1 | 5.9 | 0 | 0 |
| Asphalt | n/a | n/a | n/a | n/a |
| SPC-2-700 (Sulfur Containing) | 78.89 | 13.73 | 7.37 | 0 |
| NPC (Polyacrylonitrile (PAN)) (Nitrogen Containing) | 84.5 | 6.75 | 0 | 8.75 |

OPC 500, OPC 600, OPC 700, OPC 750, and OPC 800 represent tested porous carbons with oxygen content, where activation of the carbons occurred at 500° C., 600° C., 700° C., 750° C., and 800° C., respectively. BPL represents tested granulated, activated carbon acquired commercially from Calgon Carbon. Activated Charcoal Powder (ACP) represents tested activated charcoal that was commercially acquired from Mallinckrodt Chemicals. Asphalt represents tested asphalt derived from activated porous carbon at 700° C.

SPC-2-700 represents tested sulfur containing activated porous carbon activated at 700° C. NPC represents tested polyacrylonitrile derived porous carbon activated at 600° C. Other adsorbent materials can include polythiophene derived porous carbon activated at about 800° C., polypyrrole derived porous carbon activated at about 500° C., and polypyrrole derived porous carbon activated at about 600° C.

Table 13 shows data for surface area and pore size distribution for certain porous materials tested, with certain results being displayed in FIGS. 11-42.

TABLE 13

Surface area and pore size distribution of example porous materials tested for uptake/adsorption of $CO_2$, methane, ethane, and propane.

| | | Pore Size Distribution | | | | |
|---|---|---|---|---|---|---|
| Sample Material | Surface Area ($m^2/g$) | Volume (Micro) (0-2 nm) ($cm^3/g$) | Volume (Nano) (0-1 nm) ($cm^3/g$) | Volume (Vi) (1-2 nm) ($cm^3/g$) | Volume (Meso) (2-50 nm) ($cm^3/g$) | Total Micro + Meso Pore Volume ($cm^3/g$) |
| OPC 500 | 853 | 0.41 | 0.3 | 0.11 | 0.06 | 0.47 |
| OPC 600 | 1980 | 0.94 | 0.38 | 0.56 | 0.16 | 1.10 |
| OPC 700 | 2700 | 1.18 | 0.32 | 0.86 | 0.32 | 1.50 |
| OPC 750 | 3310 | 1.24 | 0.12 | 1.12 | 0.58 | 1.82 |
| OPC 800 | 3040 | 0.64 | 0.08 | 0.56 | 1.57 | 2.21 |
| BPL | 951 | 0.38 | 0.13 | 0.25 | 0.12 | 0.50 |
| Activated Charcoal Powder (ACP) | 845 | 0.32 | 0.11 | 0.21 | 0.11 | 0.43 |
| Asphalt | 2910 | 1.01 | 0.13 | 0.88 | 0.39 | 1.40 |
| SPC-2-700 (Sulfur Containing) | 2180 | 0.76 | 0.16 | 0.6 | 0.35 | 1.11 |
| NPC (Polyacrylonitrile (PAN)) (Nitrogen Containing) | 1410 | 0.68 | 0.2 | 0.48 | 0.6 | 1.28 |

Table 14 shows data for $CO_2$, methane, ethane, and propane uptake at 1 bar for certain porous materials tested, with certain results being displayed in FIGS. 35-38.

TABLE 14

$CO_2$, methane, ethane, and propane uptake at 1 bar for example porous materials tested for uptake/adsorption.

| | Uptake at 1 bar pressure | | | |
|---|---|---|---|---|
| Sample Material | $CO_2$ (mmol/g) | Methane (mmol/g) | Ethane (mmol/g) | Propane (mmol/g) |
| OPC 500 | 1.91 | 0.6 | 3.22 | 2.91 |
| OPC 600 | 2.02 | 0.68 | 6.05 | 6.58 |
| OPC 700 | 1.48 | 0.7 | 5.97 | 8.46 |
| OPC 750 | 2.65 | 0.66 | 6.81 | 9.57 |
| OPC 800 | 1.2 | 0.76 | 4.56 | 5.2 |
| BPL | 1.5 | 0.45 | 2.77 | 2.85 |
| Activated Charcoal Powder (ACP) | 2.03 | 0.83 | 3.24 | 3.77 |
| Asphalt | 1.74 | 0.72 | n/a | 7.78 |
| SPC-2-700 (Sulfur Containing) | 1.46 | 0.71 | 4.14 | 4.8 |
| NPC (Polyacrylonitrile (PAN)) (Nitrogen Containing) | 2.32 | 0.84 | 2.62 | 3.78 |

Table 15 shows data for $CO_2$, methane, ethane, and propane uptake at 5 bar for certain porous materials tested, with certain results being displayed in FIGS. 23-34.

TABLE 15

$CO_2$, methane, ethane, and propane uptake at 5 bar for example porous materials tested for uptake/adsorption.

| | Uptake at 5 bar pressure | | | |
|---|---|---|---|---|
| Sample Material | $CO_2$ (mmol/g) | Methane (mmol/g) | Ethane (mmol/g) | Propane (mmol/g) |
| OPC 500 | 5.59 | 1.96 | 4.18 | 3.89 |
| OPC 600 | 7.64 | 3.06 | 8.95 | 8.63 |
| OPC 700 | 6.92 | 2.903 | 11.27 | 12.95 |
| OPC 750 | 8.93 | 2.98 | 12.013 | 15.098 |
| OPC 800 | 5.63 | 3.088 | 9.32 | 7.84 |
| BPL | 4.52 | 1.96 | 4.33 | 4.45 |
| Activated Charcoal Powder (ACP) | 4.84 | 3.15 | 4.59 | 5.53 |
| Asphalt | 7.56 | 3.05 | n/a | 11.98 |
| SPC-2-700 (Sulfur Containing) | 5.6 | 2.69 | 8.077 | 8.41 |
| NPC (Polyacrylonitrile (PAN)) (Nitrogen Containing) | 6.1 | 2.83 | 3.94 | 6.75 |

Table 16 shows data for $CO_2$, methane, ethane, and propane uptake at 9 bar for certain porous materials tested, with certain results being displayed in FIGS. 11-22.

TABLE 16

$CO_2$, methane, ethane, and propane uptake at 9 bar for example porous materials tested for uptake/adsorption.

| | Uptake at 9 bar pressure | | | |
|---|---|---|---|---|
| Sample Material | $CO_2$ (mmol/g) | Methane (mmol/g) | Ethane (mmol/g) | Propane (mmol/g) |
| OPC 500 | 6.65 | 2.4 | 4.6 | 5 |
| OPC 600 | 10.91 | 4.4 | 9.62 | 10.55 |
| OPC 700 | 11.72 | 4.34 | 13.41 | 15.41 |
| OPC 750 | 13.01 | 4.56 | 14.85 | 17.24 |
| OPC 800 | 9.01 | 4.43 | 10.8 | 9.14 |
| BPL | 5.8 | 3 | 5.04 | 5.5 |
| Activated Charcoal Powder (ACP) | 6 | 4.09 | 5.06 | 7.25 |
| Asphalt | 11.7 | 4.492 | n/a | 14.25 |
| SPC-2-700 (Sulfur Containing) | 8.1 | 3.88 | 9.9 | 10.3 |
| NPC (Polyacrylonitrile (PAN)) (Nitrogen Containing) | 7.83 | 3.91 | 4.12 | 9.1 |

Figure 11:
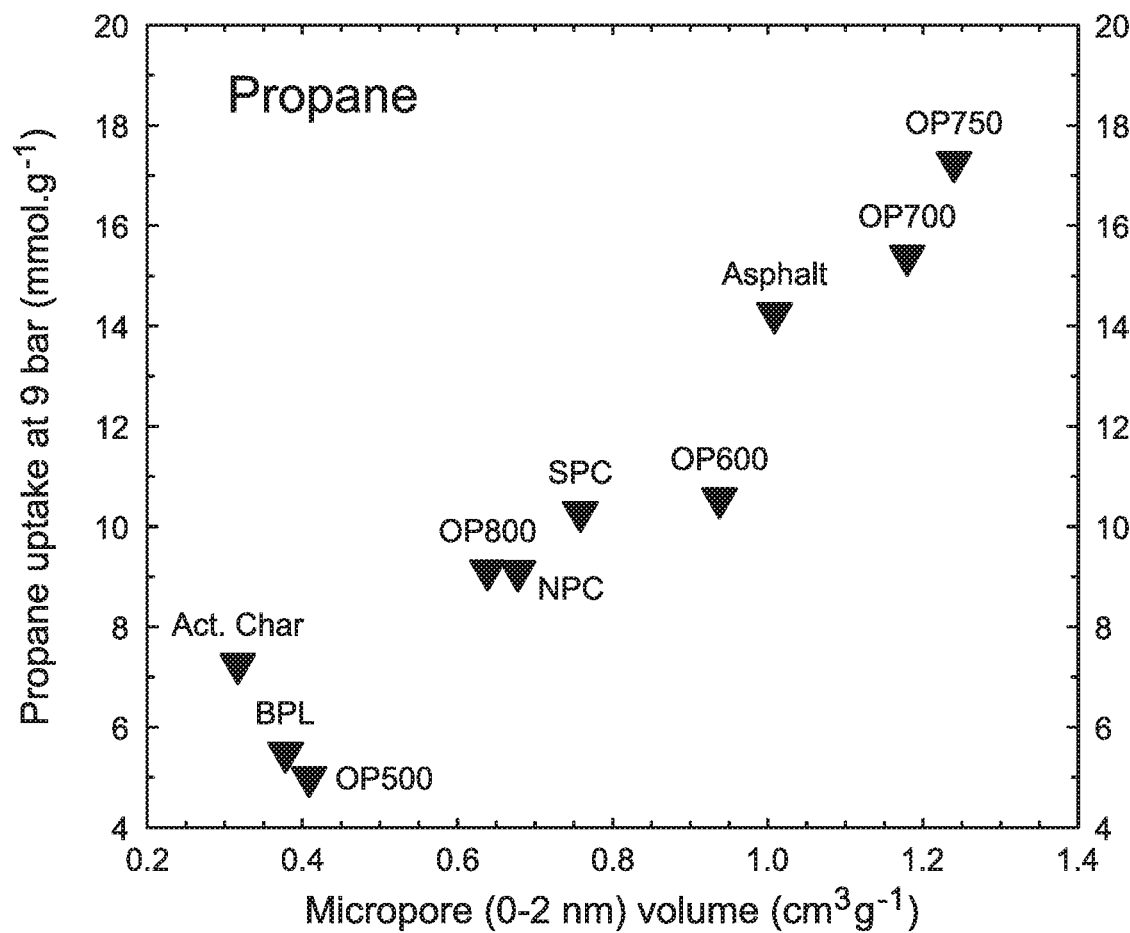
FIG. 11 is a graph showing increased propane uptake at 9 bar pressure for a variety of microporous materials at increasing pore volumes.
Figure 12:
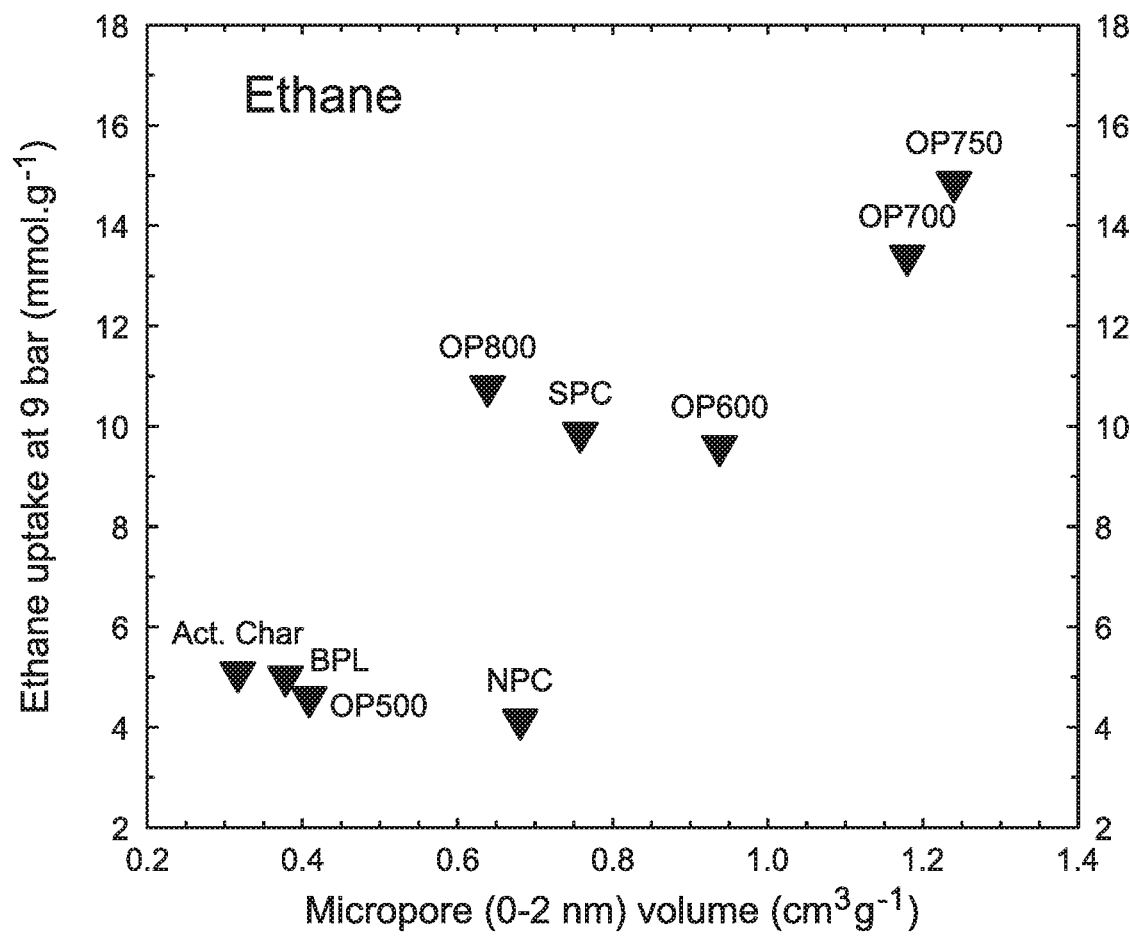
FIG. 12 is a graph showing increased ethane uptake at 9 bar pressure for a variety of microporous materials at increasing pore volumes.
Figure 13:
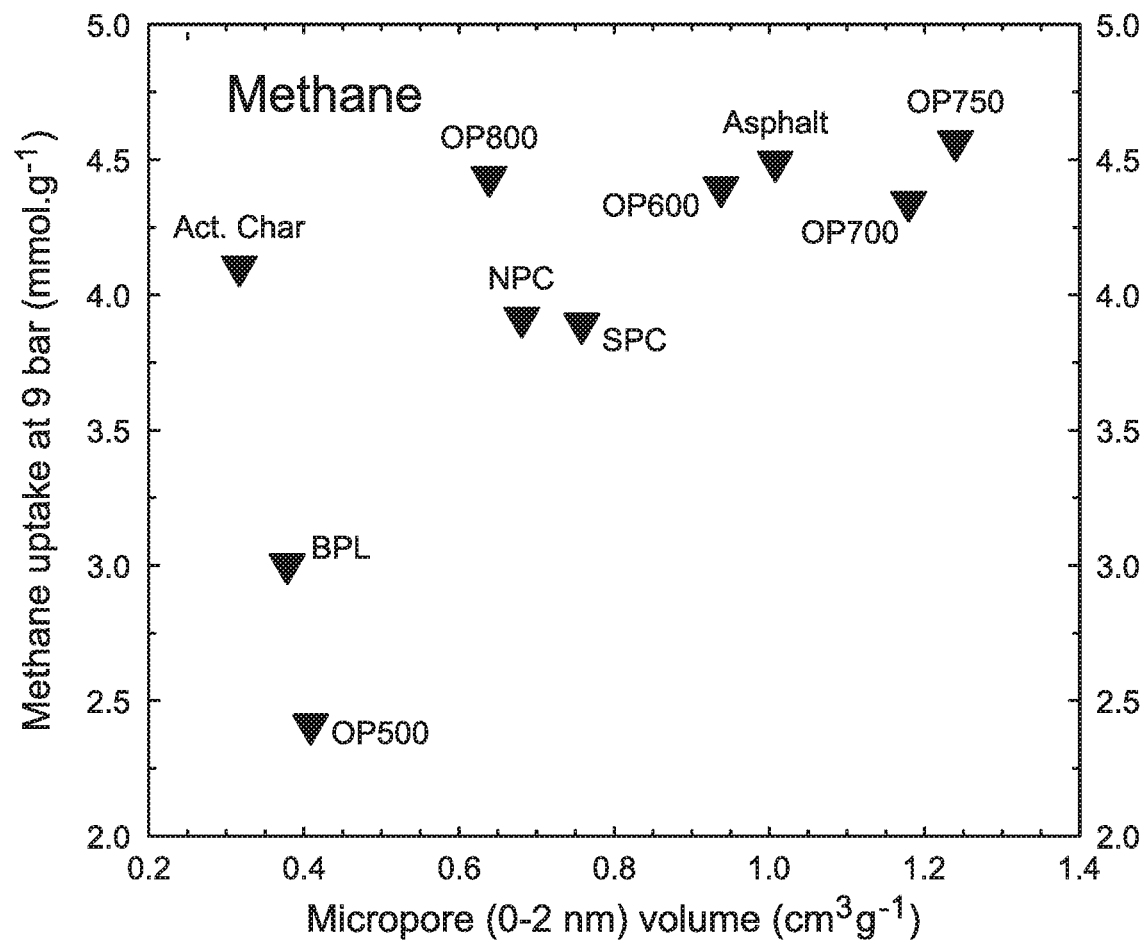
FIG. 13 is a graph showing relatively stable methane uptake at 9 bar pressure for a variety of microporous materials at increasing pore volumes.
Figure 14:
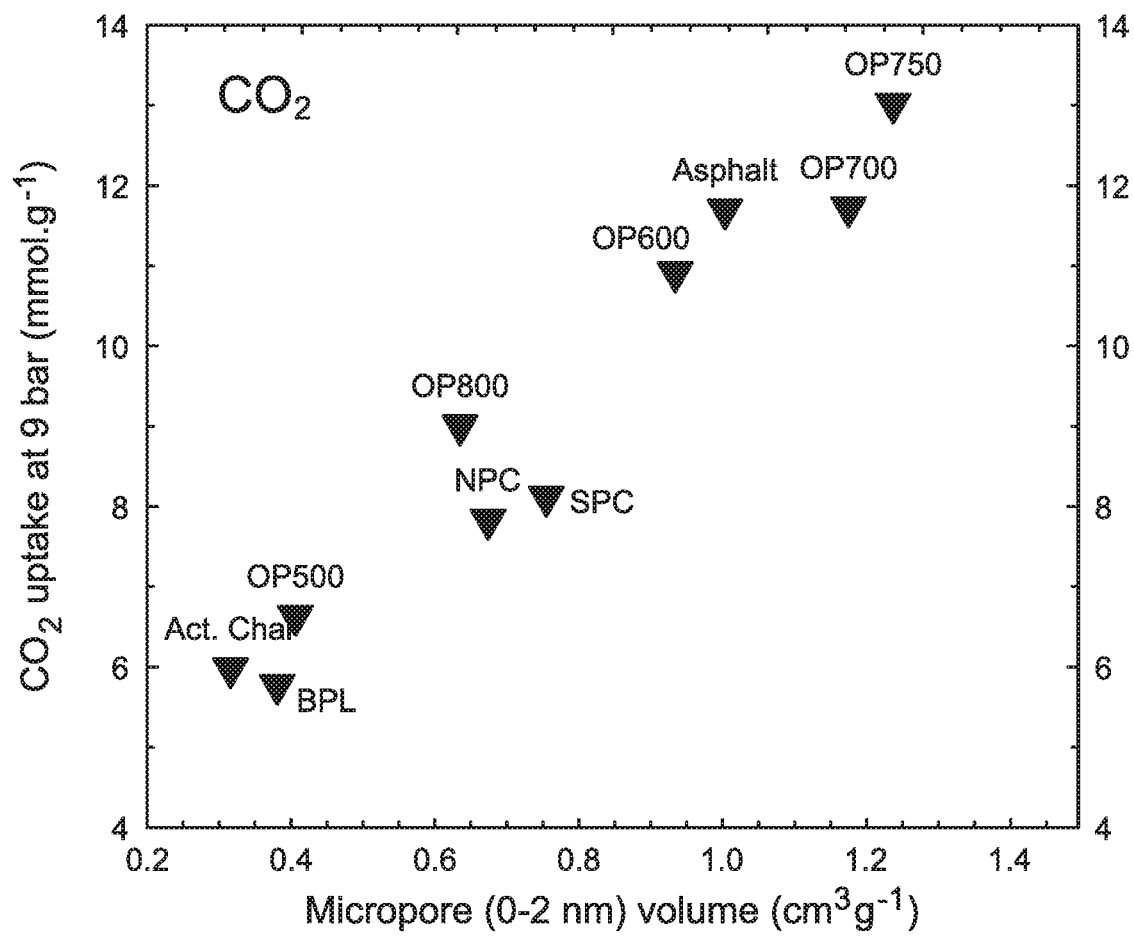
FIG. 14 is a graph showing increased $CO_2$ uptake at 9 bar pressure for a variety of microporous materials at increasing pore volumes.

Referring now to FIGS. 11-14, there is strong correlation between microporosity and gas uptake at 9 bar, especially for $CO_2$ and propane, where increasing microporosity leads to better uptake/adsorption of these gases. For methane, there is some initial uptake enhancement with greater microporosity, but then there is no additional gains in uptake of selectivity due to microporosity, above about 0.5 cm$^3$/g. FIG. 11 is a graph showing increased propane uptake at 9 bar pressure for a variety of microporous materials at increasing pore volumes. FIG. 12 is a graph showing increased ethane uptake at 9 bar pressure for a variety of microporous materials at increasing pore volumes. FIG. 13 is a graph showing increased methane uptake at 9 bar pressure for a variety of microporous materials at increasing pore volumes. FIG. 14 is a graph showing increased $CO_2$ uptake at 9 bar pressure for a variety of microporous materials at increasing pore volumes.

Figure 15:
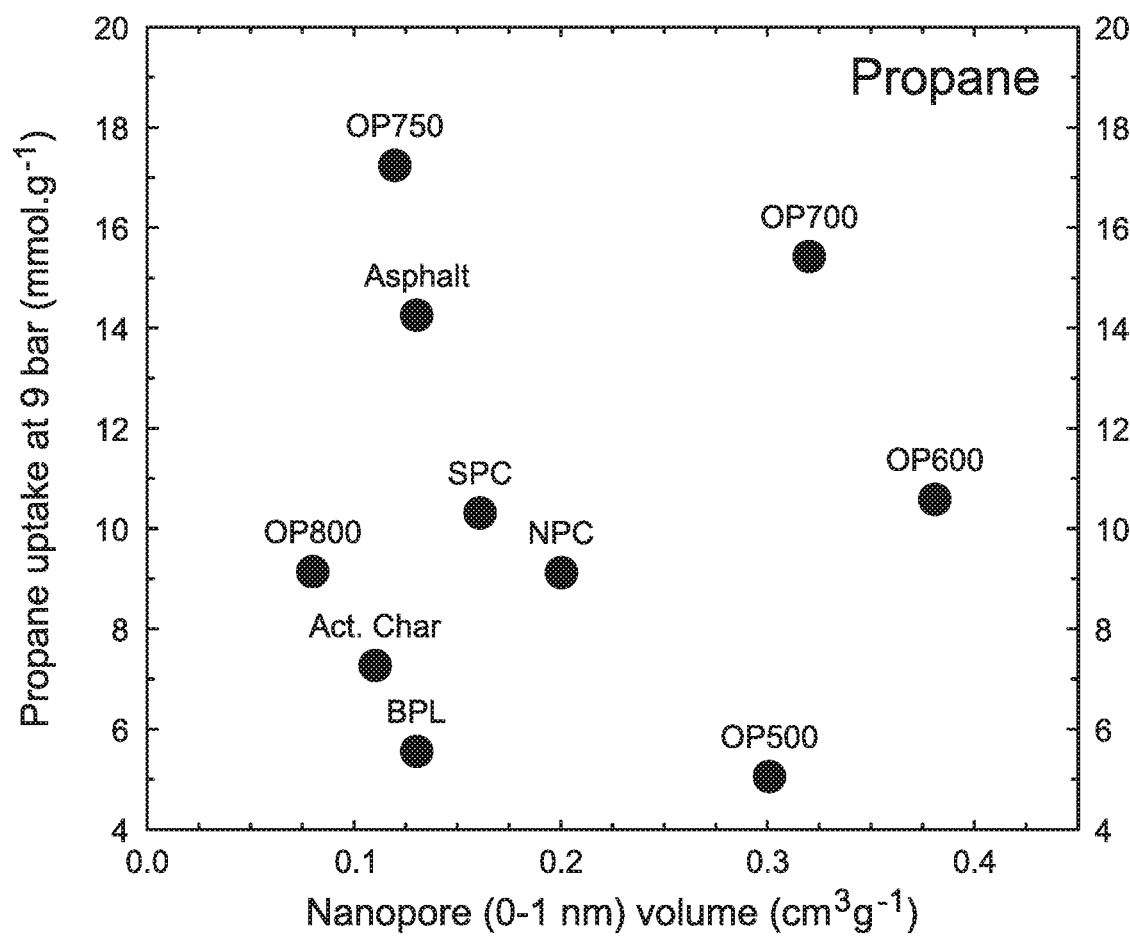
FIG. 15 is a graph showing propane uptake at 9 bar pressure for a variety of nanoporous materials at increasing pore volumes.
Figure 16:
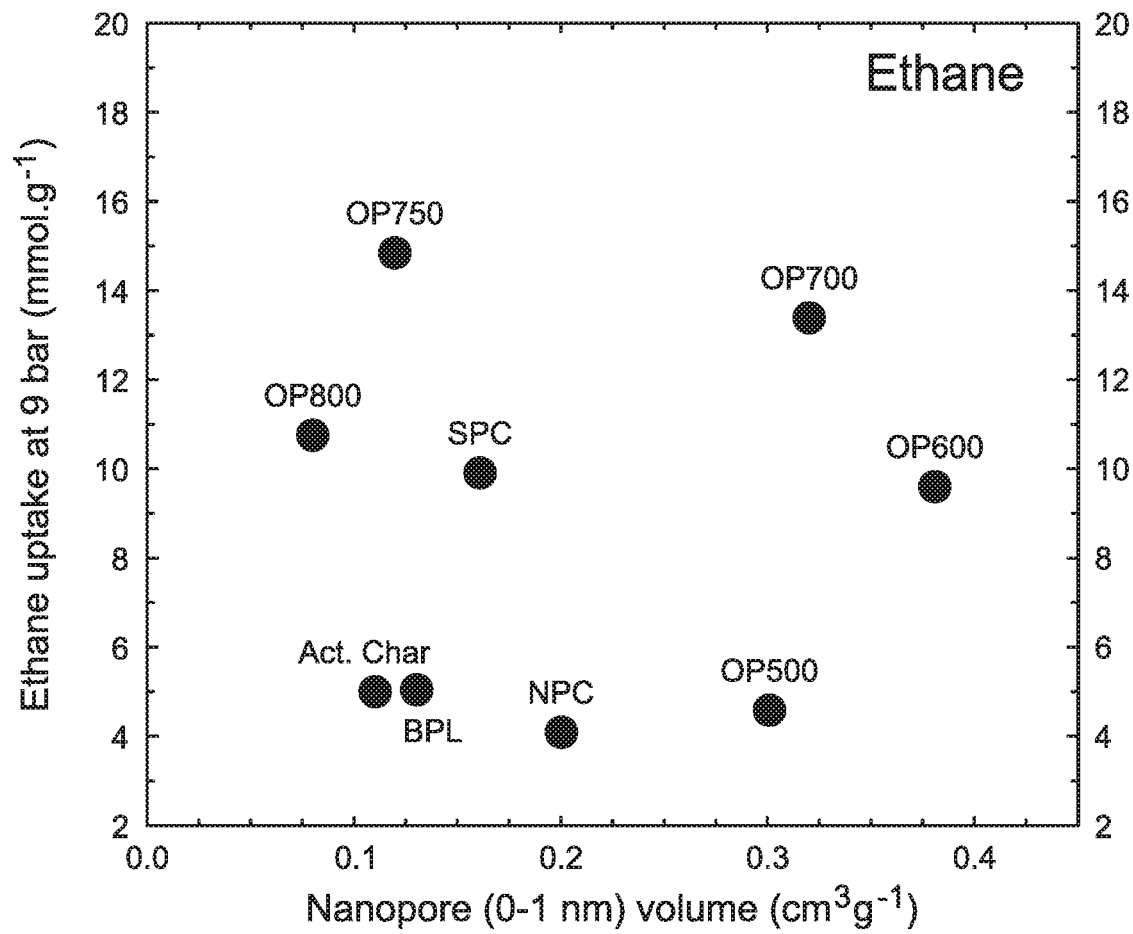
FIG. 16 is a graph showing ethane uptake at 9 bar pressure for a variety of nanoporous materials at increasing pore volumes.
Figure 17:
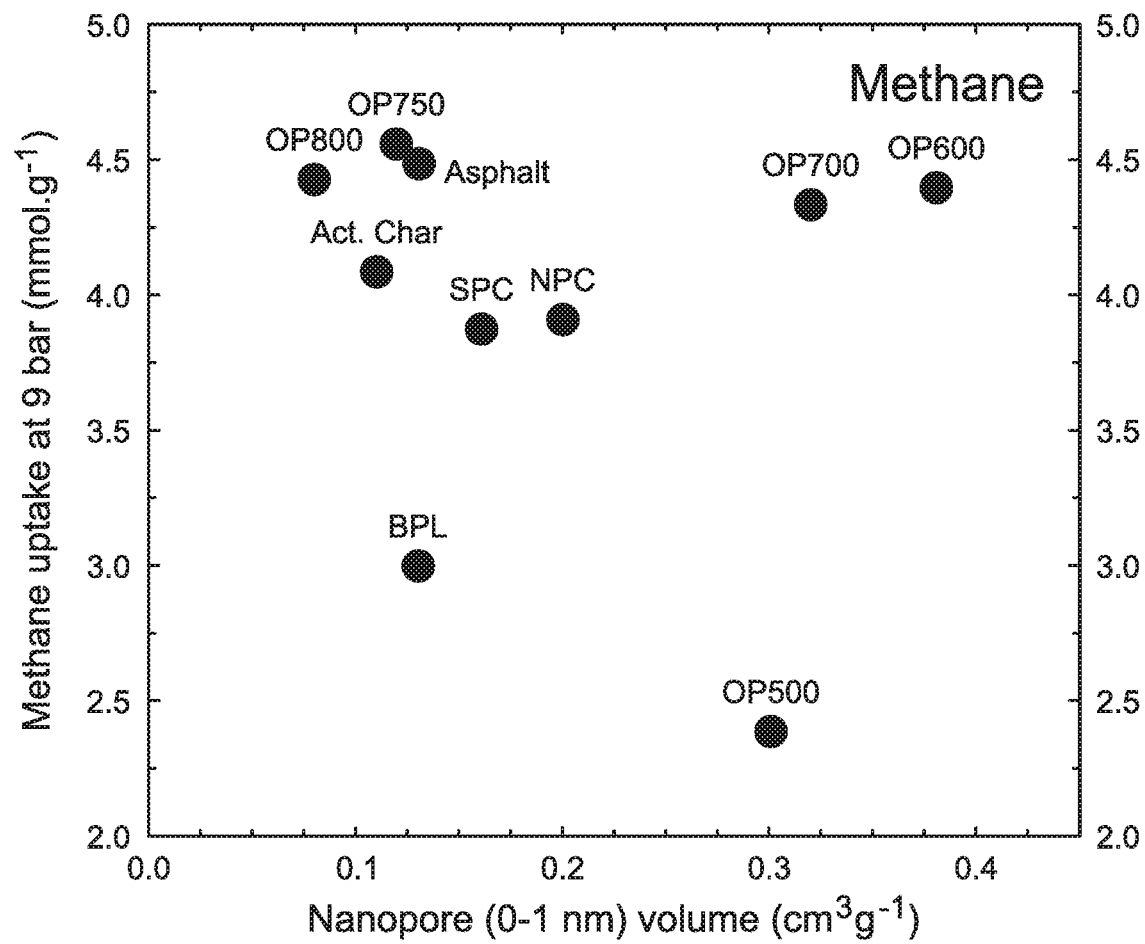
FIG. 17 is a graph showing methane uptake at 9 bar pressure for a variety of nanoporous materials at increasing pore volumes.
Figure 18:
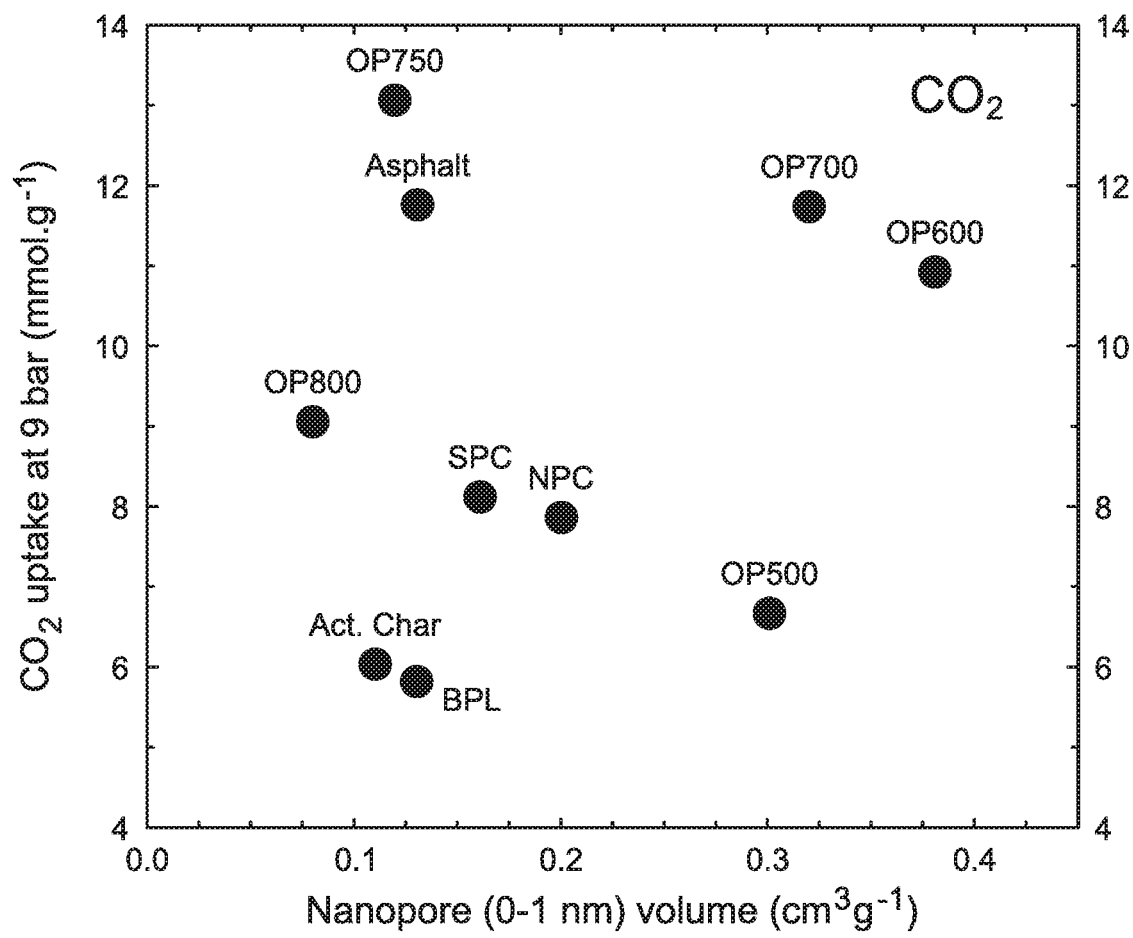
FIG. 18 is a graph showing $CO_2$ uptake at 9 bar pressure for a variety of nanoporous materials at increasing pore volumes.

Referring now to FIGS. 15-18, for nanoporous materials with nanopores below about 1 nm, there is little to no correlation between increased nanoporosity volume and enhanced uptake. FIG. 15 is a graph showing propane uptake at 9 bar pressure for a variety of nanoporous materials at increasing pore volumes. FIG. 16 is a graph showing ethane uptake at 9 bar pressure for a variety of nanoporous materials at increasing pore volumes. FIG. 17 is a graph showing methane uptake at 9 bar pressure for a variety of nanoporous materials at increasing pore volumes. FIG. 18 is a graph showing $CO_2$ uptake at 9 bar pressure for a variety of nanoporous materials at increasing pore volumes.

Figure 19:
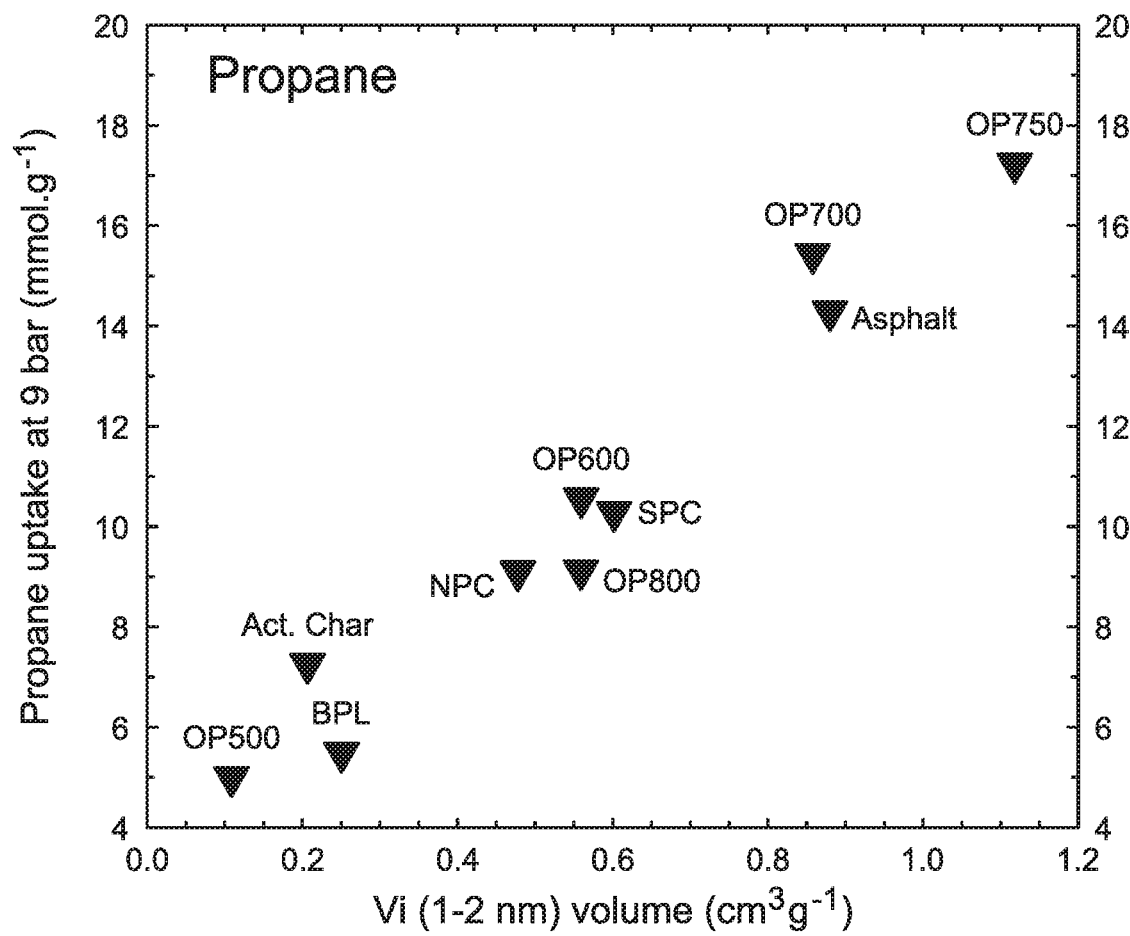
FIG. 19 is a graph showing increased propane uptake at 9 bar pressure for a variety of microporous materials at increasing pore volumes.
Figure 20:
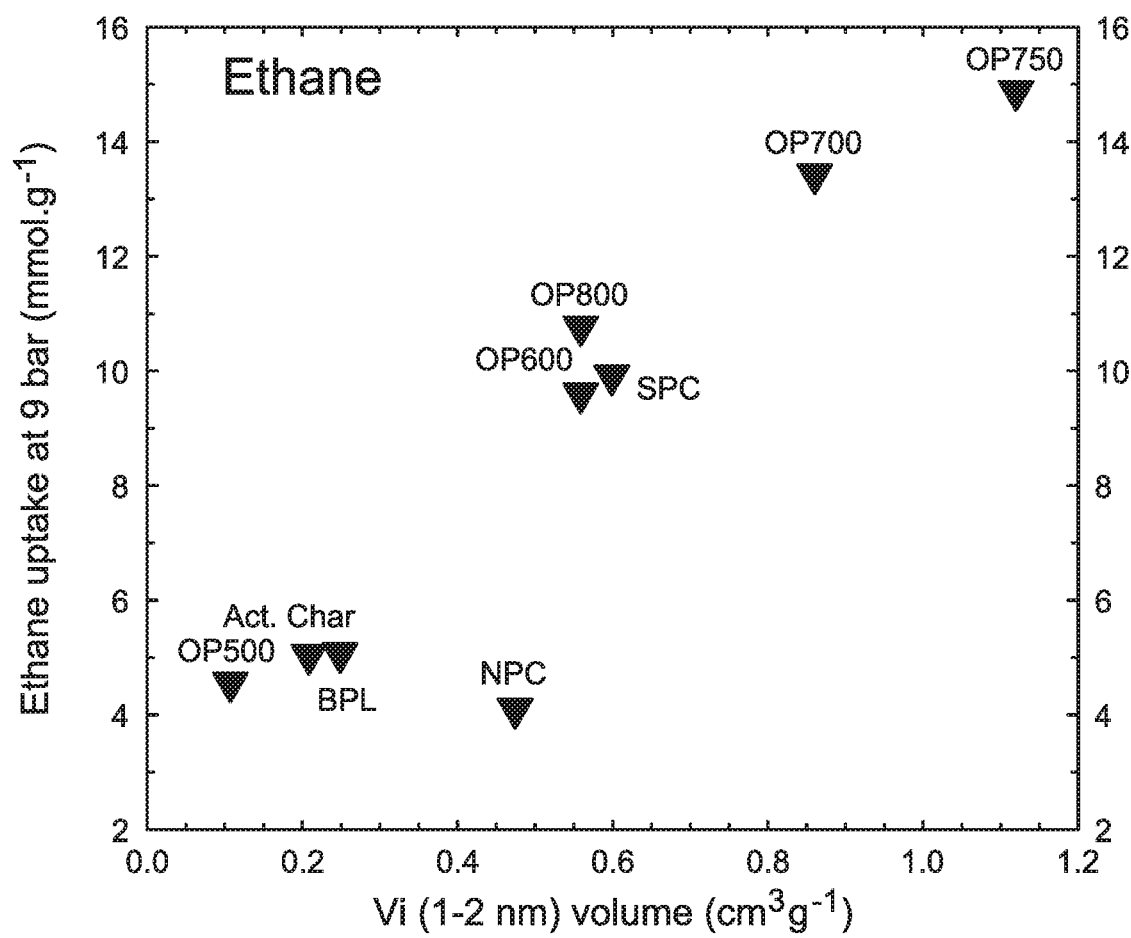
FIG. 20 is a graph showing increased ethane uptake at 9 bar pressure for a variety of microporous materials at increasing pore volumes.
Figure 21:
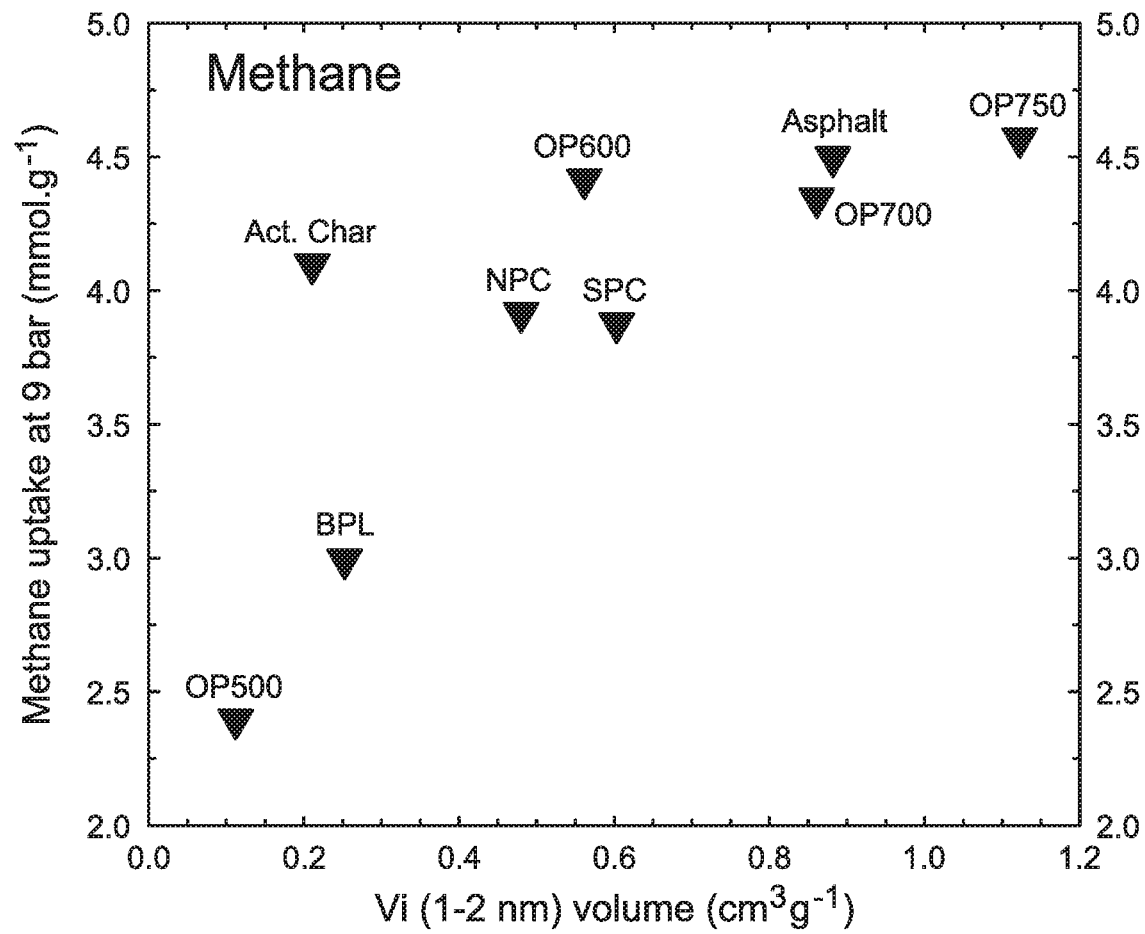
FIG. 21 is a graph showing relatively stable methane uptake at 9 bar pressure for a variety of microporous materials at increasing pore volumes.
Figure 22:
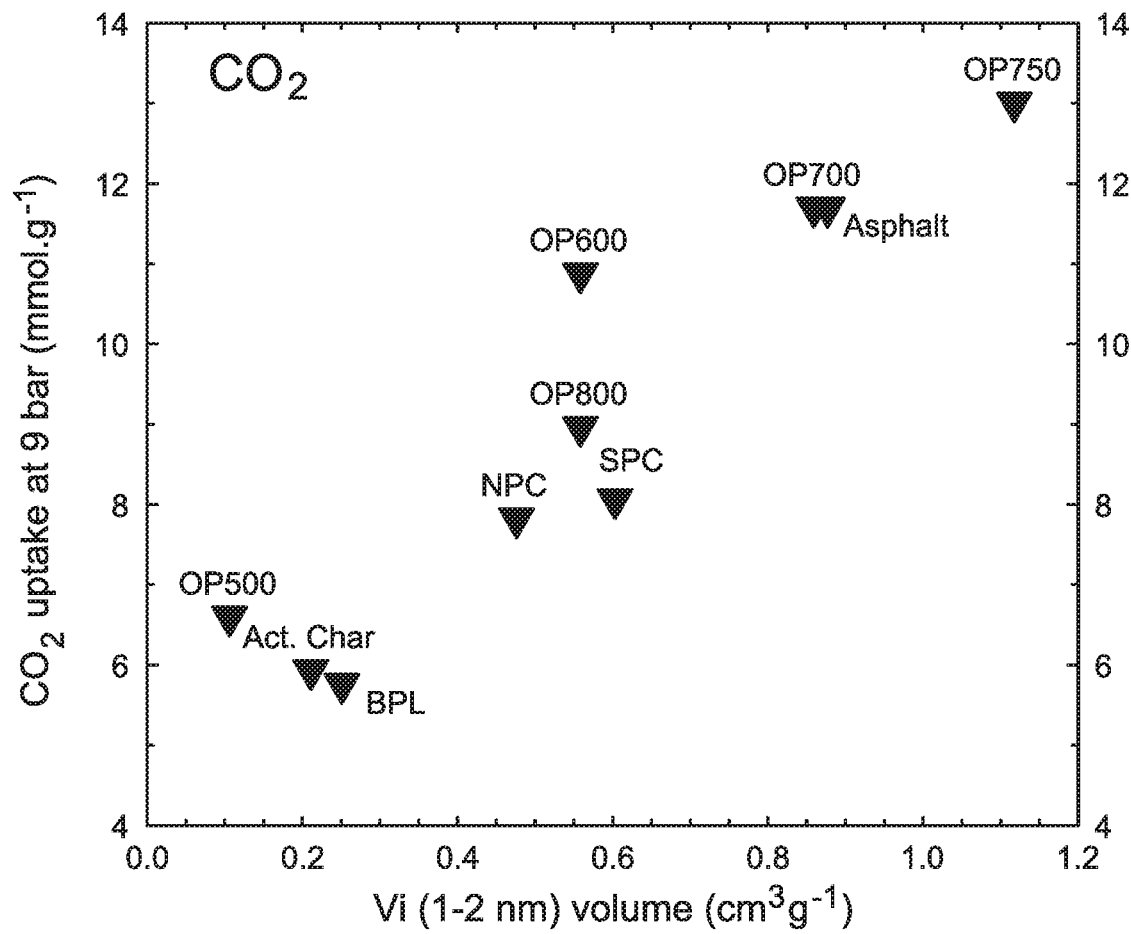
FIG. 22 is a graph showing increased $CO_2$ uptake at 9 bar pressure for a variety of microporous materials at increasing pore volumes.

Referring now to FIGS. 19-22, a correlation exists between about 1 nm and about 2 nm pores, where there is a correlation between increased pore volume with gas uptake. FIG. 19 is a graph showing increased propane uptake at 9 bar pressure for a variety of microporous materials at increasing pore volumes. FIG. 20 is a graph showing increased ethane uptake at 9 bar pressure for a variety of microporous materials at increasing pore volumes. FIG. 21 is a graph showing relatively stable methane uptake at 9 bar pressure for a variety of microporous materials at increasing pore volumes. FIG. 22 is a graph showing increased $CO_2$ uptake at 9 bar pressure for a variety of microporous materials at increasing pore volumes.

Figure 23:
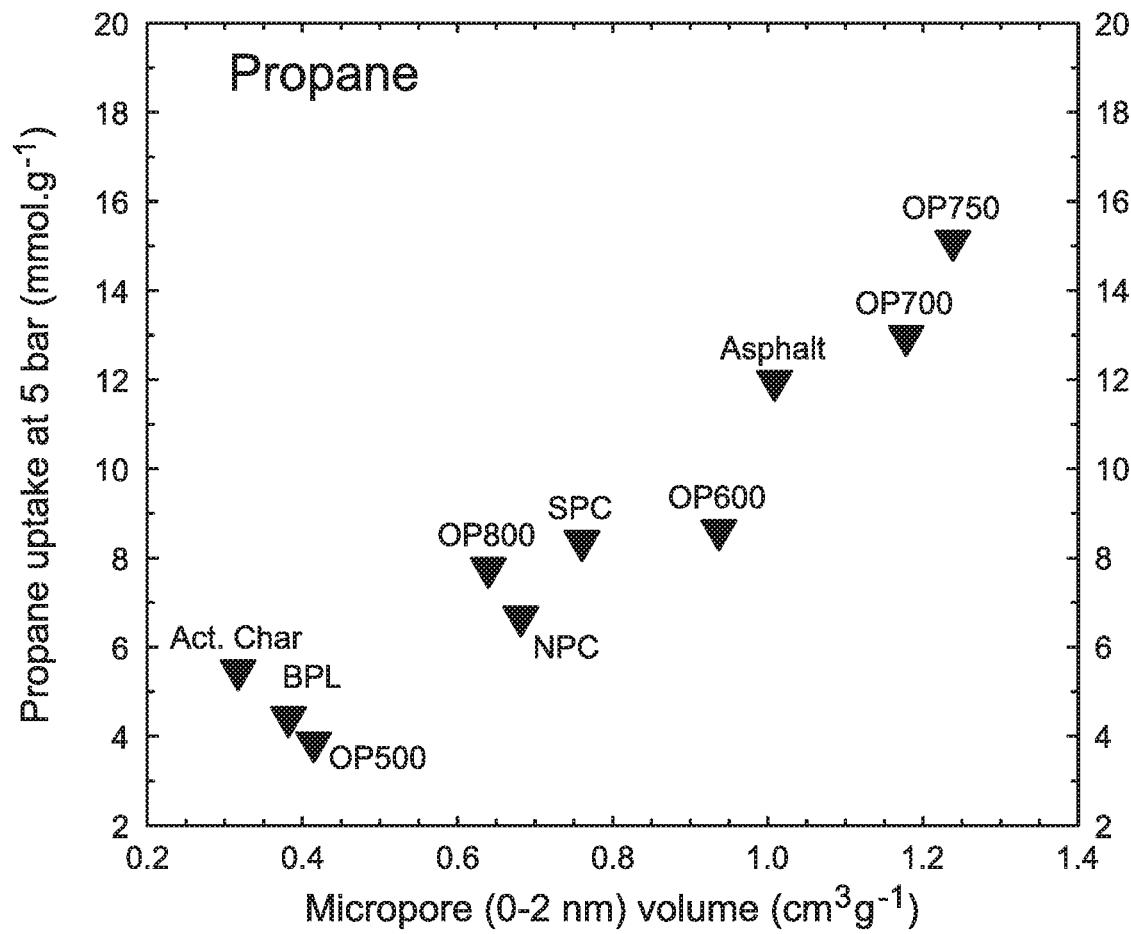
FIG. 23 is a graph showing increased propane uptake at 5 bar pressure for a variety of microporous materials at increasing pore volumes.
Figure 24:
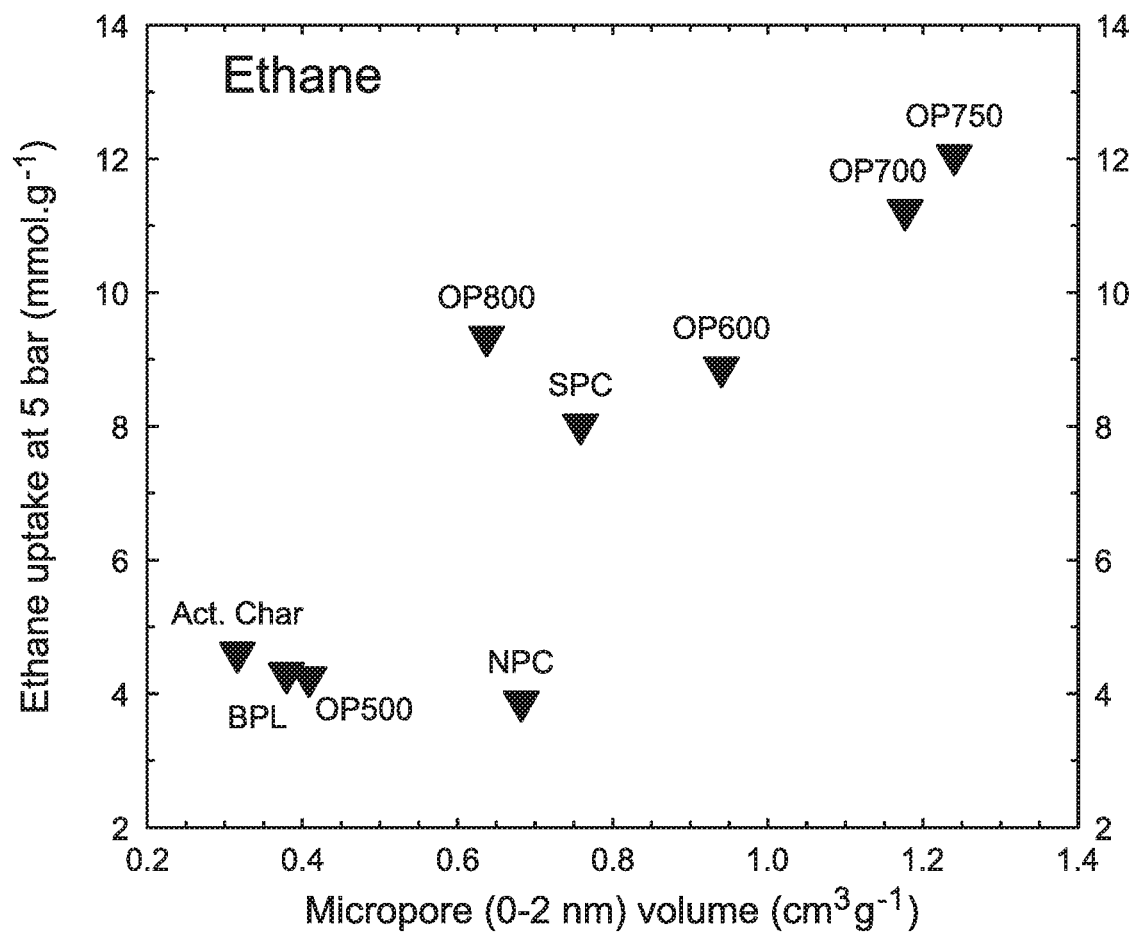
FIG. 24 is a graph showing increased ethane uptake at 5 bar pressure for a variety of microporous materials at increasing pore volumes.
Figure 25:
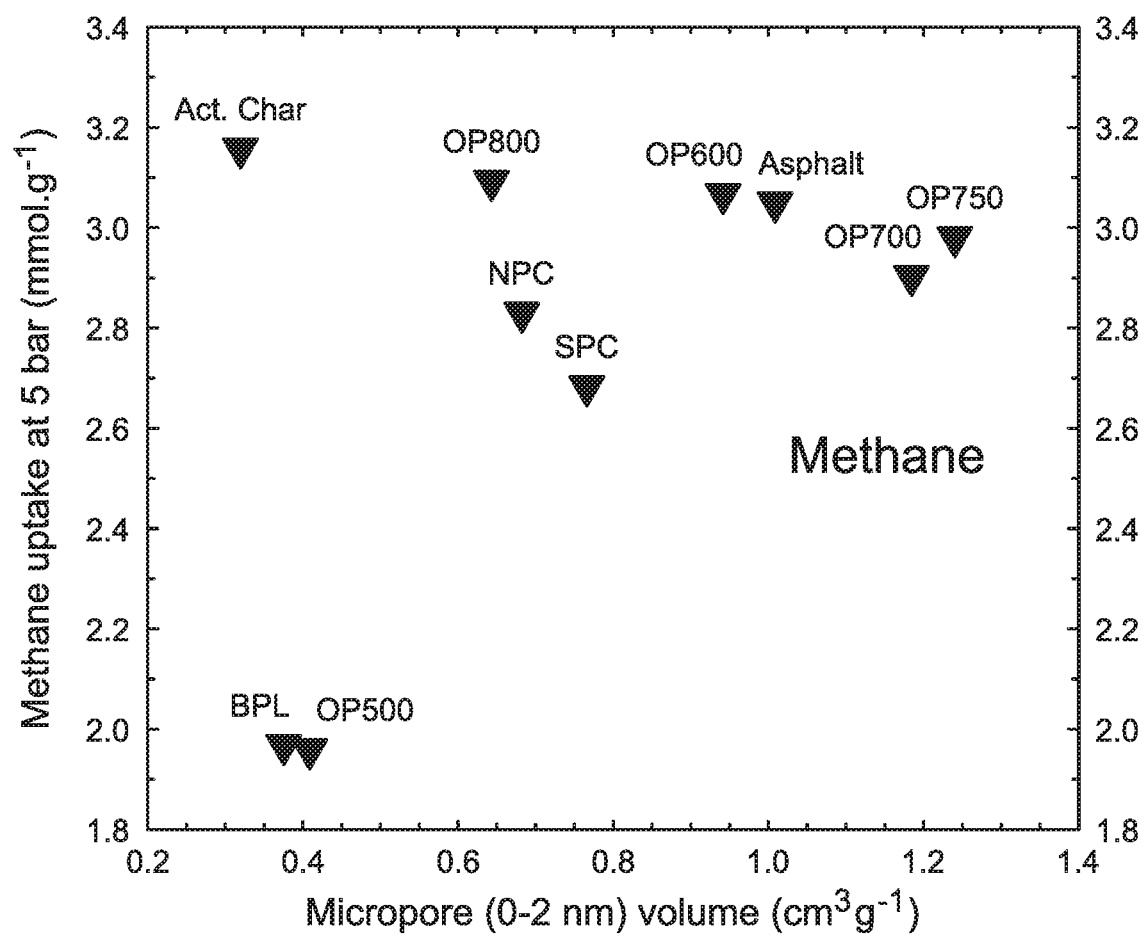
FIG. 25 is a graph showing relatively stable methane uptake at 5 bar pressure for a variety of microporous materials at increasing pore volumes.
Figure 26:
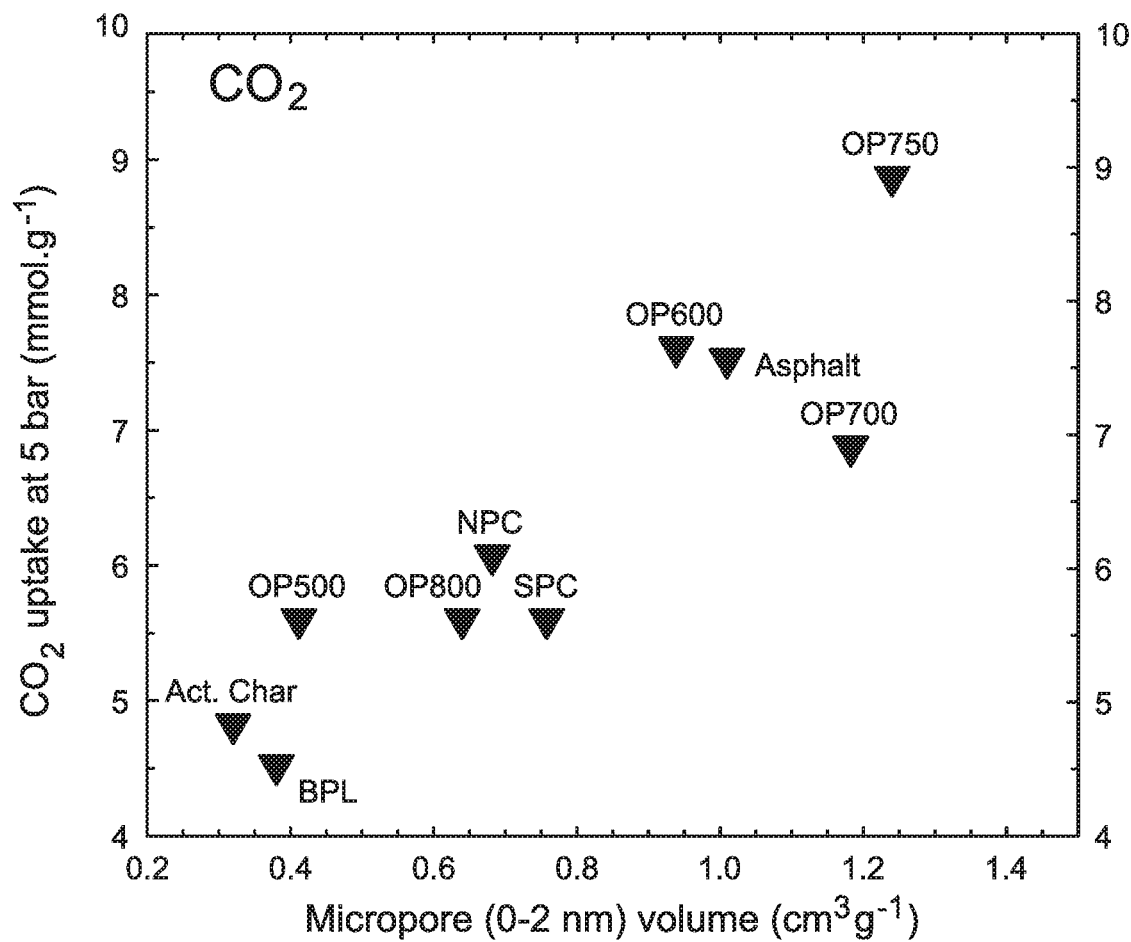
FIG. 26 is a graph showing increased $CO_2$ uptake at 5 bar pressure for a variety of microporous materials at increasing pore volumes.
Figure 27:
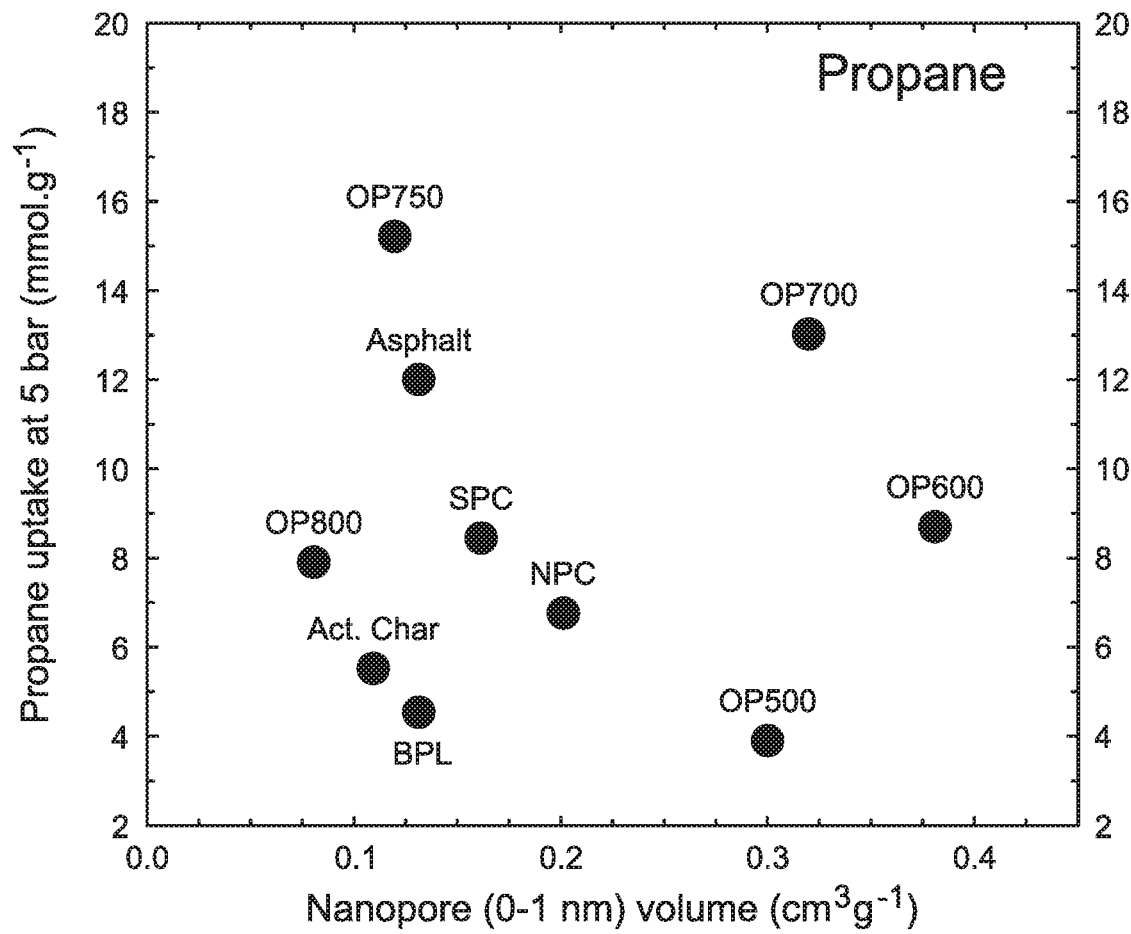
FIG. 27 is a graph showing propane uptake at 5 bar pressure for a variety of nanoporous materials at increasing pore volumes.
Figure 28:
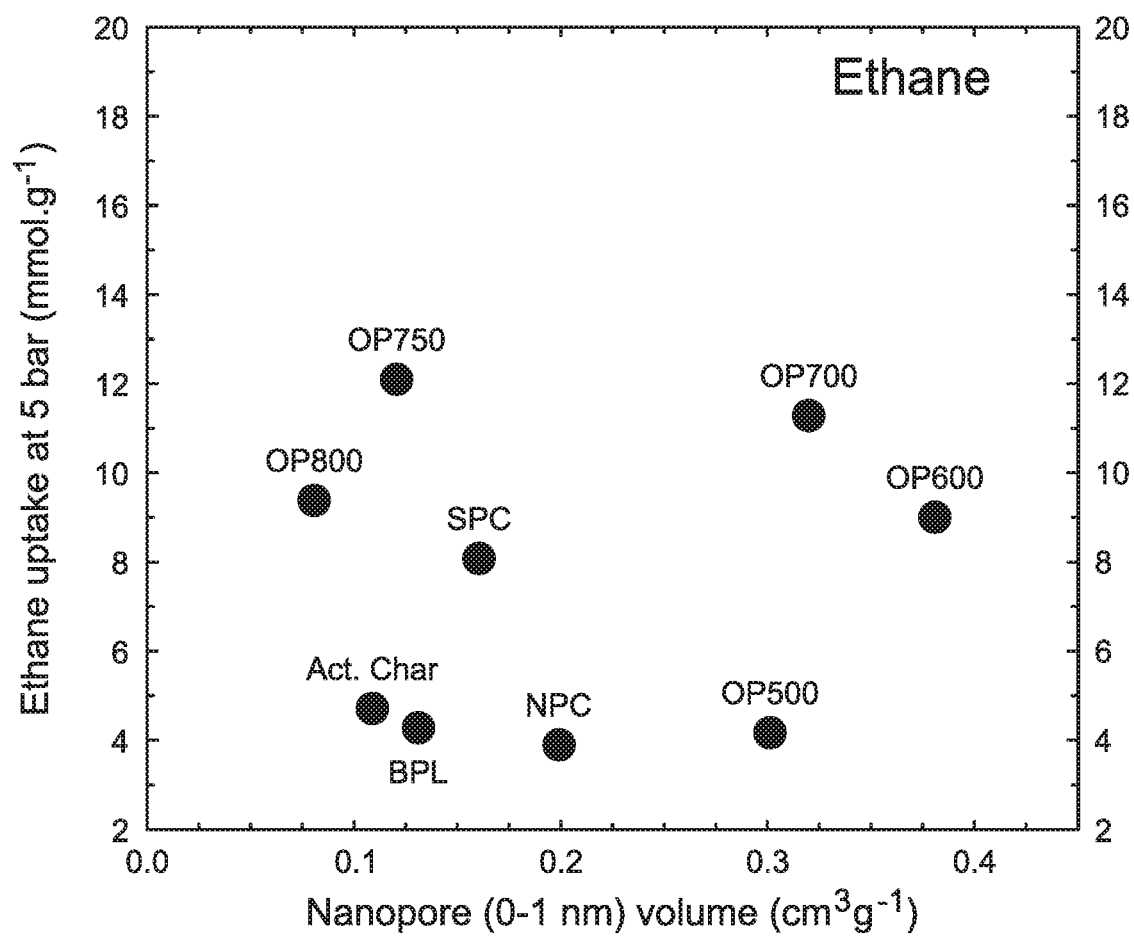
FIG. 28 is a graph showing ethane uptake at 5 bar pressure for a variety of nanoporous materials at increasing pore volumes.
Figure 29:
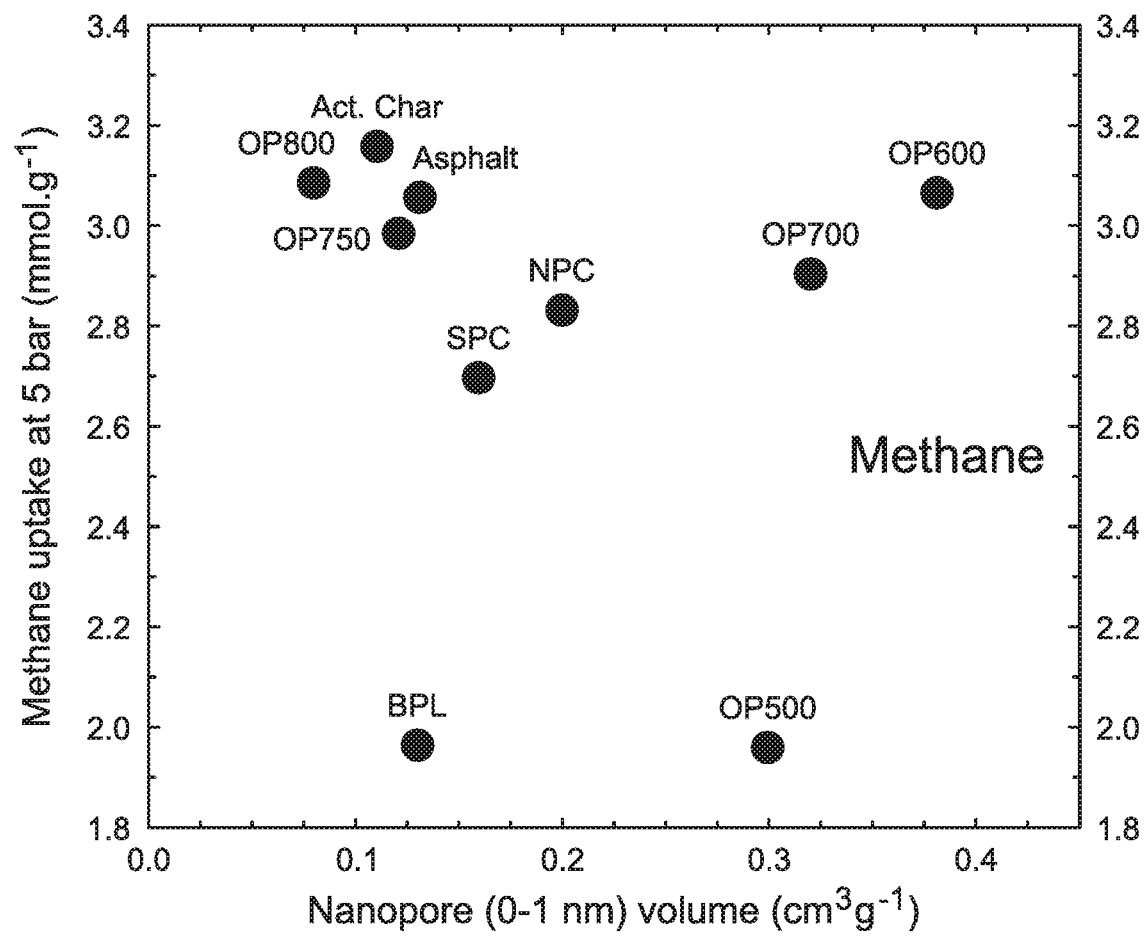
FIG. 29 is a graph showing relatively stable methane uptake at 5 bar pressure for a variety of nanoporous materials at increasing pore volumes.
Figure 30:
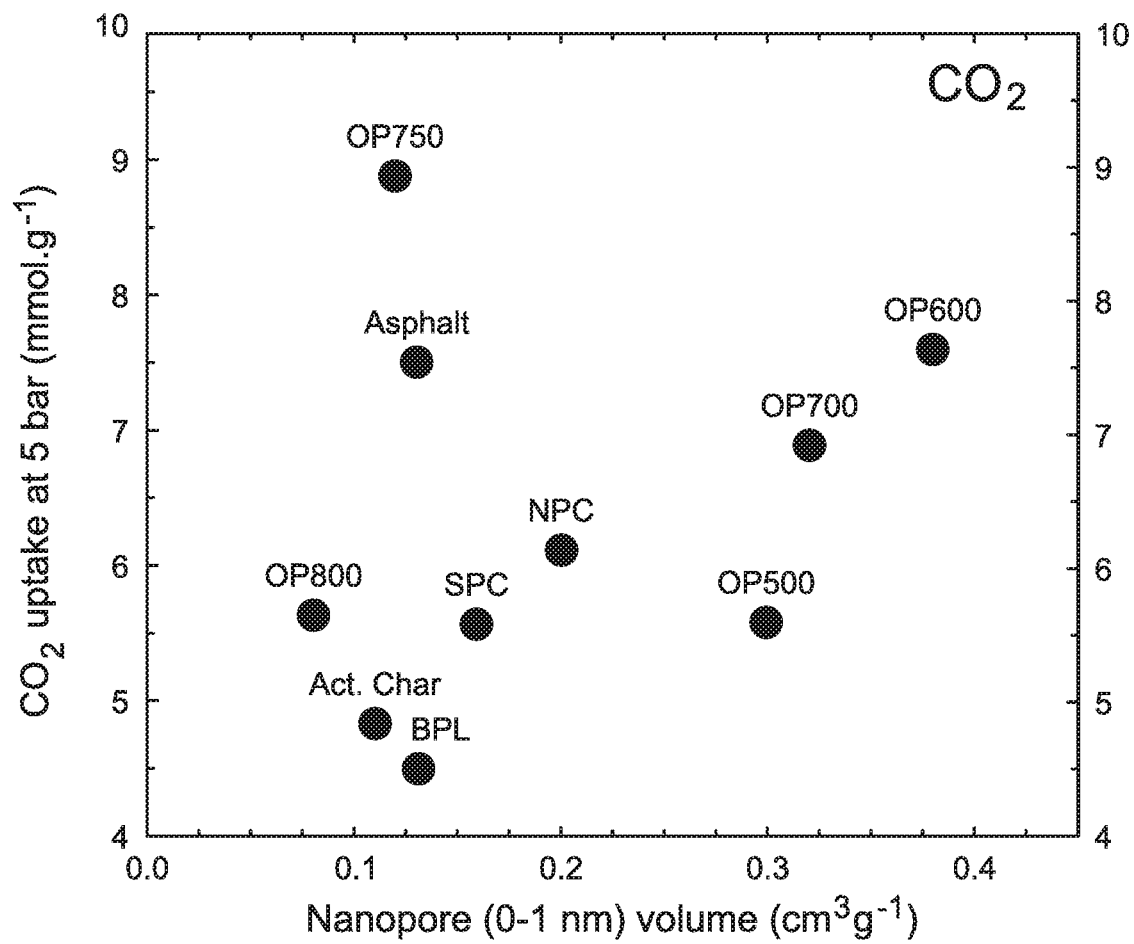
FIG. 30 is a graph showing $CO_2$ uptake at 5 bar pressure for a variety of nanoporous materials at increasing pore volumes.
Figure 31:
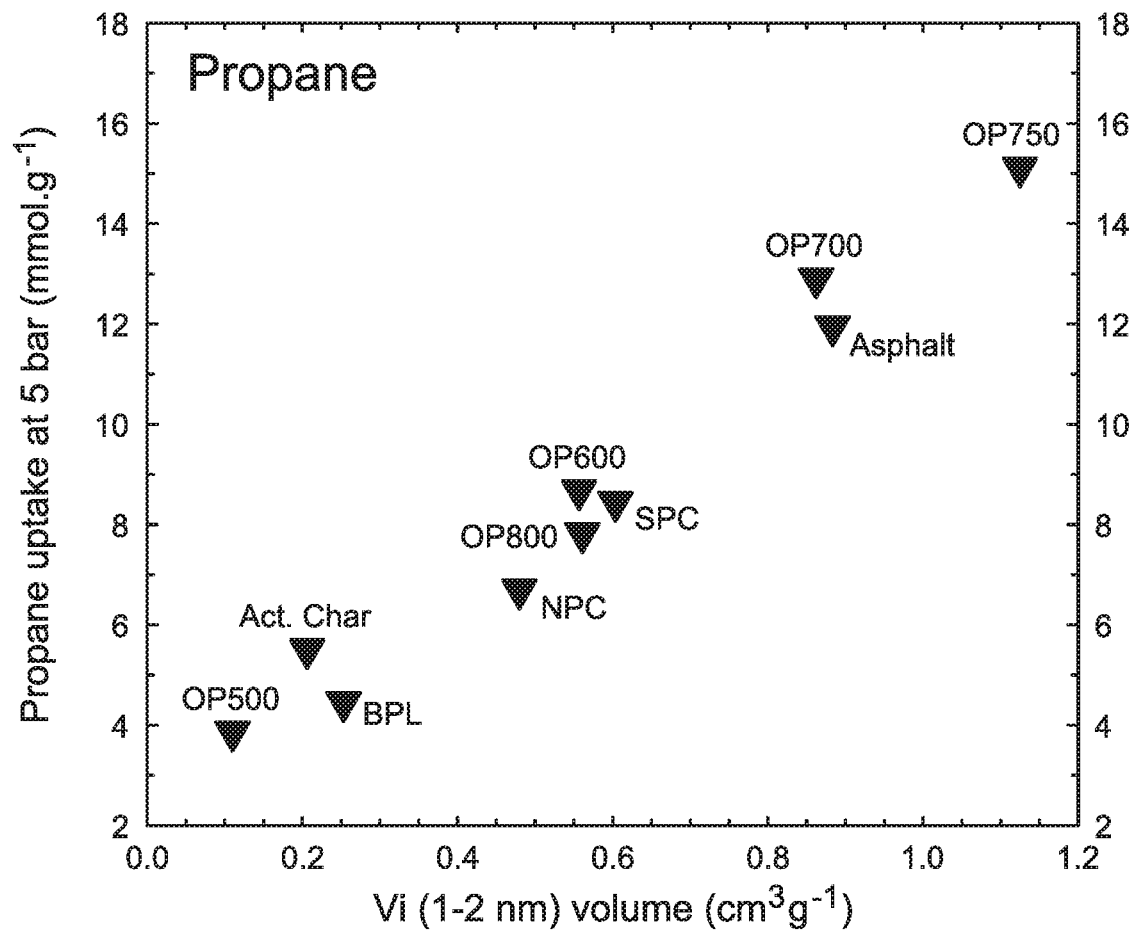
FIG. 31 is a graph showing increased propane uptake at 5 bar pressure for a variety of microporous materials at increasing pore volumes.
Figure 32:
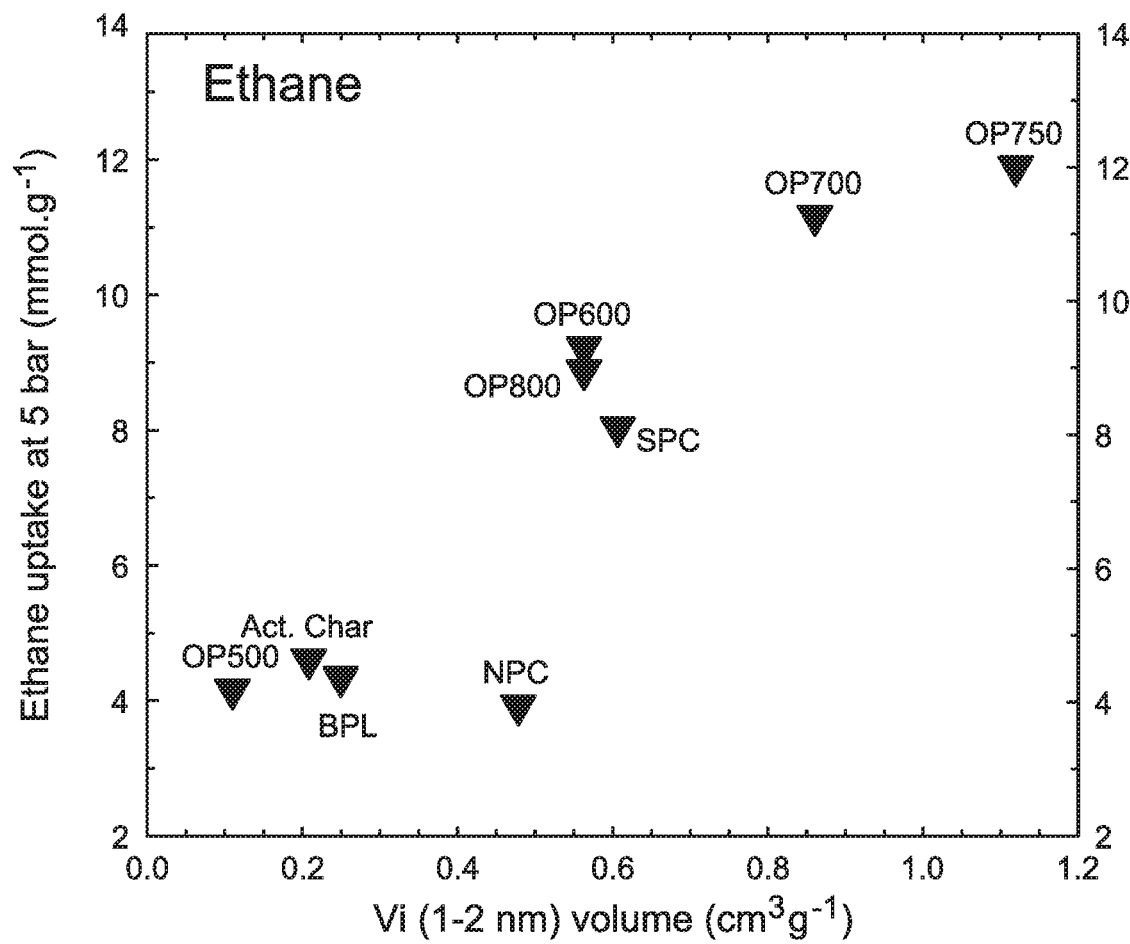
FIG. 32 is a graph showing increased ethane uptake at 5 bar pressure for a variety of microporous materials at increasing pore volumes.
Figure 33:
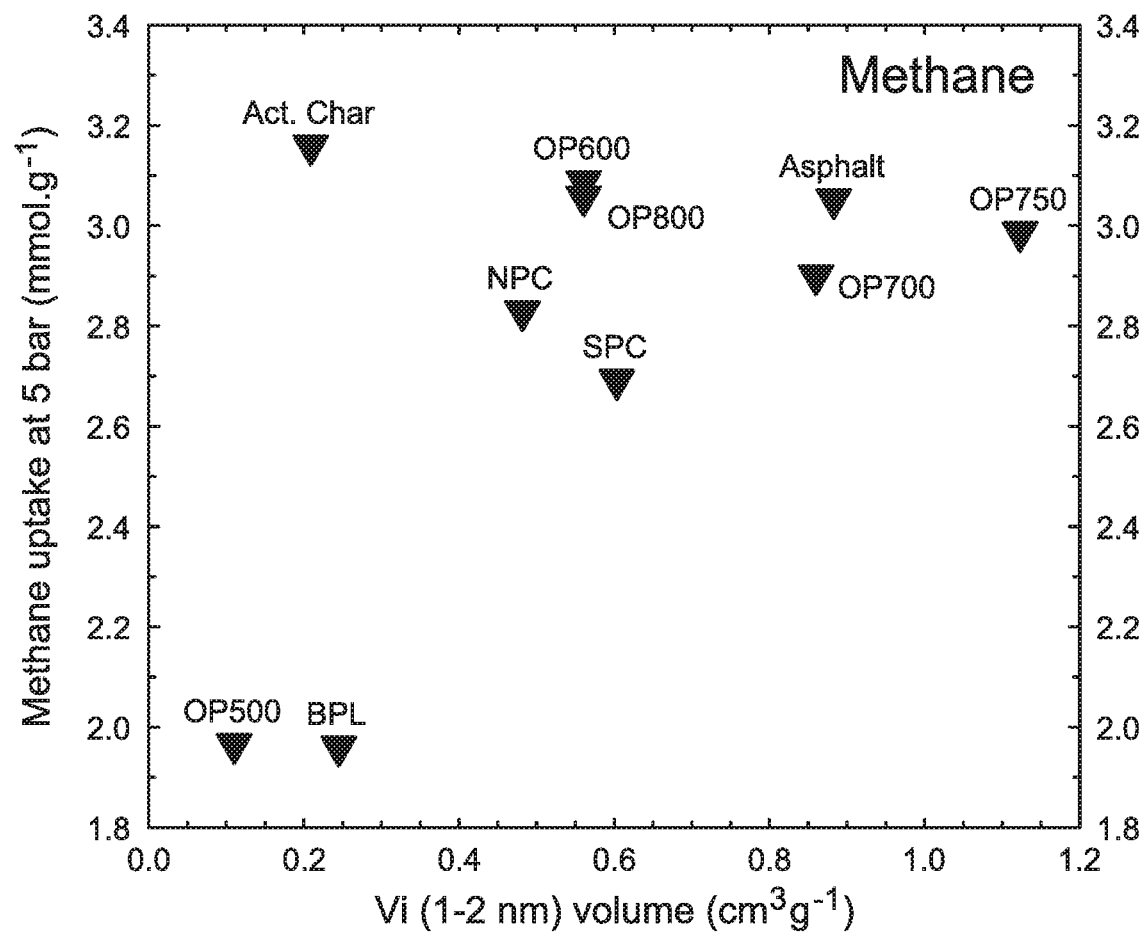
FIG. 33 is a graph showing relatively stable methane uptake at 5 bar pressure for a variety of microporous materials at increasing pore volumes.
Figure 34:
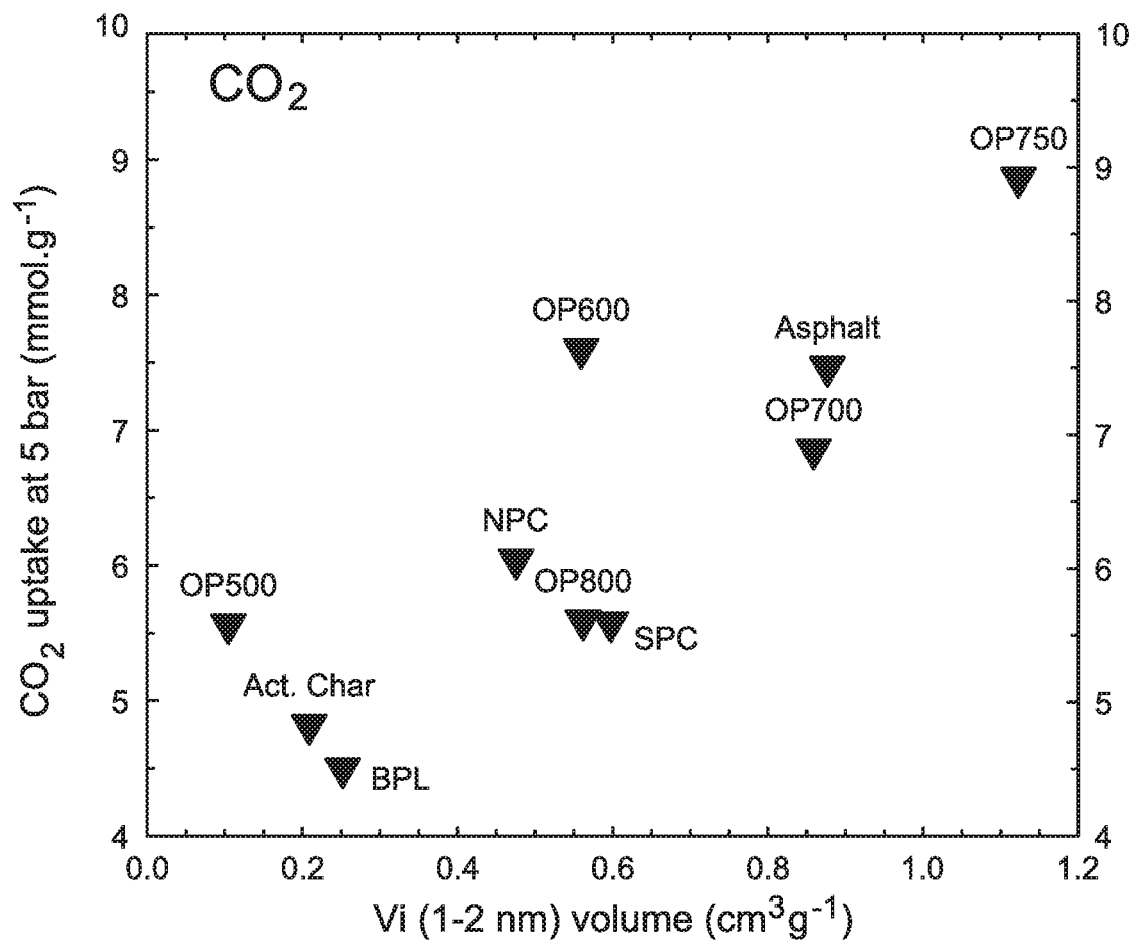
FIG. 34 is a graph showing increased $CO_2$ uptake at 5 bar pressure for a variety of microporous materials at increasing pore volumes.

Referring now to FIGS. 23-30, results are similar at 5 bar for micropores and nanopores as discussed at 9 bar. FIG. 23 is a graph showing increased propane uptake at 5 bar pressure for a variety of microporous materials at increasing pore volumes. FIG. 24 is a graph showing increased ethane uptake at 5 bar pressure for a variety of microporous materials at increasing pore volumes. FIG. 25 is a graph showing relatively stable methane uptake at 5 bar pressure for a variety of microporous materials at increasing pore volumes. FIG. 26 is a graph showing increased $CO_2$ uptake at 5 bar pressure for a variety of microporous materials at increasing pore volumes. FIG. 27 is a graph showing propane uptake at 5 bar pressure for a variety of nanoporous materials at increasing pore volumes. FIG. 28 is a graph showing ethane uptake at 5 bar pressure for a variety of nanoporous materials at increasing pore volumes. FIG. 29 is a graph showing relatively stable methane uptake at 5 bar pressure for a variety of nanoporous materials at increasing pore volumes. FIG. 30 is a graph showing increased $CO_2$ uptake at 5 bar pressure for a variety of nanoporous materials at increasing pore volumes Referring now to FIGS. 31-34, correlation for increased uptake in increased pore sizes for propane, ethane, and $CO_2$ and enhancement of selectivity versus methane occurs between an about 1 nm to about 2 nm pore size range, and generally not less than 1 nm or in the Angstrom range. FIG. 31 is a graph showing increased propane uptake at 5 bar pressure for a variety of microporous materials at increasing pore volumes. FIG. 32 is a graph showing increased ethane uptake at 5 bar pressure for a variety of microporous materials at increasing pore volumes. FIG. 33 is a graph showing relatively stable methane uptake at 5 bar pressure for a variety of microporous materials at increasing pore volumes. FIG. 34 is a graph showing increased $CO_2$ uptake at 5 bar pressure for a variety of microporous materials at increasing pore volumes.

Referring now to FIGS. 35-38, selectivity enhancement observed by increasing microporosity does not apply to $CO_2$ uptake at 1 bar pressure. This is important in part because $CO_2$ capture is desired at the end of smokestacks and tailpipes, which operate at atmospheric or near atmospheric pressures. Enhanced $CO_2$ selectivity for carbon capture using porous materials is not due to increasing surface area nor porosity (nano or otherwise). As shown, modifications to the physical characteristics of porous materials do not materially enhance selective capture of $CO_2$ at 1 bar, especially with Angstrom-sized pores. Observations of selectivity may be due to size exclusion or sieving only and not any enhancement of surface adsorption phenomena. $CO_2$ capture above 1 bar, or more specifically enhanced $CO_2$ capture in porous materials, occurs at pressures greater than atmospheric.

Figure 35:
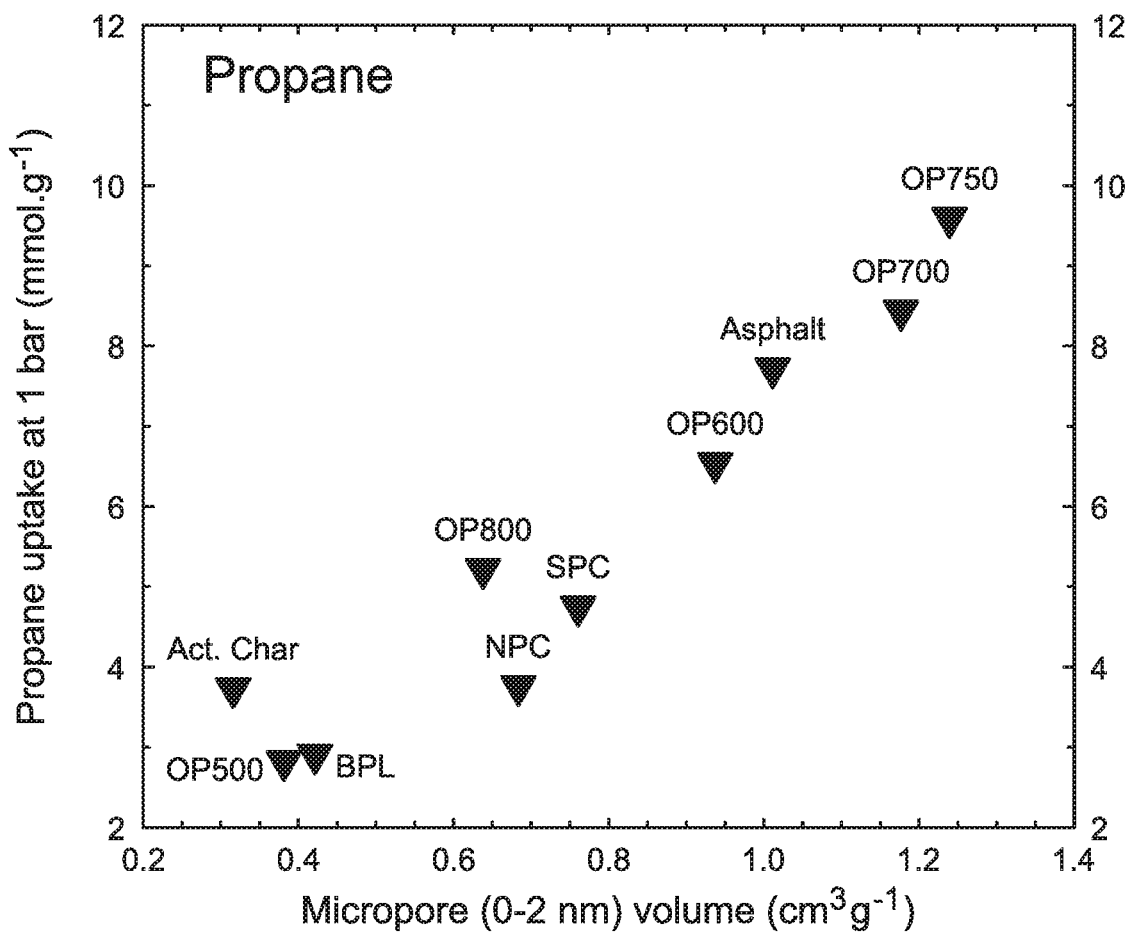
FIG. 35 is a graph showing increased propane uptake at 1 bar pressure for a variety of microporous materials at increasing pore volumes.
Figure 36:
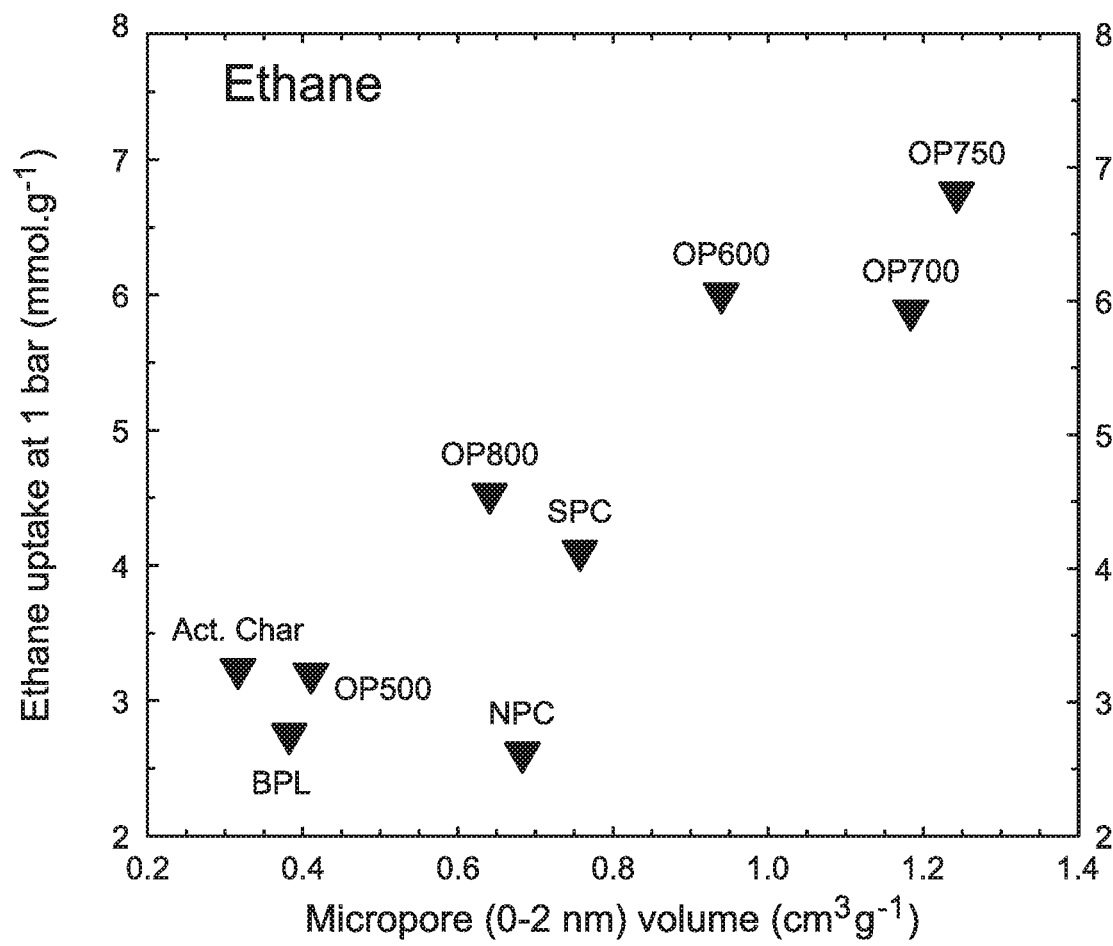
FIG. 36 is a graph showing increased ethane uptake at 1 bar pressure for a variety of microporous materials at increasing pore volumes.
Figure 37:
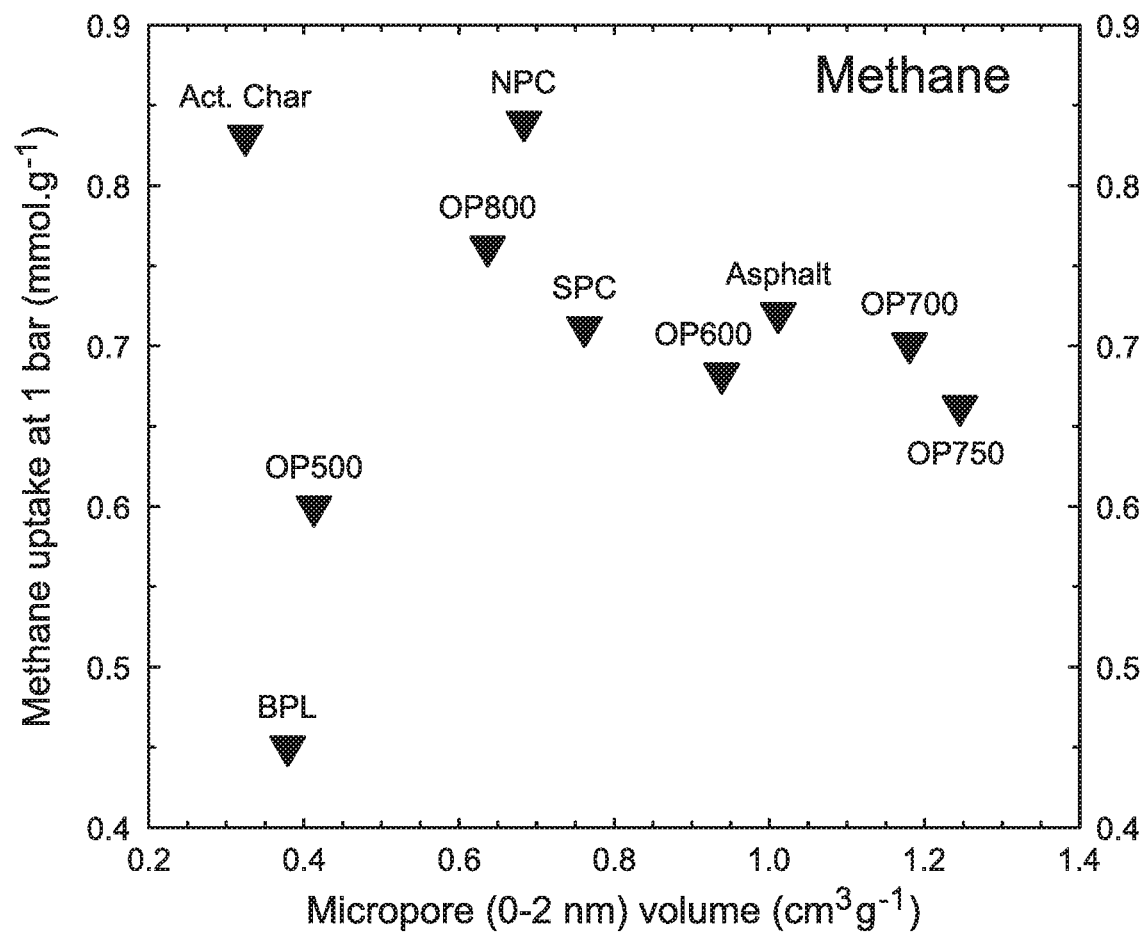
FIG. 37 is a graph showing relatively stable methane uptake at 1 bar pressure for a variety of microporous materials at increasing pore volumes.
Figure 38:
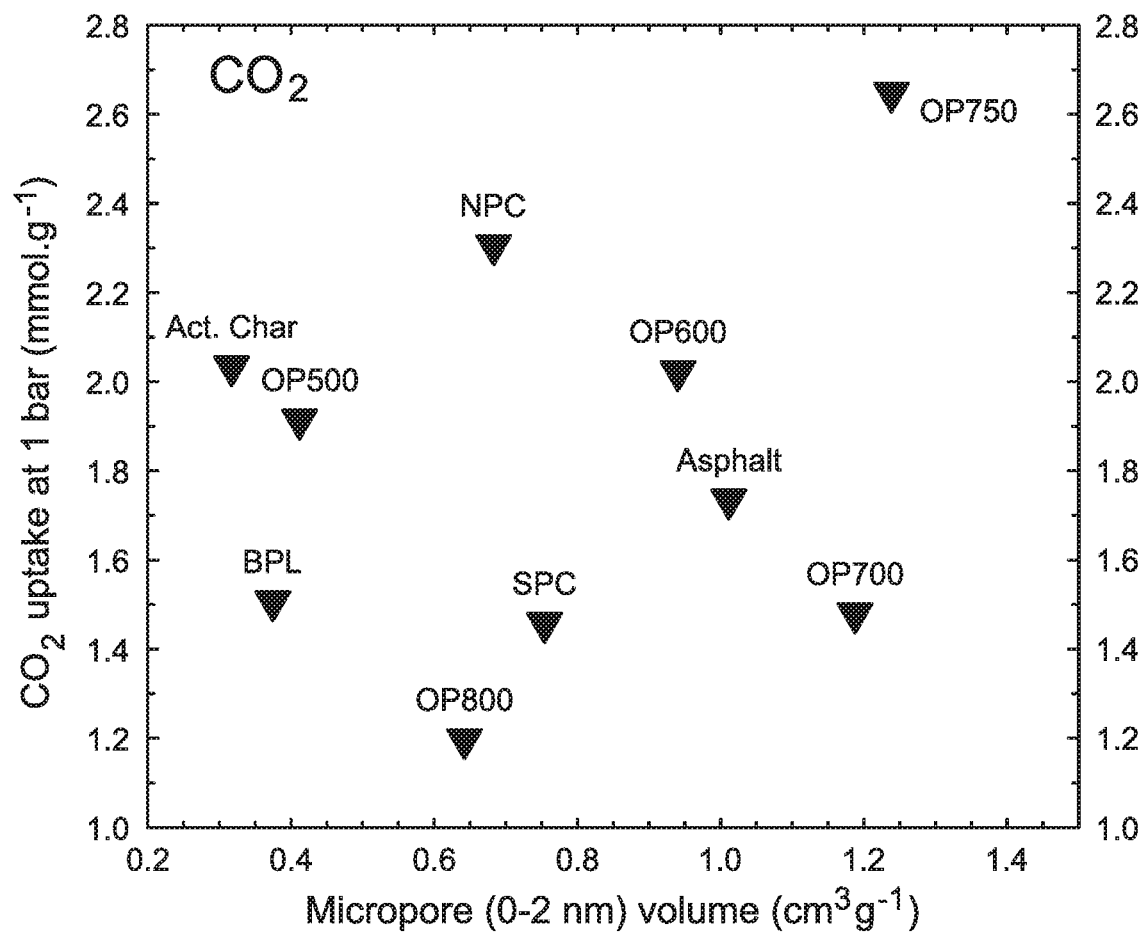
FIG. 38 is a graph showing $CO_2$ uptake at 1 bar pressure for a variety of microporous materials at increasing pore volumes.
Figure 39:
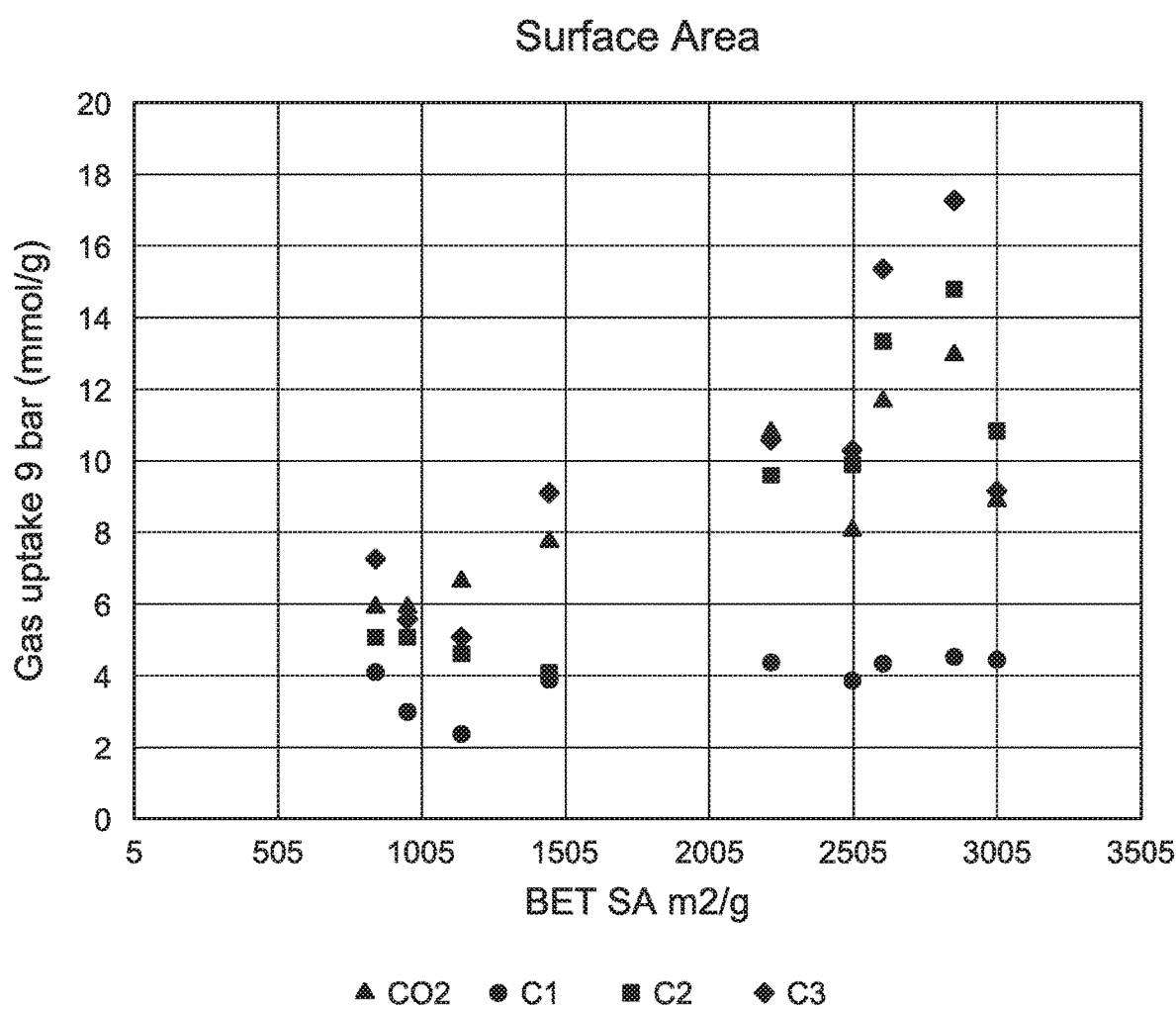
FIG. 39 is a graph showing gas uptake at 9 bar for $CO_2$, methane (C1), ethane (C2), and propane (C3) on porous materials of varying BET (Brunauer-Emmett-Teller) surface area (SA).
Figure 40:
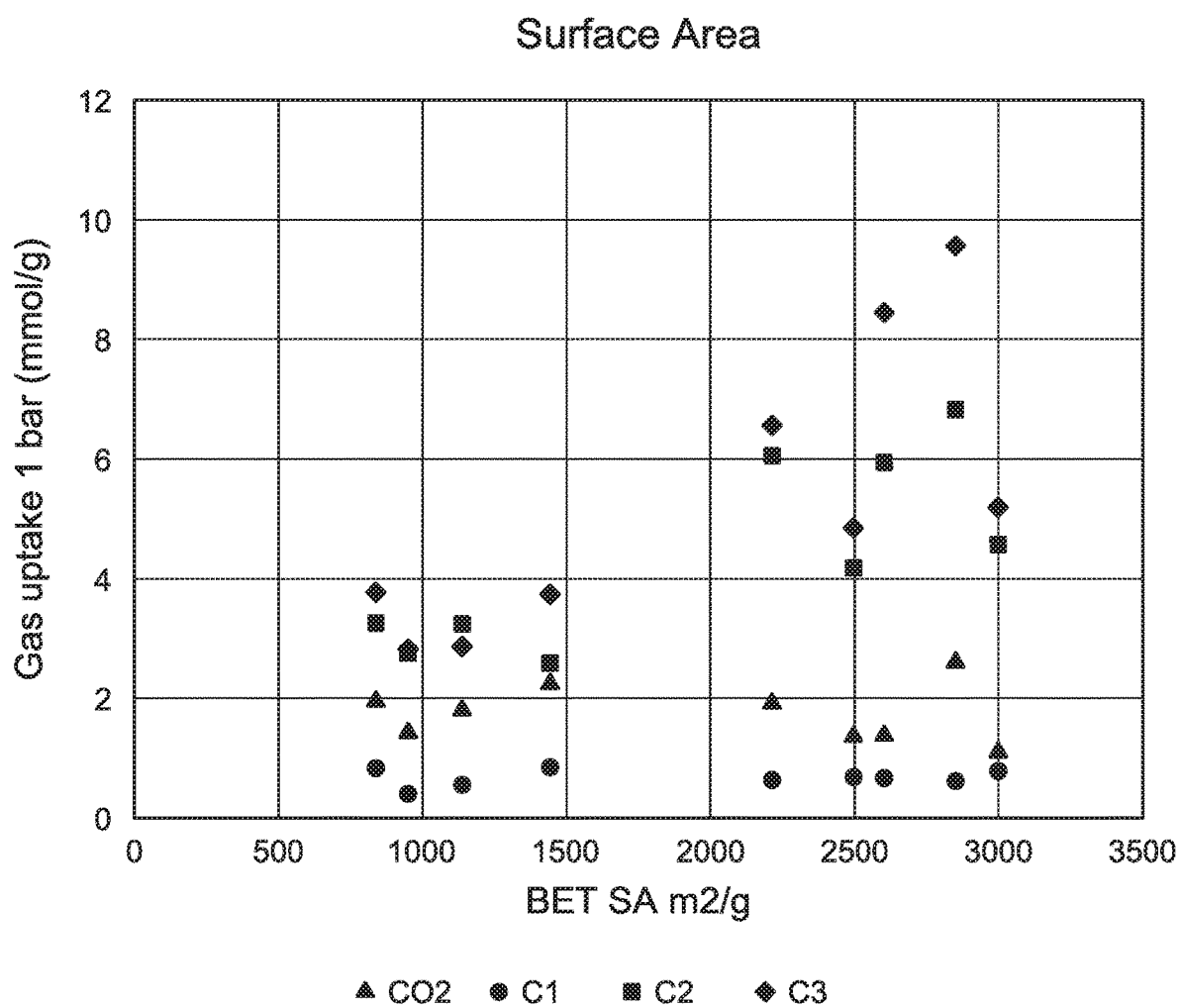
FIG. 40 is a graph showing gas uptake at 1 bar for $CO_2$, methane (C1), ethane (C2), and propane (C3) on porous materials of varying BET SA.

FIG. 35 is a graph showing increased propane uptake at 1 bar pressure for a variety of microporous materials at increasing pore volumes. FIG. 36 is a graph showing increased ethane uptake at 1 bar pressure for a variety of microporous materials at increasing pore volumes. FIG. 37 is a graph showing relatively stable methane uptake at 1 bar pressure for a variety of microporous materials at increasing pore volumes. FIG. 38 is a graph showing increased $CO_2$ uptake at 1 bar pressure for a variety of microporous materials at increasing pore volumes.

Referring now to FIGS. 39-42, as surface area of the porous material increased, gas uptake does not increase for methane, but uptake increased for all other gases. This indicates that microporous materials, such as carbons, may be able to advantageously not adsorb methane while adsorbing other compositions such as carbon dioxide, ethane, and propane. Porous materials are better suited at selective capture of hydrocarbons with molecular weights greater than methane. Physical characteristics of the porous materials are enhanced for selectivity of other gases other than methane. One exception is $CO_2$ uptake at 1 bar pressure, where there is not observable increase in $CO_2$ uptake with increasing surface area, unless it is measured at pressures greater than atmospheric.

Figure 41:
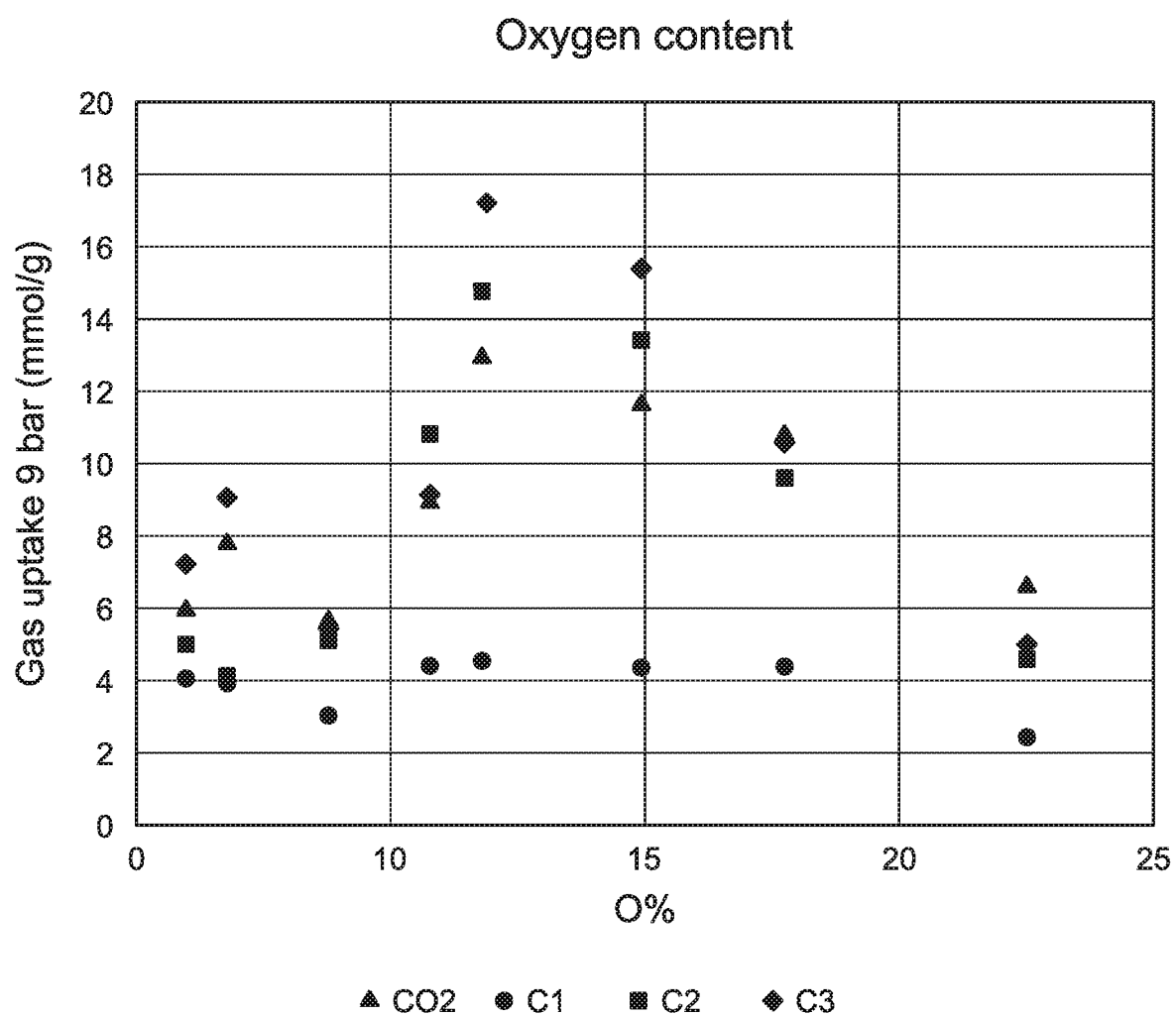
FIG. 41 is a graph showing gas uptake at 9 bar for $CO_2$, methane (C1), ethane (C2), and propane (C3) on porous materials of varying oxygen content in wt. %, with oxygen as a heteroatom on activated carbon.
Figure 42:
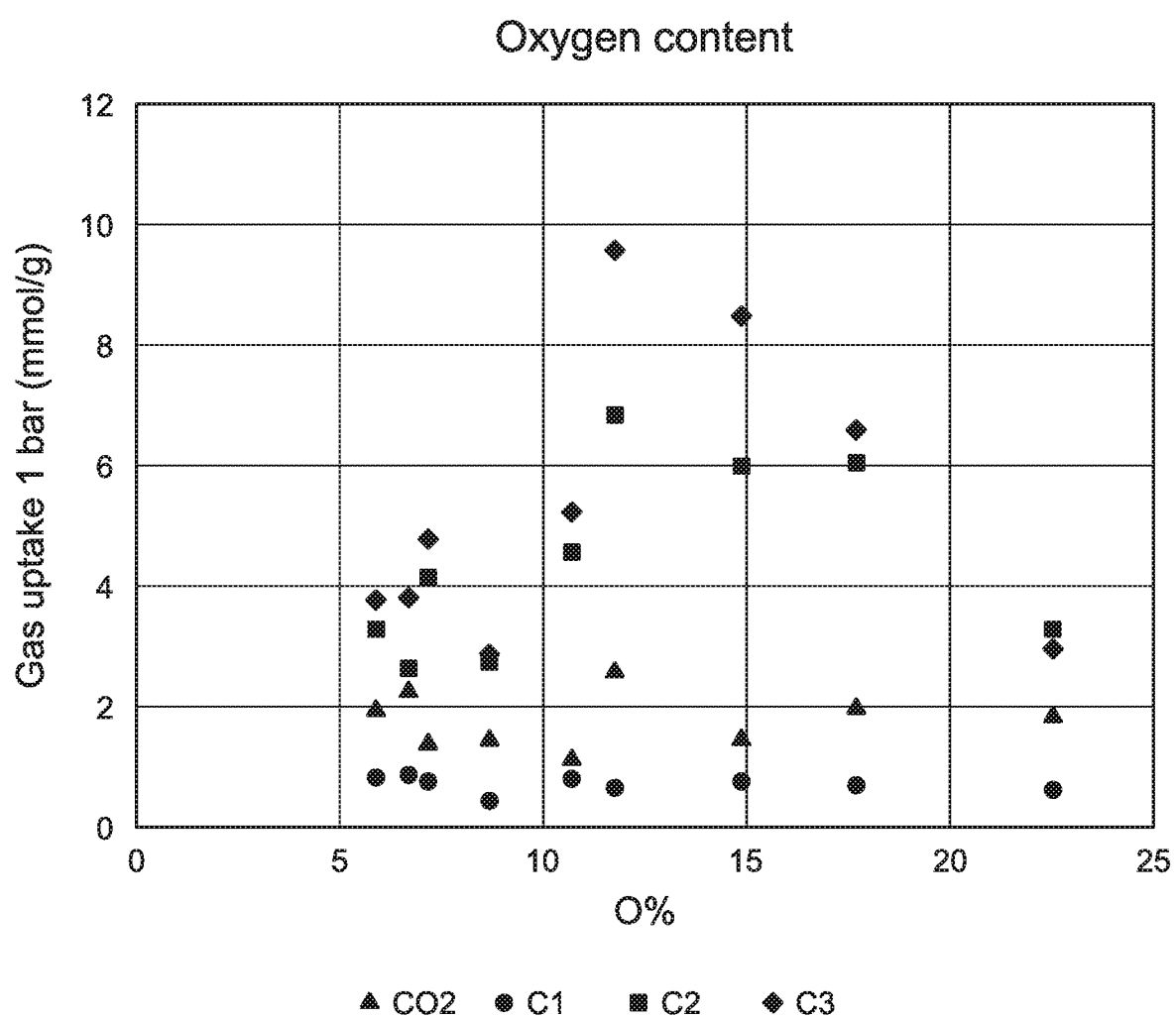
FIG. 42 is a graph showing gas uptake at 1 bar for $CO_2$, methane (C1), ethane (C2), and propane (C3) on porous materials of varying oxygen content in wt. %, with oxygen as a heteroatom on activated carbon.

Looking at oxygen content in FIGS. 41-42, there is enhanced selectivity for hydrocarbons with increasing oxygen content to approximately 15%, but there is noticeably no impact to $CO_2$ enhancement at 1 bar or atmospheric pressure. Enhancements to $CO_2$ adsorption selectivity is not observed unless pressures are generally above atmospheric pressure. Additionally, looking to the uptake ratios between all the gases measured shows that the lowest uptake of ethane occurs in the presence of nitrogen content in the porous material. This means that selectivity of hydrocarbons of molecular weight greater than ethane can be enhanced if the N hetero atom is present in the porous material.

The singular forms "a," "an," and "the" include plural referents, unless the context clearly dictates otherwise.

In the drawings and specification, there have been disclosed embodiments of systems and methods for natural gas liquids recovery from pressure swing adsorption and vacuum swing adsorption of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for continuous pressure swing adsorption separation of a pressurized feed gas stream, the method comprising the step of:

separating hydrocarbons heavier than methane from the pressurized feed gas stream by applying an adsorbent porous material to produce at least two product streams, a first product stream being substantially pure methane suitable for transport by natural gas pipeline, and a second product stream being substantially comprised of components with a greater molecular weight than methane, wherein the porous material exhibits pore diameters between about 1 nm and about 2 nm creating at least about 0.3 $cm^3/g$ of pore volume.

2. The method according to claim 1, wherein the porous material exhibits a surface area of at least about 1,200 $m^2/g$ and a total pore volume of at least about 0.8 $cm^3/g$.

3. The method according to claim 1, wherein at least about 40% of pores in the porous material exhibit diameters between about 1 nm and about 2 nm.

4. The method according to claim 1, wherein the porous material comprises a heteroatom selected from oxygen, nitrogen, sulfur, and combinations thereof.

5. The method according to claim 1, wherein the porous material exhibits an oxygen content of more than about 4 wt. % as measured by X-ray photoelectron spectroscopy.

6. The method according to claim 1, wherein more than about 40% of pores in the porous material exhibit a diameter of less than about 2 nm.

7. The method according to claim 1, wherein the porous material exhibits a nitrogen content of at least 1 wt. % as measured by X-ray photoelectron spectroscopy and enhances selectivity of the porous material to adsorb gases heavier than ethane.

8. The method according to claim 1, wherein the porous material exhibits a nitrogen content between about 1 wt. % and about 12 wt. % as measured by X-ray photoelectron spectroscopy and enhances selectivity of the porous material to adsorb gases heavier than ethane.

9. The method according to claim 1, wherein the porous material comprises a porous carbon material with a carbon content of between about 75 wt. % and about 95 wt. % as measured by X-ray photoelectron spectroscopy.

10. The method according to claim 1, wherein the porous material selectively adsorbs carbon dioxide at pressures greater than about 1 bar.

* * * * *